(12) United States Patent
Kang et al.

(10) Patent No.: US 12,166,974 B2
(45) Date of Patent: Dec. 10, 2024

(54) METHOD AND DEVICE FOR SIGNALING PREDICTION MODE-RELATED SIGNAL IN INTRA PREDICTION

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Jung Won Kang, Daejeon (KR); Ha Hyun Lee, Daejeon (KR); Sung Chang Lim, Daejeon (KR); Jin Ho Lee, Daejeon (KR); Hui Yong Kim, Daejeon (KR); Gwang Hoon Park, Seongnam-si (KR); Tae Hyun Kim, Hwaseong-si (KR); Dae Young Lee, Ansan-si (KR); Woo Woen Gwun, Jeonju-si (KR); Won Jun Lee, Daejeon (KR)

(73) Assignees: ELECTRONICS AND TELECOMMUNICATIONS RESEARCH INSTITUTE, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 267 days.

(21) Appl. No.: 17/602,690

(22) PCT Filed: Apr. 10, 2020

(86) PCT No.: PCT/KR2020/004911
§ 371 (c)(1),
(2) Date: Oct. 8, 2021

(87) PCT Pub. No.: WO2020/209671
PCT Pub. Date: Oct. 15, 2020

(65) Prior Publication Data
US 2022/0166973 A1    May 26, 2022

(30) Foreign Application Priority Data
Apr. 10, 2019  (KR) .................. 10-2019-0041876

(51) Int. Cl.
*H04N 19/11*  (2014.01)
*H04N 19/105*  (2014.01)
(Continued)

(52) U.S. Cl.
CPC .......... *H04N 19/11* (2014.11); *H04N 19/105* (2014.11); *H04N 19/159* (2014.11); *H04N 19/176* (2014.11); *H04N 19/184* (2014.11)

(58) Field of Classification Search
CPC .... H04N 19/105; H04N 19/11; H04N 19/159; H04N 19/176; H04N 19/184; H04N 19/70; H04N 19/463; H04N 19/593
(Continued)

(56) References Cited

U.S. PATENT DOCUMENTS

| 6,954,502 B2 | 10/2005 | Lainema |
| 8,208,545 B2 * | 6/2012 | Seo .................. H04N 19/46 375/240.12 |

(Continued)

FOREIGN PATENT DOCUMENTS

| JP | 2018535609 A | 11/2018 |
| KR | 100772576 B1 | 11/2007 |

(Continued)

*Primary Examiner* — Kathleen M Walsh
(74) *Attorney, Agent, or Firm* — Sughrue Mion, PLLC

(57) ABSTRACT

An image encoding/decoding method and apparatus is provided. The method of decoding an image includes decoding at least one of prediction mode information of a neighbor block of a current block and length information of the
(Continued)

current block, deriving an intra prediction mode of the current block into a predetermined mode using the decoded information, and reconstructing the current block based on the intra prediction mode of the current block.

14 Claims, 51 Drawing Sheets

(51) Int. Cl.
   *H04N 19/159* (2014.01)
   *H04N 19/176* (2014.01)
   *H04N 19/184* (2014.01)
(58) Field of Classification Search
   USPC .................................................. 375/240.02
   See application file for complete search history.

(56) References Cited

U.S. PATENT DOCUMENTS

| | | | |
|---|---|---|---|
| 9,154,781 B2 * | 10/2015 | Lee | H04N 19/82 |
| 10,200,719 B2 | 2/2019 | Zhang et al. | |
| 10,687,056 B2 | 6/2020 | Francois et al. | |
| 11,202,063 B2 * | 12/2021 | Lee | H04N 19/80 |
| 11,503,316 B2 * | 11/2022 | Cho | H04N 19/44 |
| 2016/0156933 A1 | 6/2016 | Kalevo et al. | |
| 2016/0227211 A1 * | 8/2016 | Gisquet | H04N 19/11 |
| 2019/0116381 A1 * | 4/2019 | Lee | H04N 19/159 |
| 2019/0327466 A1 * | 10/2019 | Ikai | H04N 19/176 |
| 2020/0154100 A1 * | 5/2020 | Zhao | H04N 19/105 |
| 2021/0105465 A1 * | 4/2021 | Choi | H04N 19/70 |
| 2021/0227213 A1 * | 7/2021 | Kim | H04N 19/176 |
| 2021/0392333 A1 * | 12/2021 | Paluri | H04N 19/188 |
| 2021/0400263 A1 * | 12/2021 | Heo | H04N 19/11 |
| 2022/0038691 A1 * | 2/2022 | Li | H04N 19/70 |
| 2022/0182614 A1 * | 6/2022 | Jang | H04N 19/11 |
| 2022/0201279 A1 * | 6/2022 | Choi | H04N 19/132 |

FOREIGN PATENT DOCUMENTS

| | | | | |
|---|---|---|---|---|
| KR | 1020140062509 A | 5/2014 | | |
| KR | 1020140124443 A | 10/2014 | | |
| KR | 1020180123674 A | 11/2018 | | |
| WO | WO-2015180166 A1 * | 12/2015 | | H04N 19/107 |

* cited by examiner

☐ Adjacent pixel of current block

☐ Current block pixel

→ Intra prediction direction
(intra prediction mode direction)

FIG. 17
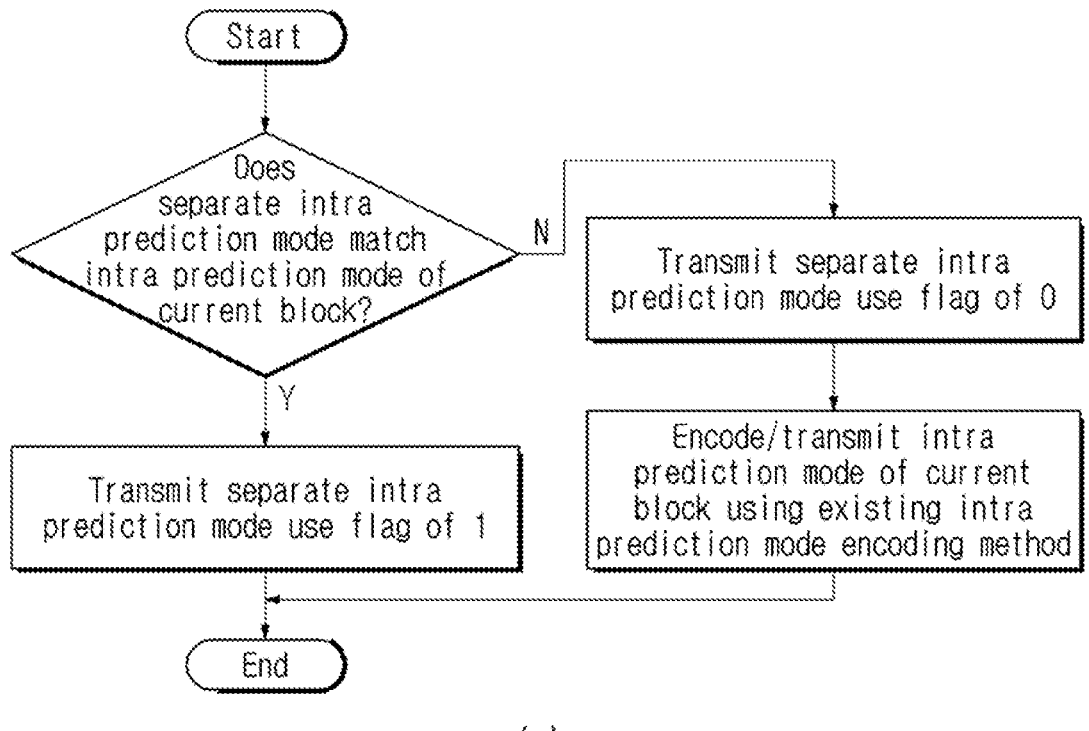
(a)
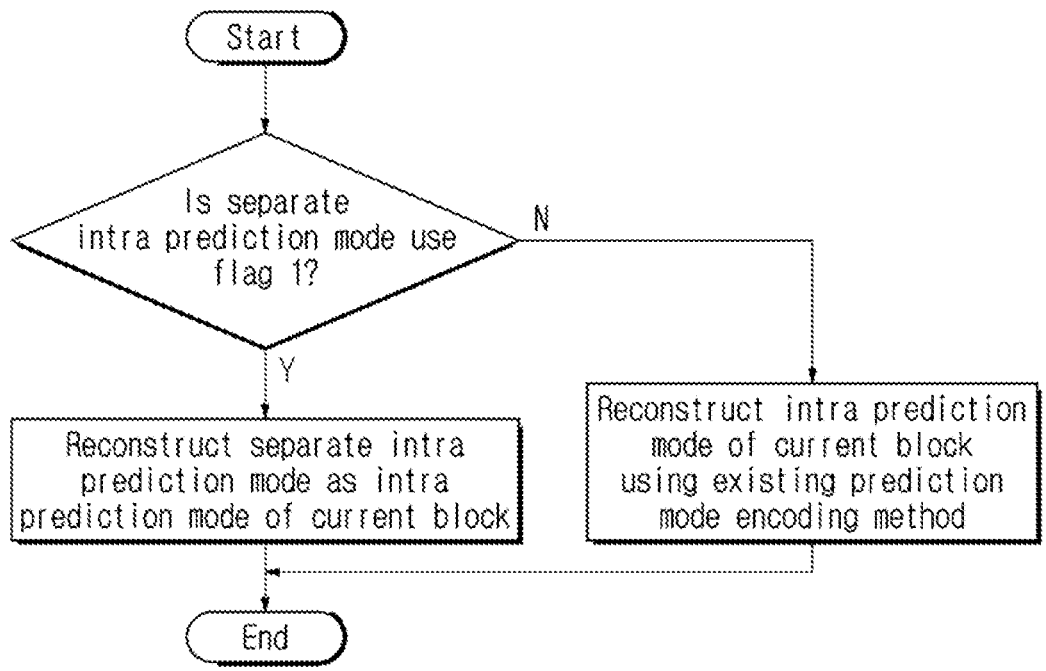
(b)

FIG. 20
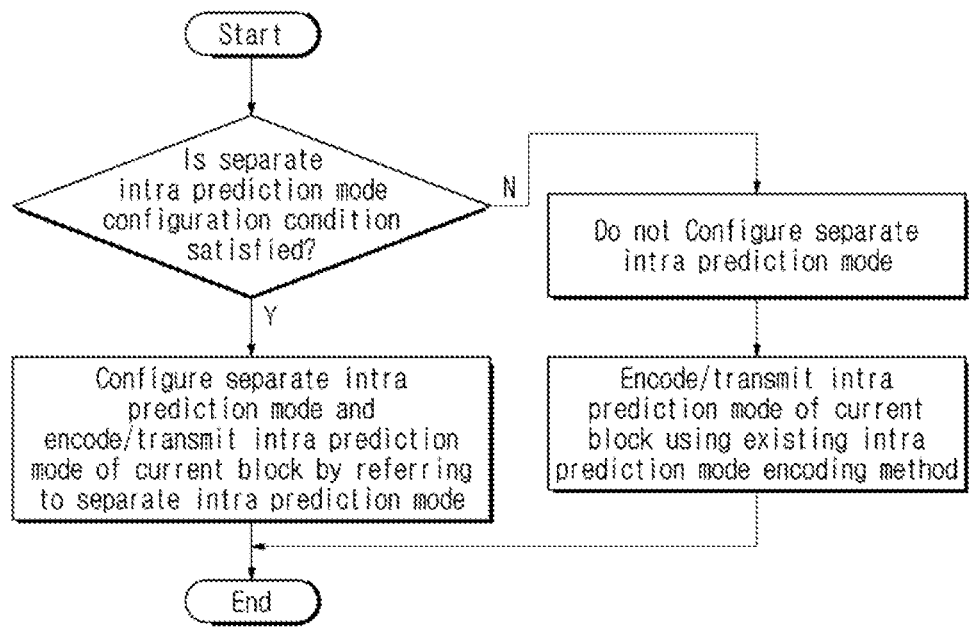
(a)
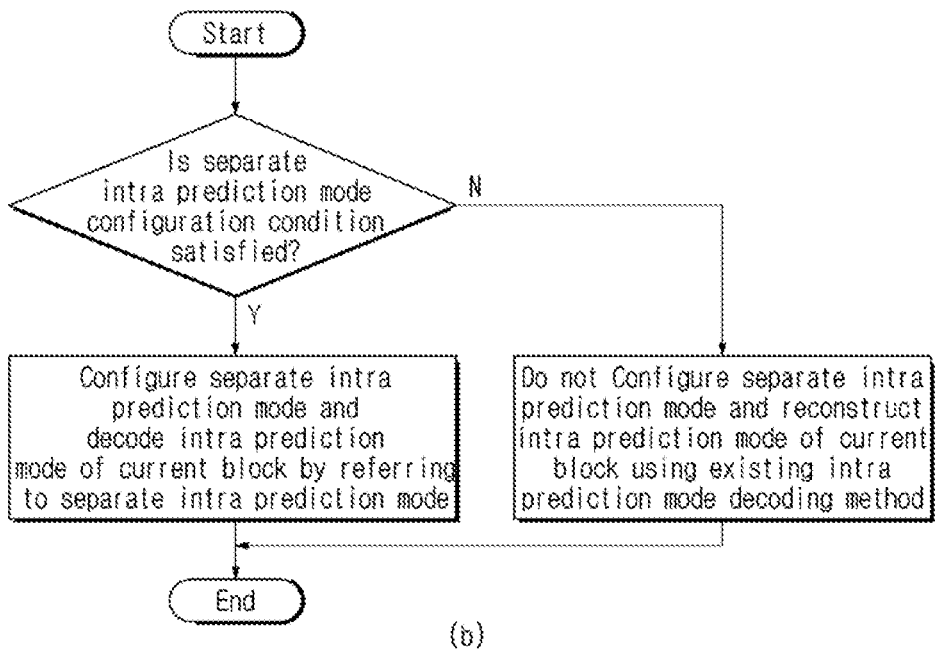
(b)

FIG. 21
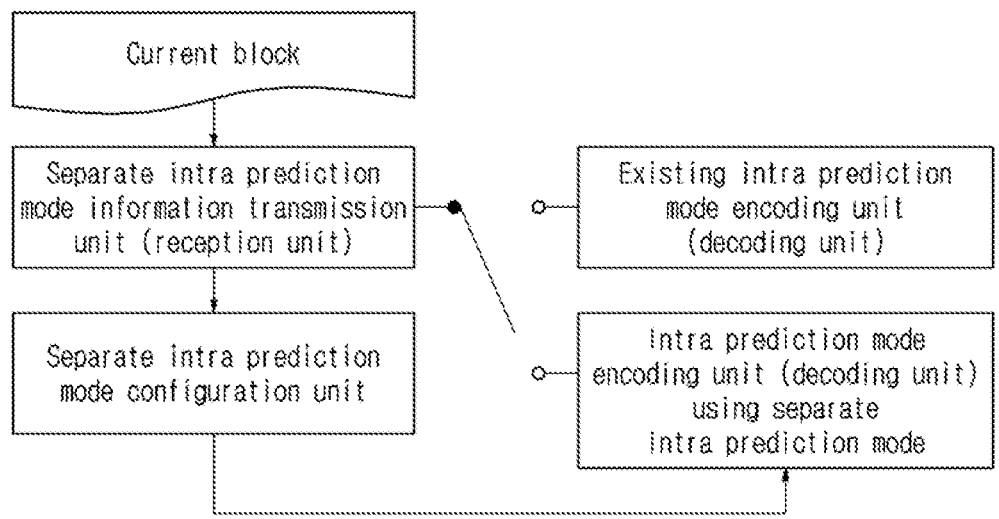
(a) Detailed diagram of apparatus of
present invention using additional signaling
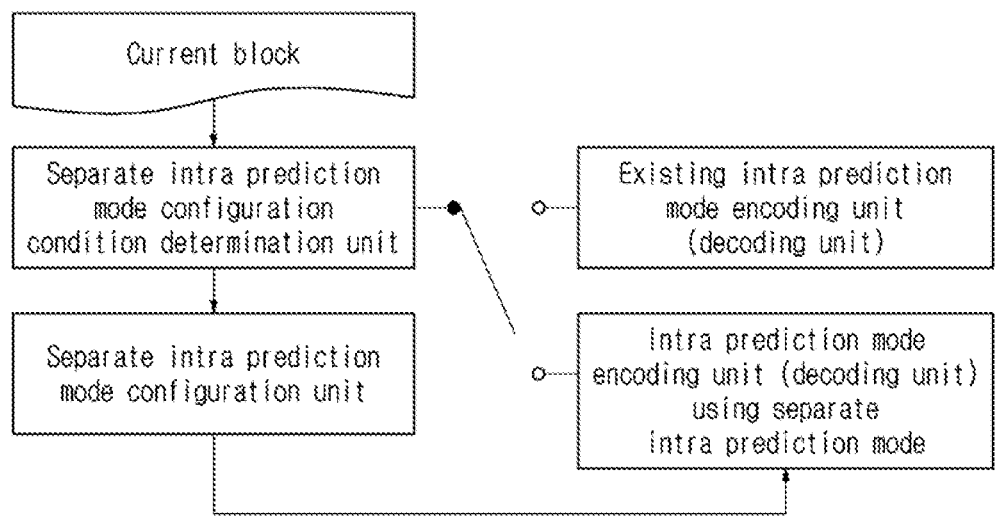
(b) Detailed diagram of apparatus of
present invention without additional signaling

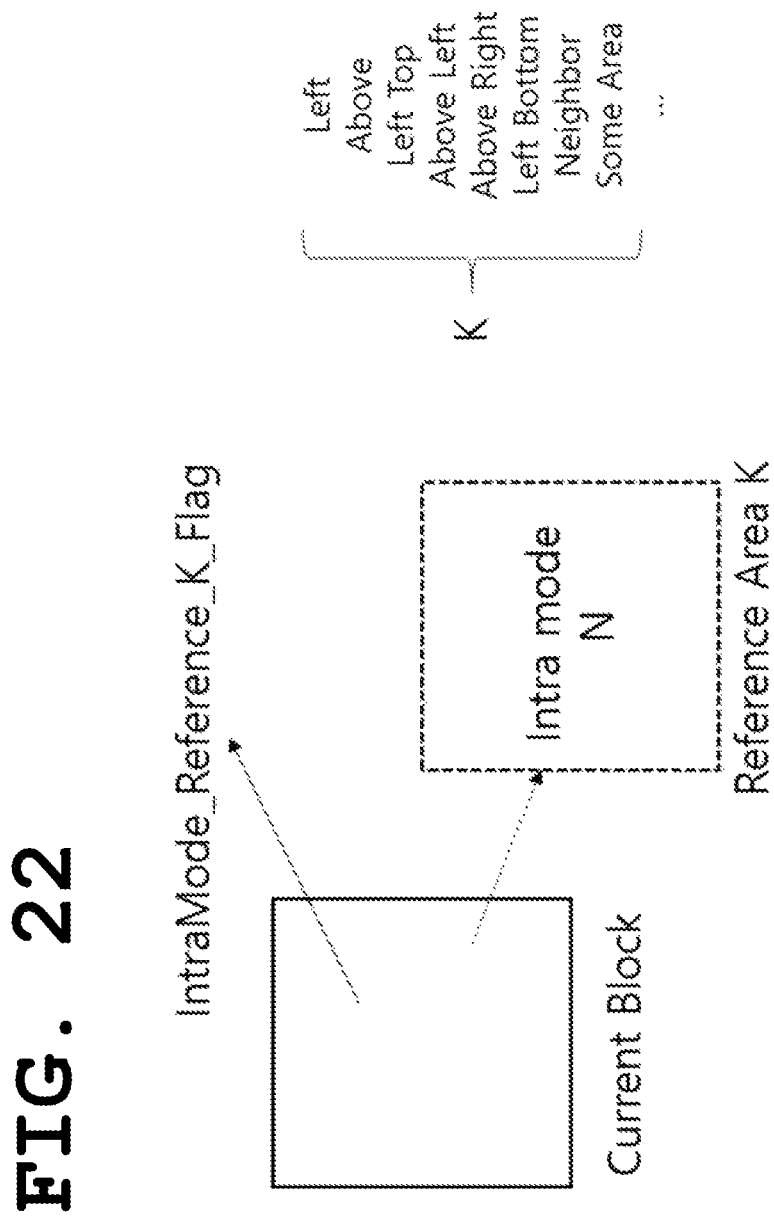

FIG. 28
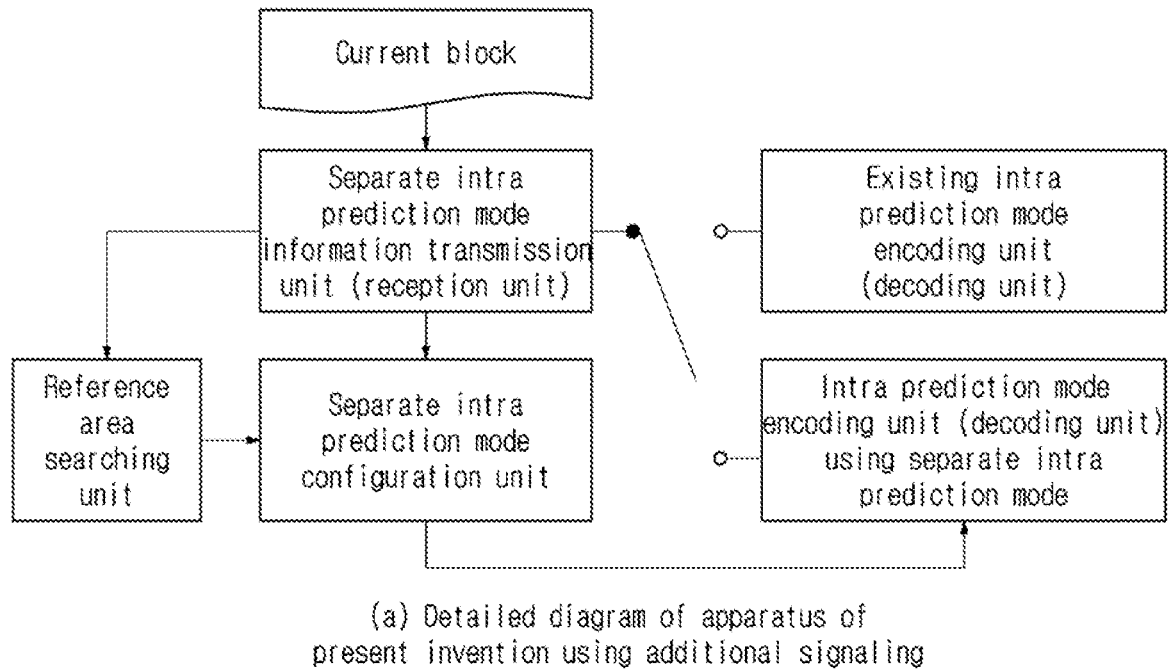
(a) Detailed diagram of apparatus of present invention using additional signaling
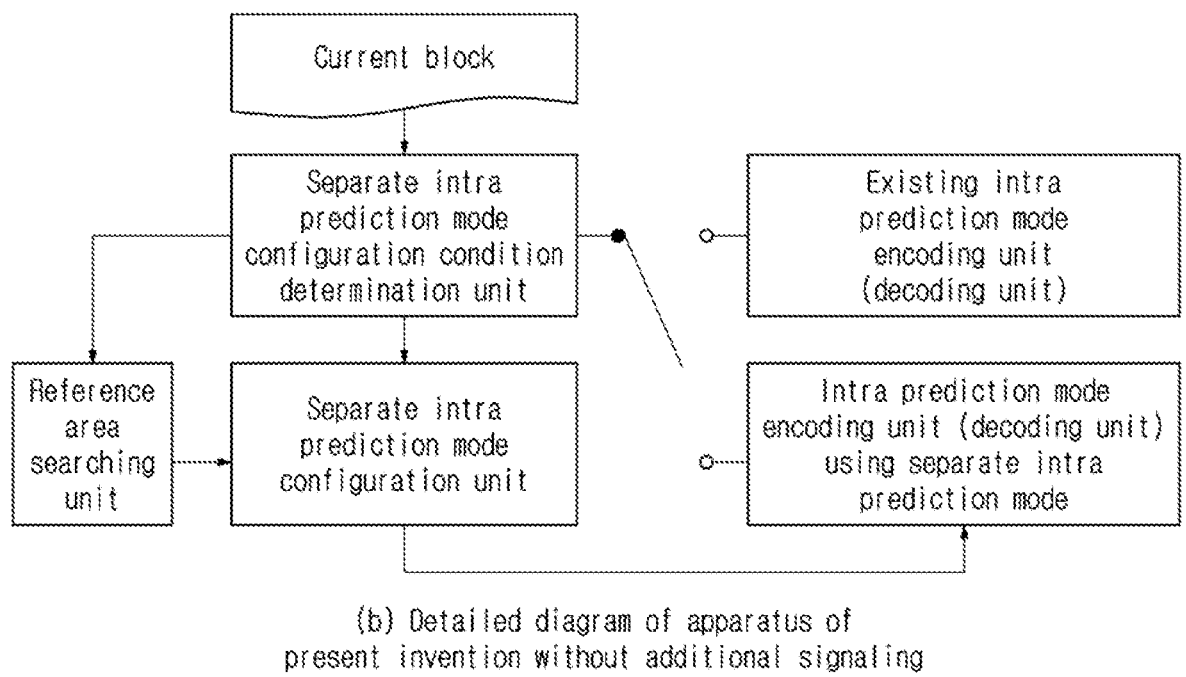
(b) Detailed diagram of apparatus of present invention without additional signaling

FIG. 32
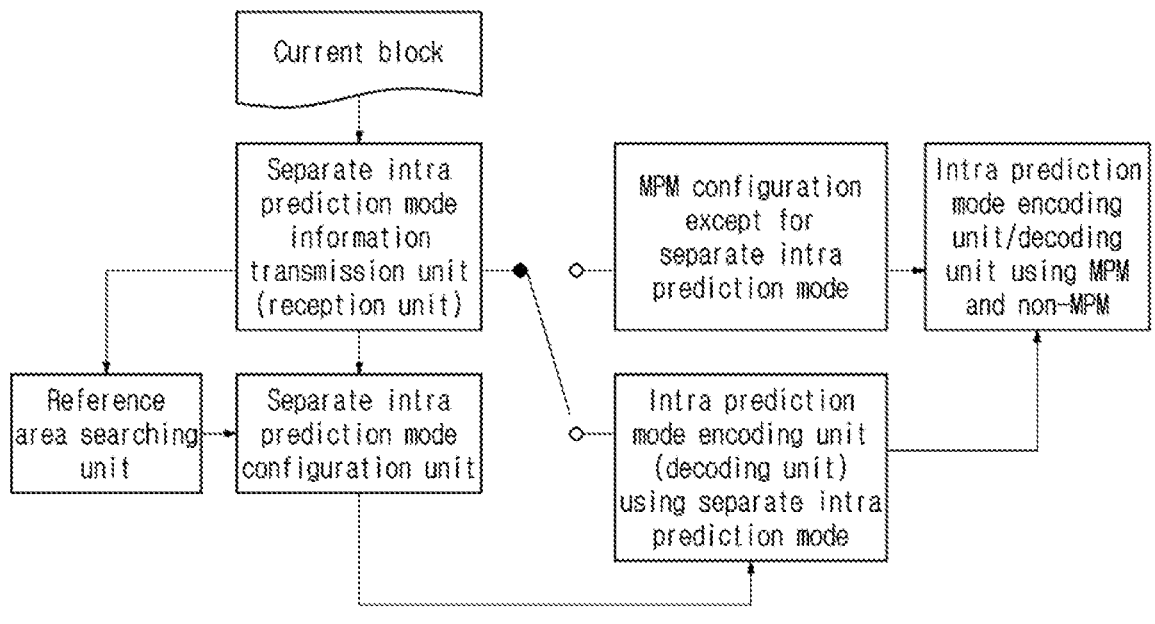
(a) Detailed diagram of apparatus of present invention using additional signaling
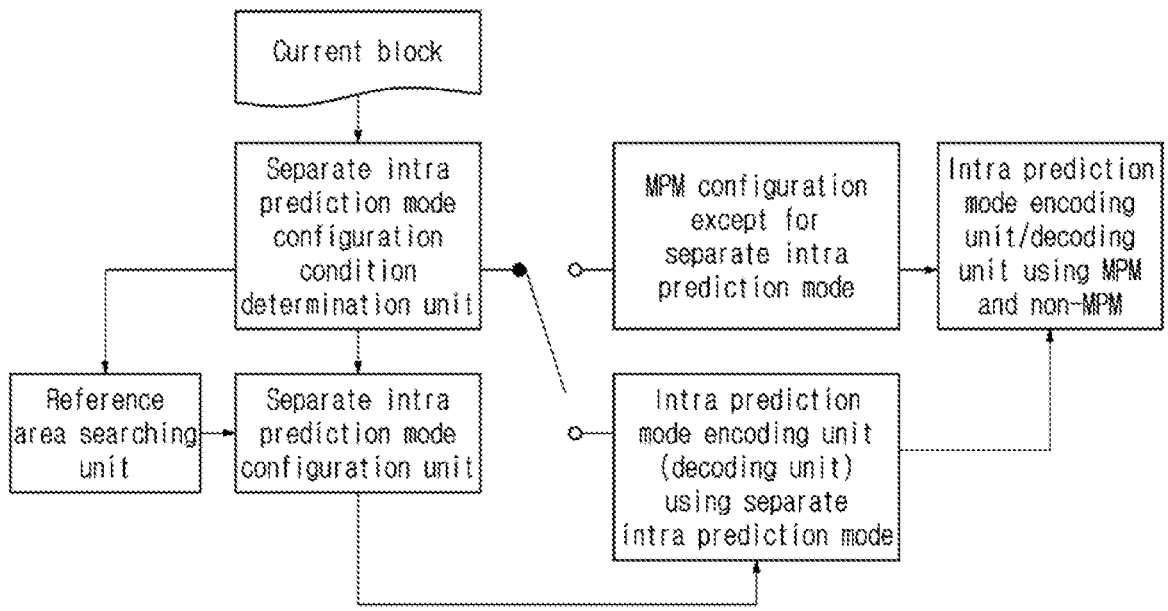
(b) Detailed diagram of apparatus of present invention without additional signaling

FIG. 34
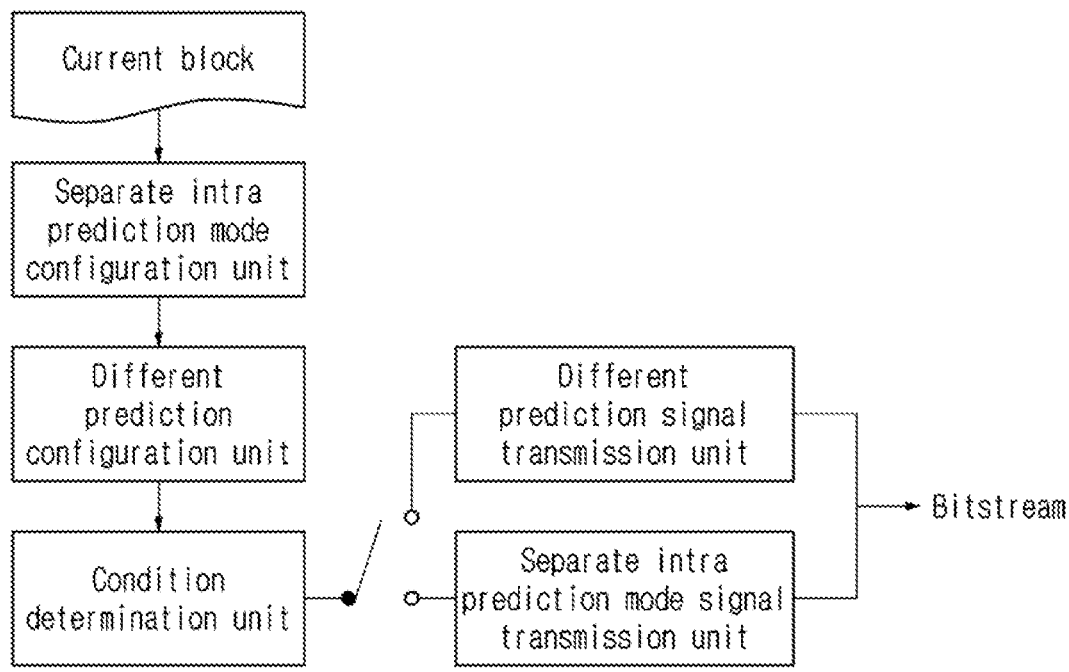
(a) encoding apparatus using separate intra prediction mode
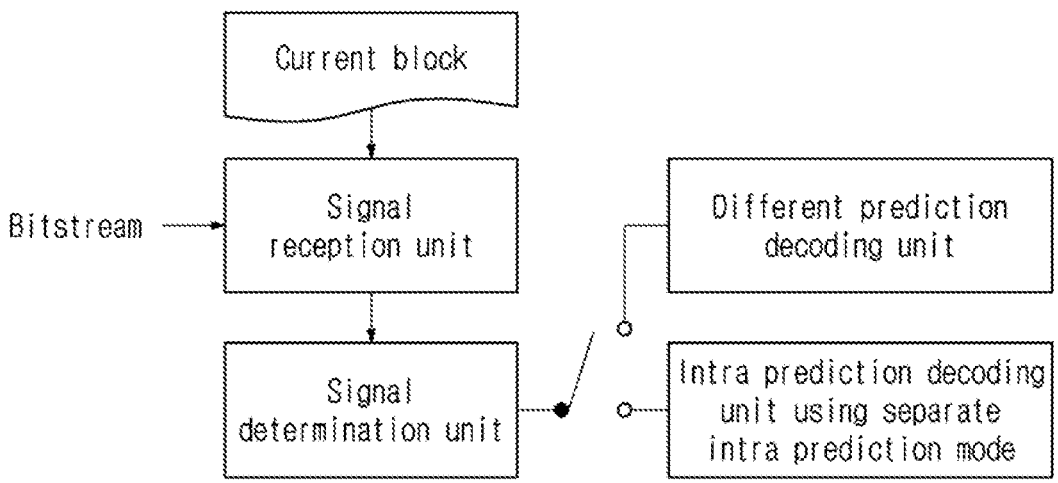
(b) decoding apparatus using separate intra prediction mode (a) encoder method when separate intra prediction mode is used (b) decoder method when separate intra prediction mode is used

FIG. 41
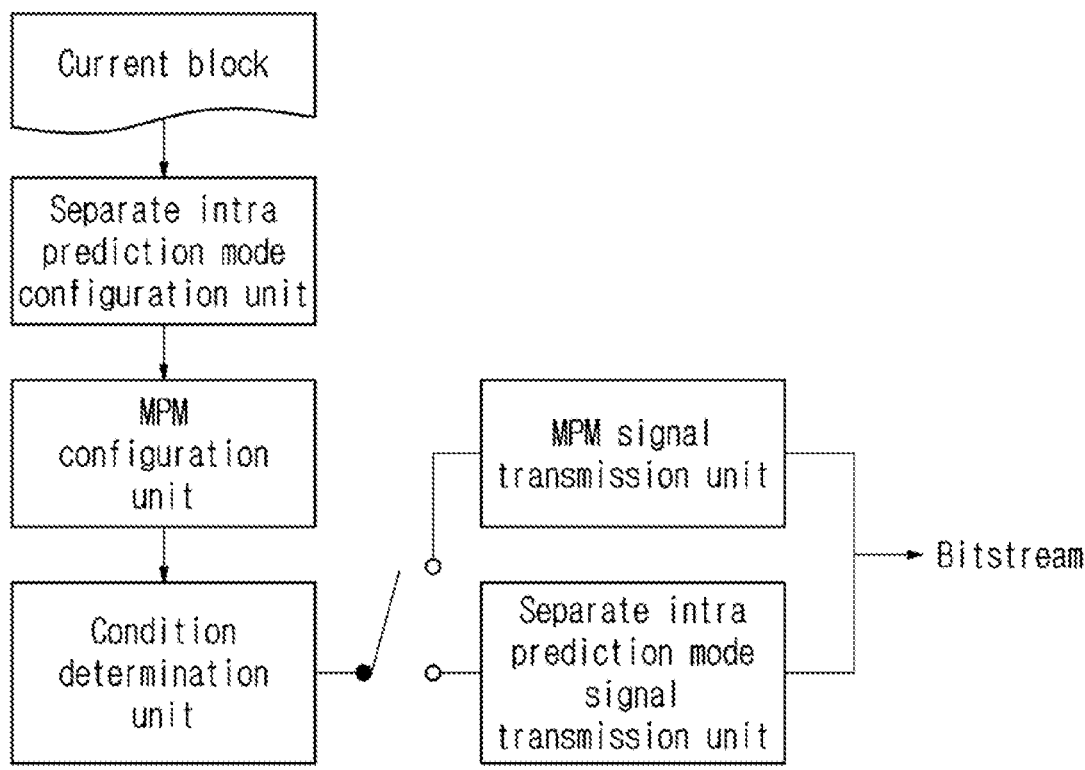
(a) encoder apparatus using separate intra prediction mode
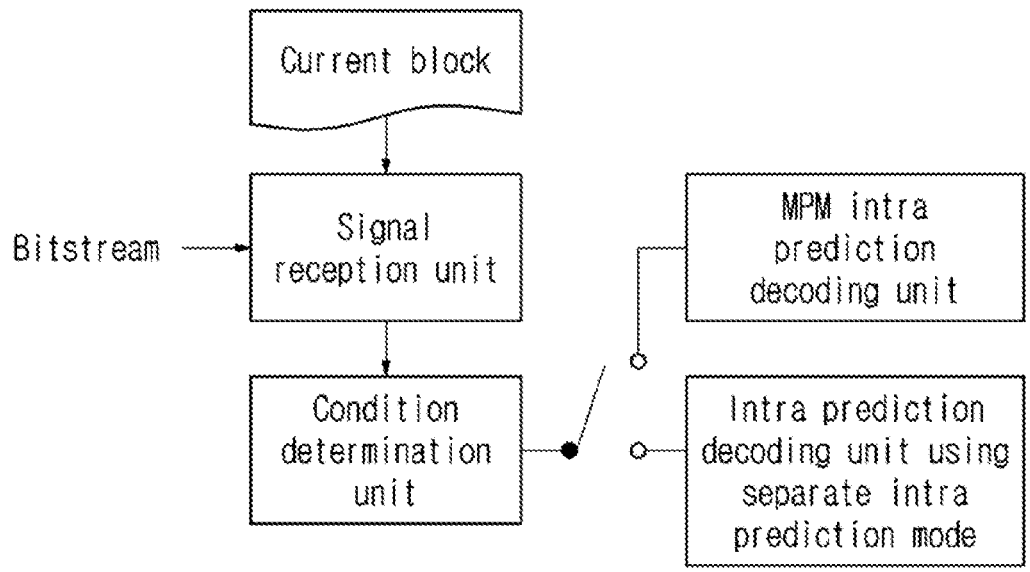
(b) decoder apparatus using separate intra prediction mode

FIG. 43
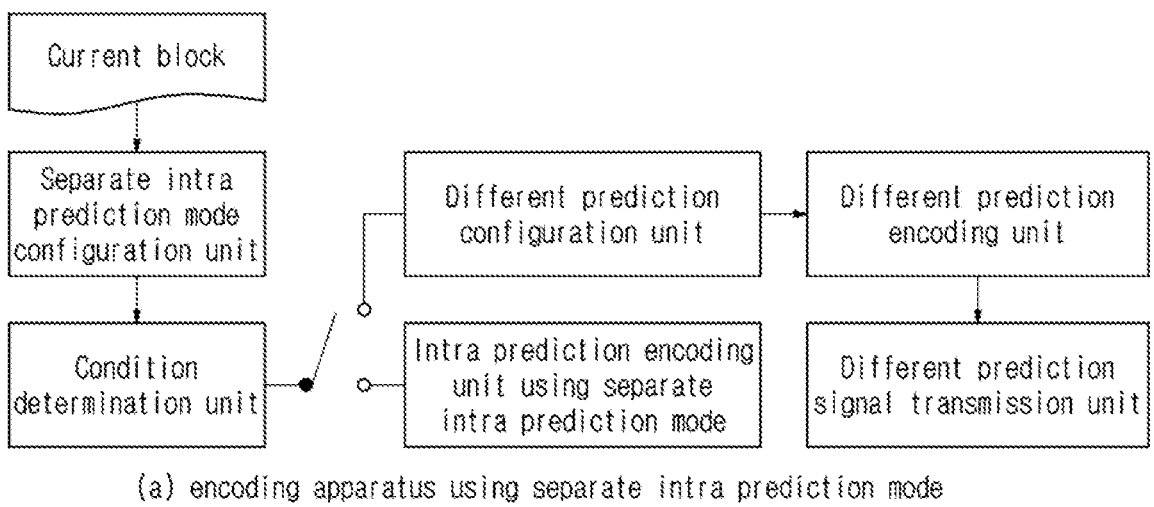
(a) encoding apparatus using separate intra prediction mode
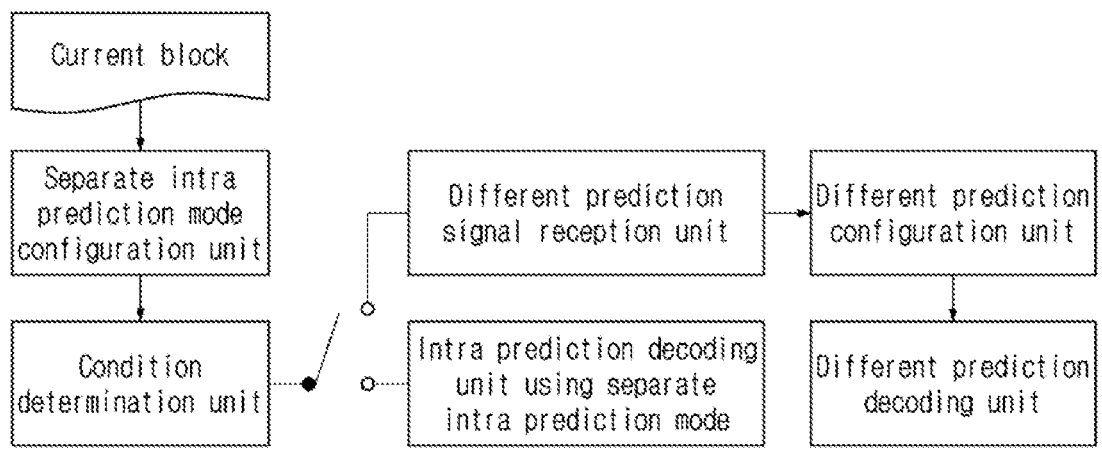
(b) decoding apparatus using separate intra prediction mode FIG. 45
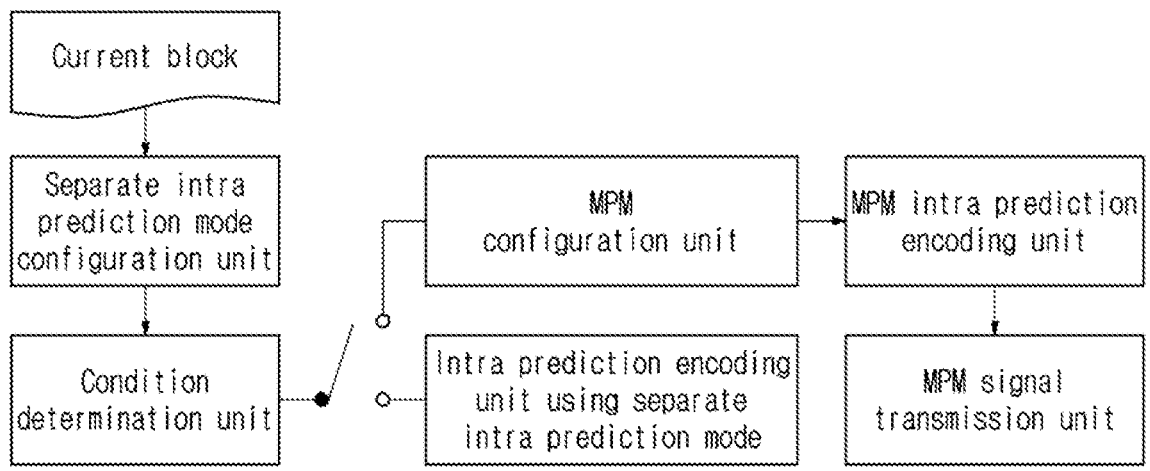
(a) encoding apparatus using separate intra prediction mode
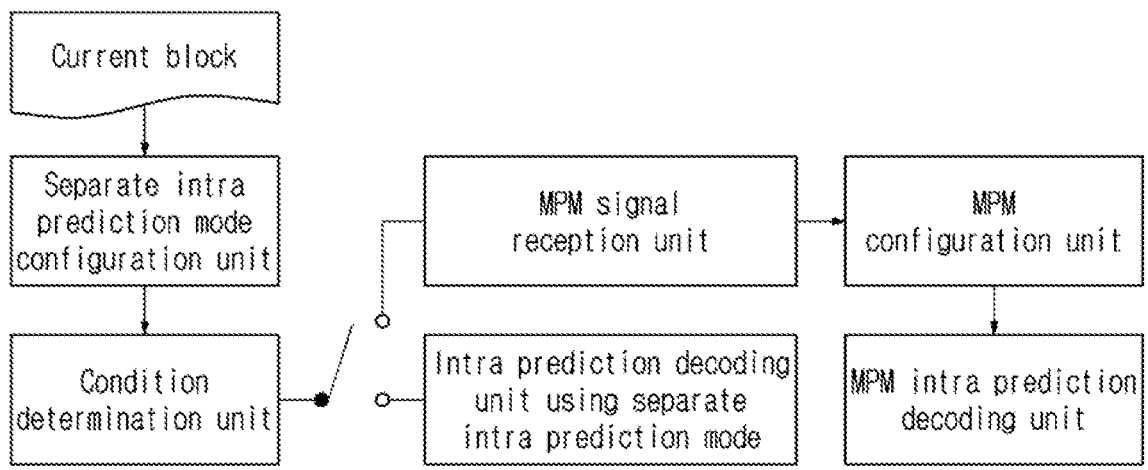
(b) decoding apparatus using separate intra prediction mode

METHOD AND DEVICE FOR SIGNALING PREDICTION MODE-RELATED SIGNAL IN INTRA PREDICTION

TECHNICAL FIELD

The present invention relates to an image encoding/decoding method and apparatus, and a recording medium for storing a bitstream. More particularly, the present invention relates to a method and apparatus for encoding/decoding an image based on an intra prediction mode, and a recording medium for storing a bitstream generated by the image encoding method or apparatus of the present invention.

BACKGROUND ART

Recently, a broadcast service having ultra high definition (UHD) resolution (3840×216) has been expanded not only in the country but also in the world. With development of shooting and editing technology, various video services such as panoramic videos or 360-degree videos are provided and thus the sizes of videos are gradually increasing. In line with this, Moving Picture Experts Group (MPEG) and Video Coding Experts Group (VCEG) jointly formed Joint Video Expert Team (JVET) and started standardization of Versatile Video Coding (VVC)/H.266, which is a next-generation video codec suitable for compression of various video images, on April, 2018.

DISCLOSURE

Technical Problem

An object of the present invention is to provide an image encoding/decoding method and apparatus with improved compression efficiency.

Another object of the present invention is to provide an image encoding/decoding method and apparatus using an intra prediction mode with improved compression efficiency.

Another object of the present invention is to provide a recording medium for storing a bitstream generated by an image encoding/decoding method or apparatus according to the present invention.

Technical Solution

According to the present invention, a method of decoding an image includes decoding at least one of prediction mode information of a neighbor block of a current block and length information of the current block, deriving an intra prediction mode of the current block into a predetermined mode using the decoded information, and reconstructing the current block based on the intra prediction mode of the current block. A prediction mode of the neighbor block may be at least one of an intra block copy mode (IBC) and a palette mode. The predetermined mode may be a DC mode. The deriving into the predetermined mode may include configuring a separate intra prediction mode when a prediction mode of the neighbor block is a first mode, and deriving the intra prediction mode of the current block into the predetermined mode using the separate intra prediction mode. The first mode may be at least one of an intra block copy mode (IBC) and a palette mode, and the separate intra prediction mode may be at least one of a DC mode, a Planar mode and a directional mode.

The neighbor block may be at least one of a left block and an upper block adjacent to the current block.

The length information of the current block may include a width and height of the current block, and the deriving into the predetermined mode may include deriving the number of intra prediction modes applicable to the current block based on the width and height of the current block.

The intra prediction mode applicable to the current block may be a matrix-based intra prediction (MIP) based intra prediction mode.

The method may further include decoding information indicating that the intra prediction mode applicable to the current block indicates the MIP based intra prediction mode.

In the deriving into the predetermined mode, when the width of the current block is 4 and the height of the current block is 4, the number of intra prediction modes applicable to the current block may be 15.

According to the present invention, a method of encoding an image includes determining prediction mode information of a neighbor block of a current block, deriving an intra prediction mode of the current block into a predetermined mode using the prediction mode information of the neighbor block and length information of the current block, and encoding the current block based on the intra prediction mode of the current block.

A prediction mode of the neighbor block may be at least one of an intra block copy mode (IBC) and a palette mode.

The predetermined mode may be a DC mode.

The deriving into the predetermined mode may include configuring a separate intra prediction mode when a prediction mode of the neighbor block is a first mode, and deriving the intra prediction mode of the current block into the predetermined mode using the separate intra prediction mode.

The first mode may be at least one of an intra block copy mode (IBC) and a palette mode, and the separate intra prediction mode may be at least one of a DC mode, a Planar mode and a directional mode.

The neighbor block may be at least one of a left block and an upper block adjacent to the current block.

The length information of the current block may include a width and height of the current block, and the deriving into the predetermined mode may include deriving the number of intra prediction modes applicable to the current block based on the width and height of the current block.

The intra prediction mode applicable to the current block may be a matrix-based intra prediction (MIP) based intra prediction mode.

The method may further include encoding information indicating that the intra prediction mode applicable to the current block indicates the MIP based intra prediction mode.

A recording medium according to the present invention may store a bitstream generated by the image encoding method according to the present invention.

Advantageous Effects

According to the present invention, it is possible to provide an image encoding/decoding method and apparatus with improved compression efficiency.

According to the present invention, it is possible to provide an image encoding/decoding method and apparatus using an intra prediction mode with improved compression efficiency.

According to the present invention, it is possible to provide an image encoding/decoding method and apparatus with improved compression efficiency, by separately signaling an intra prediction mode related signal.

According to the present invention, it is possible to provide a recording medium for storing a bitstream generated by an image encoding/decoding method or apparatus according to the present invention.

DESCRIPTION OF DRAWINGS

FIG. 9a is a view showing intra prediction modes of HEVC/H.265 and VVC/H.266 according to an embodiment of the present invention.

FIG. 17 is a view illustrating a method of configuring a separate intra prediction mode as a predefined intra prediction mode in an encoder/decoder according to an embodiment of the present invention.

FIG. 20 is a view illustrating a method of configuring a separate intra prediction mode using a predefined intra prediction mode in an encoder/decoder according to another embodiment of the present invention.

FIG. 21 is a block diagram of an apparatus for configuring a separate intra prediction mode using a predefined intra prediction mode according to another embodiment of the present invention.

FIG. 22 is a view illustrating the basic concept of a method of configuring a separate intra prediction mode by referring to a reference area according to an embodiment of the present invention.

FIG. 28 is a block diagram of an apparatus for configuring a separate intra prediction mode using a reference area according to an embodiment of the present invention.

FIG. 32 is a block diagram of an encoding/decoding apparatus based on a separate intra prediction mode configuration according to an embodiment of the present invention.

FIG. 34 is a block diagram of an apparatus for omitting a different prediction process based on signaling of a separate intra prediction mode related signal according to an embodiment of the present invention.

FIG. 41 is a block diagram of an apparatus for omitting an MPM process based on whether a separate intra prediction mode is used, according to an embodiment of the present invention.

FIG. 43 is a block diagram of an apparatus for omitting a different prediction process based on a separate intra prediction mode configuration according to an embodiment of the present invention.

FIG. 45 is a block diagram of an apparatus for omitting an MPM intra prediction process based on a separate intra prediction mode configuration according to an embodiment of the present invention.

MODE FOR INVENTION

Figure 1:
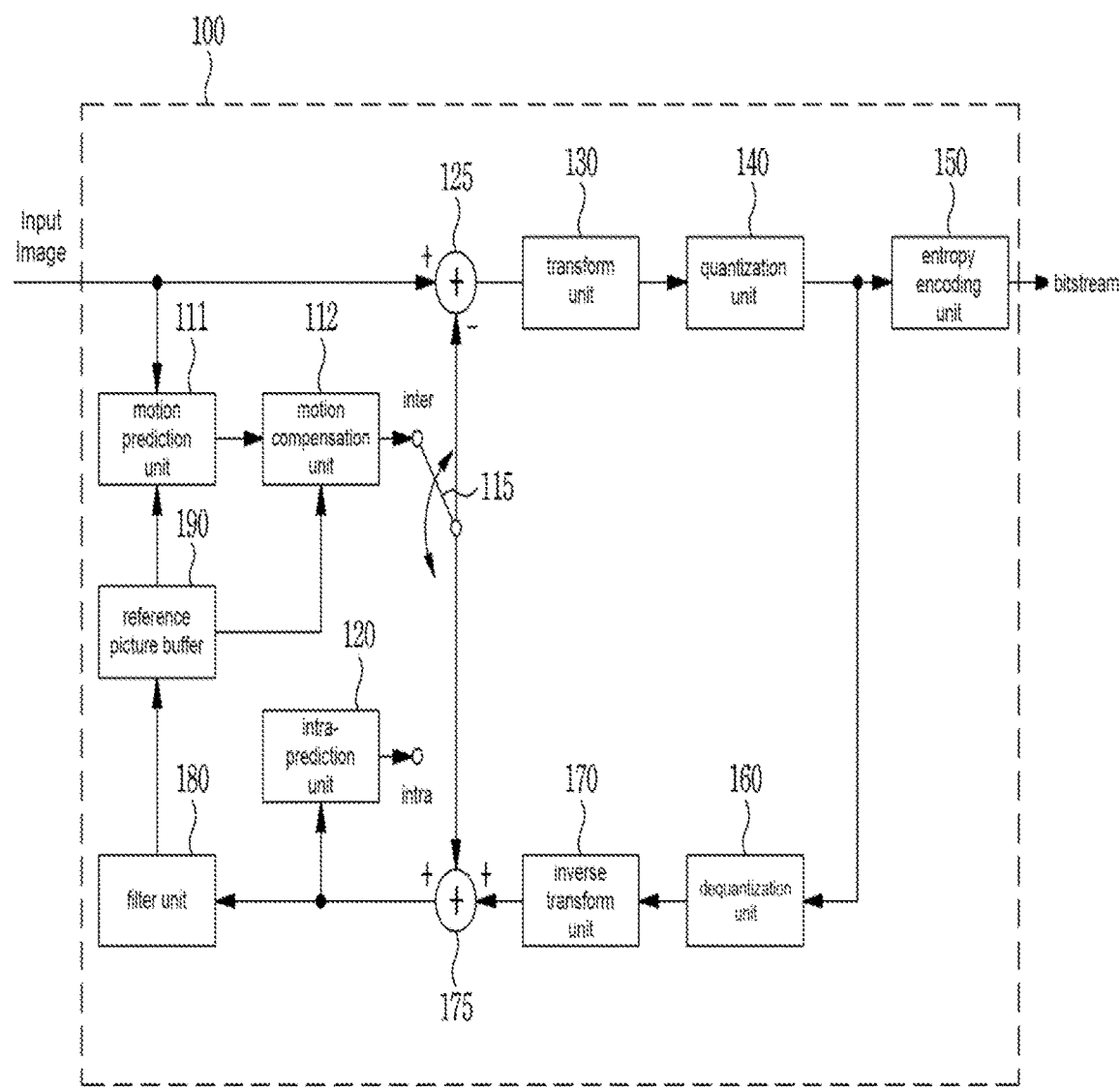
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

DESCRIPTION OF TERMS

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{B_d}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
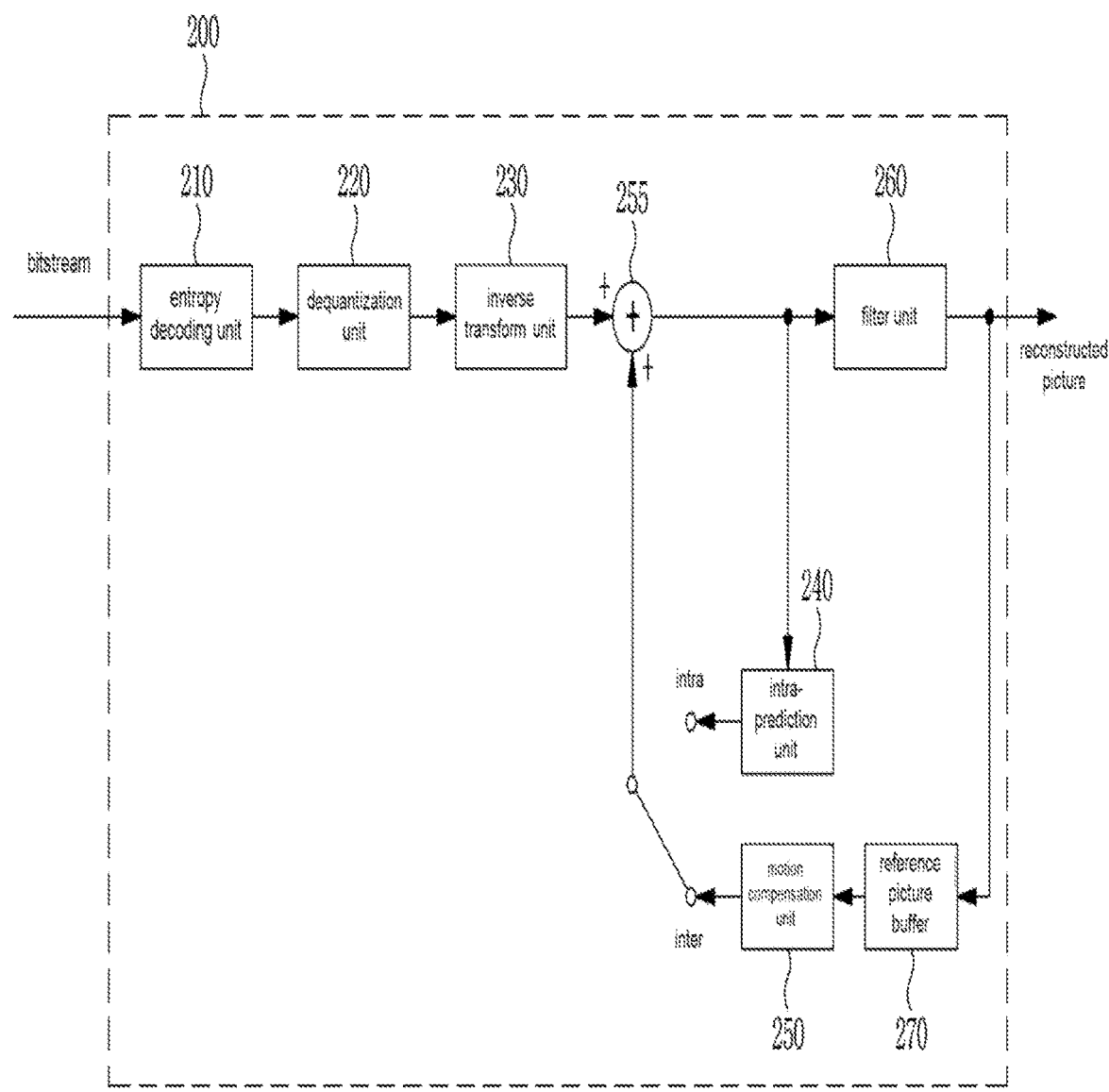
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
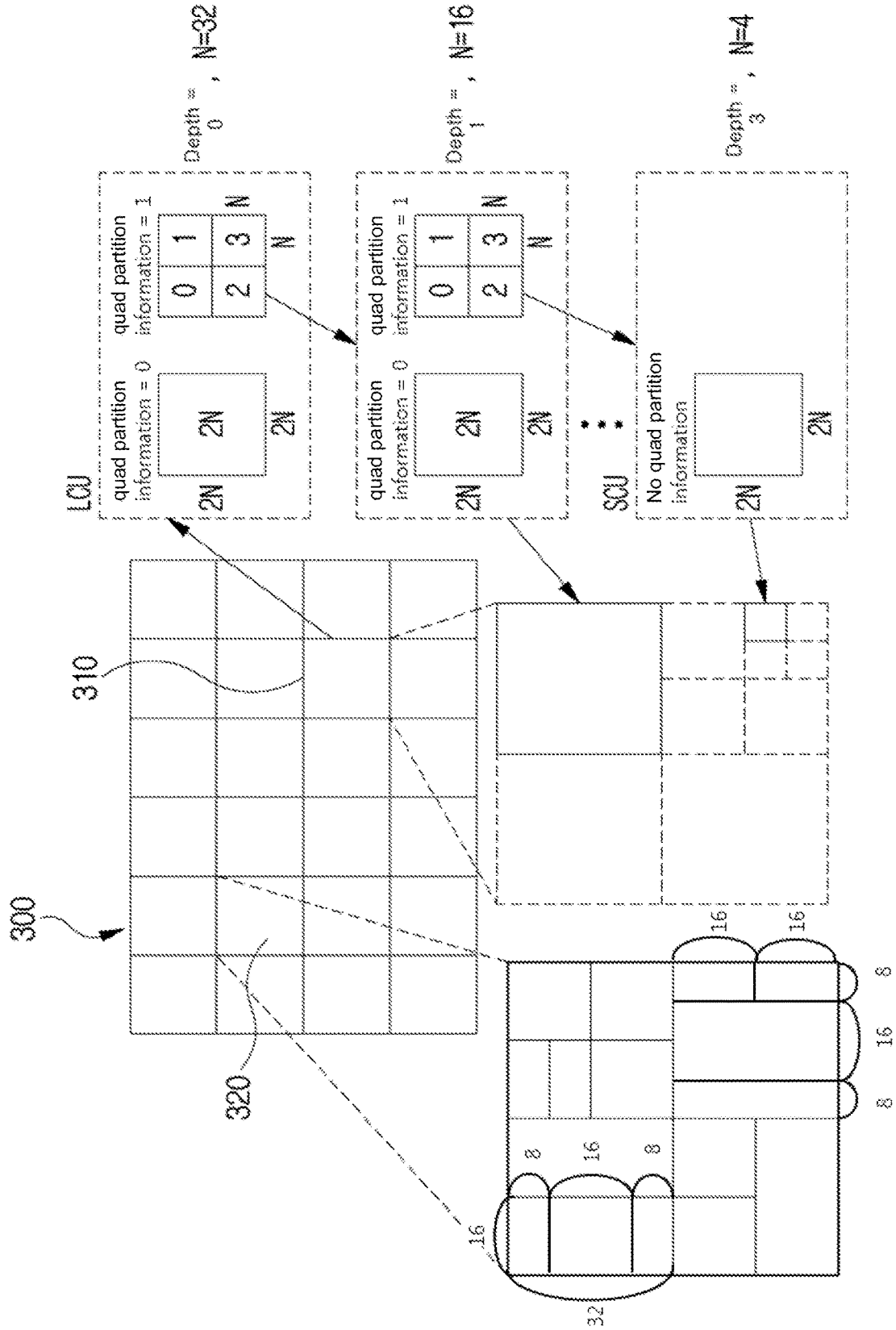
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
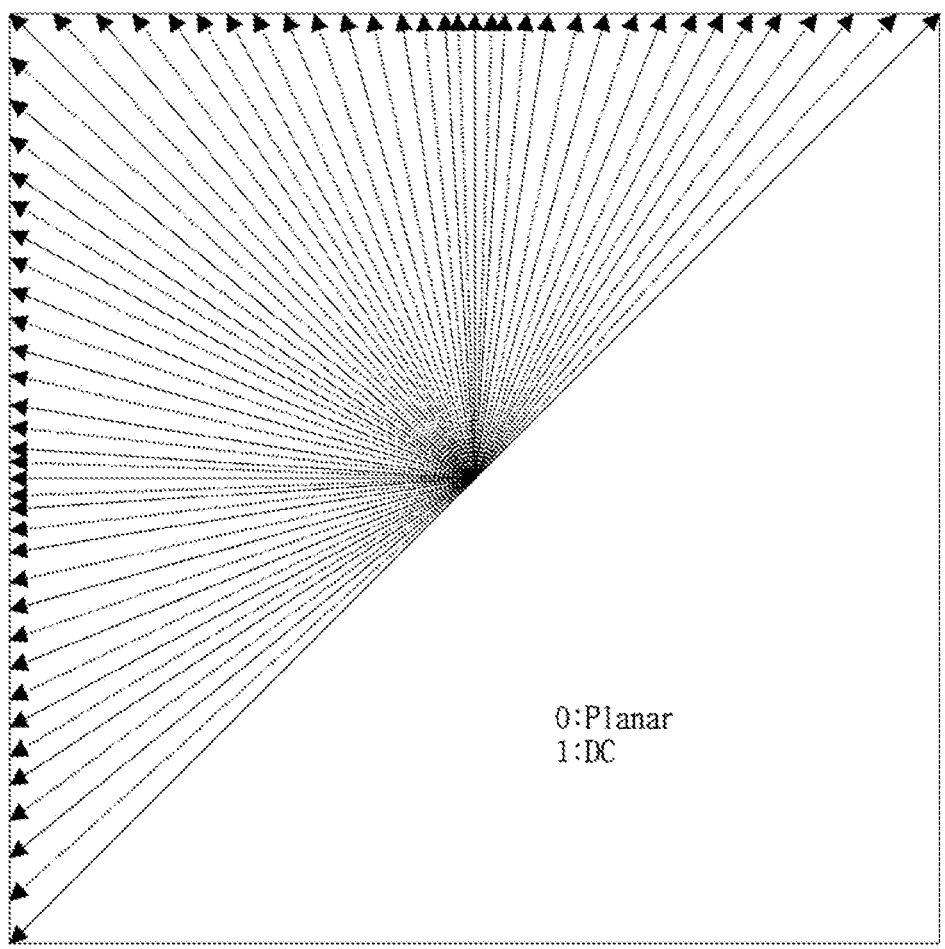
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
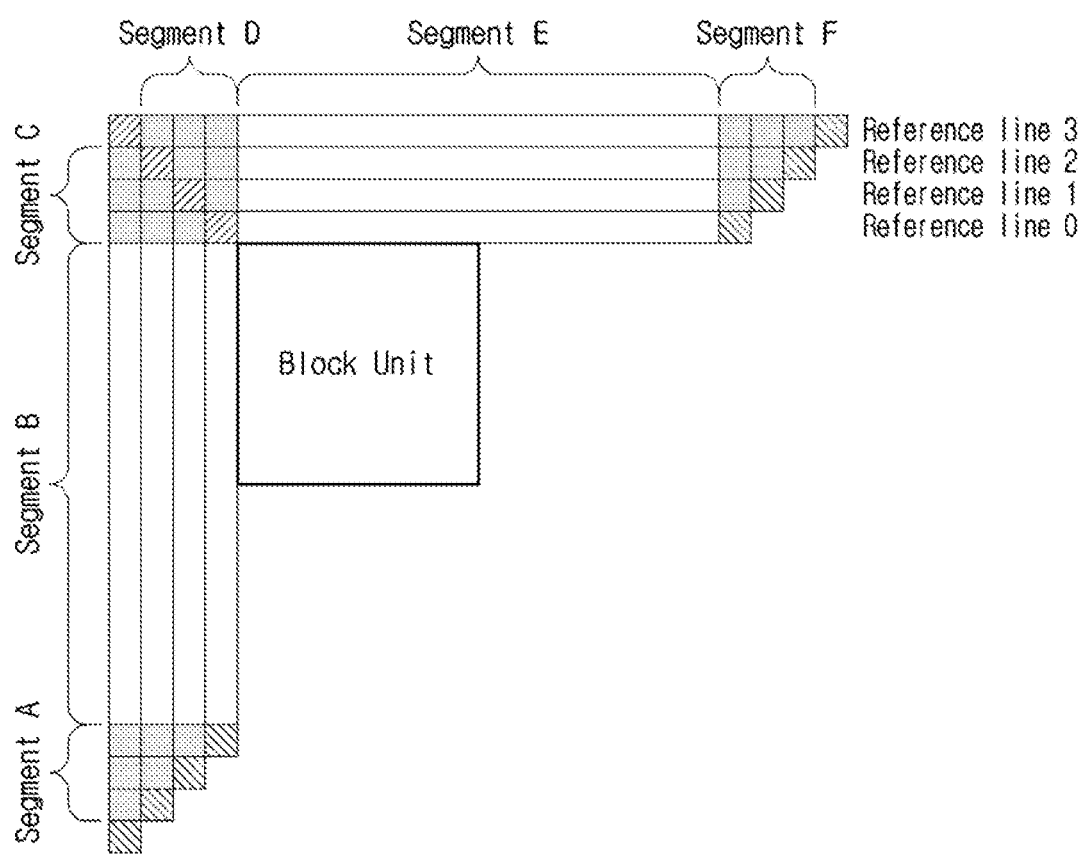
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
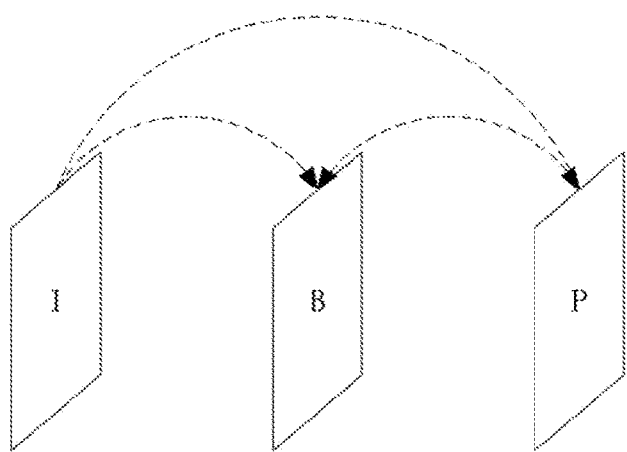
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
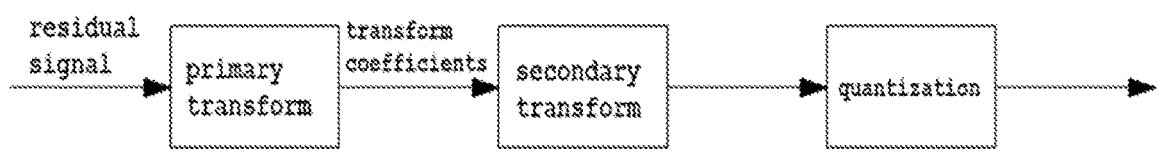
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loéve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8:
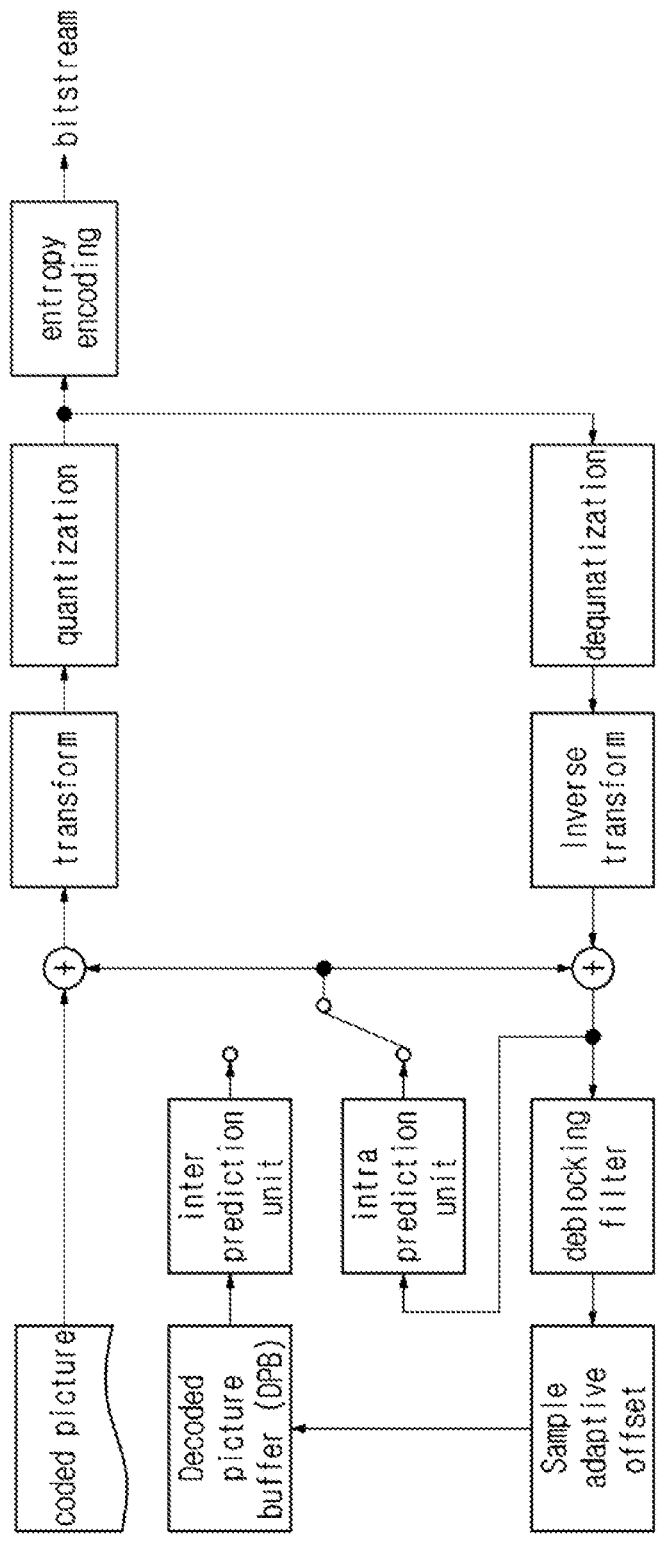
FIG. 8 is a block diagram showing the configuration of another embodiment of an encoding apparatus, to which the present invention is applied.

FIG. 8 is a block diagram showing the configuration of another embodiment of an encoding apparatus, to which the present invention is applied.

Image compression technology refers to encoding considering the statistical characteristics of an input image and includes predictive coding technology for removing temporal and spatial redundancy, transform coding technology based on cognitive vision, quantization technology, entropy coding technology, and filter technology for improving prediction efficiency. A coder receives information of picture units from an original video image for encoding and the received original image is referred to as a coded picture. Predictive coding technology refers to technology for predicting information using spatial similarity between inner pixels of a coded picture to be coded and temporal similarity between a coded picture and a reference picture previously decoded at a previous time. The former is referred to as intra prediction and the latter is referred to as inter prediction.

Video image compression technology is based on the principle of reducing the size of image data by removing overlapping signals from an image signal. The video image compression technology includes inter prediction for finding overlapping information between image frames and using the overlapping information for prediction of an image signal in order to remove the overlapping image signal on a time axis and intra prediction for finding overlapping information in an image frame and using the overlapping information for prediction of an image signal in order to remove the overlapping image signal in a space. In image compression, a video screen is divided into blocks each having a certain size to perform prediction, for error robustness and efficient memory use, and a block in which prediction is currently being performed in a video compression and reconstruction process is referred to as a current block. In the image signal prediction of the image compression technology, the pixel of the current block is predicted through various methods using the pixel of a block adjacent to the image signal of a current block and a signal of an image decoded before the current block. In the image compression process, since there is a possibility that a region having the exactly same image signal as the current block is not temporally or spatially present, a residual signal corresponding to a prediction error may be generated when the image signal is predicted. Accordingly, an encoder may transmit, to a decoder, prediction information of a most efficient prediction method and a residual signal generated after prediction, and the decoder may receive the prediction method and the residual signal from the encoder and perform image signal decoding. Accordingly, in the compression process of the image signal, it is advantageous in terms of image compression efficiency that the prediction information transmitted to the decoder is minimized while the residual signal transmitted to the decoder is minimized.

Figure 9A:
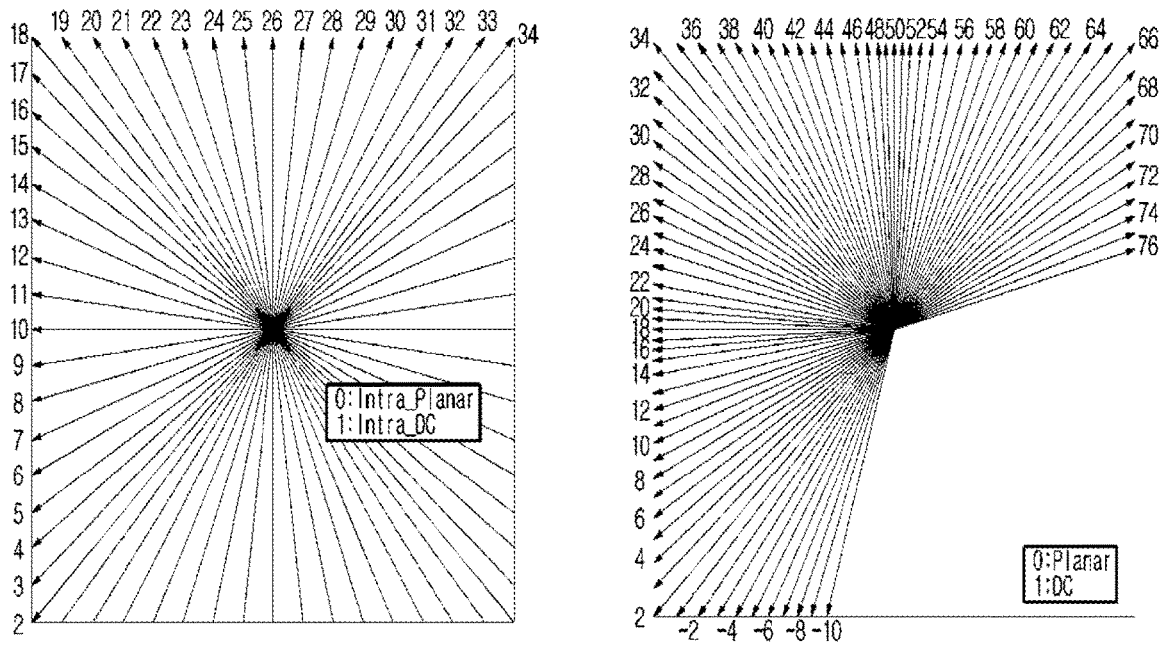
FIG. 9a is a view illustrating another example of an intra prediction process.
Figure 9B:
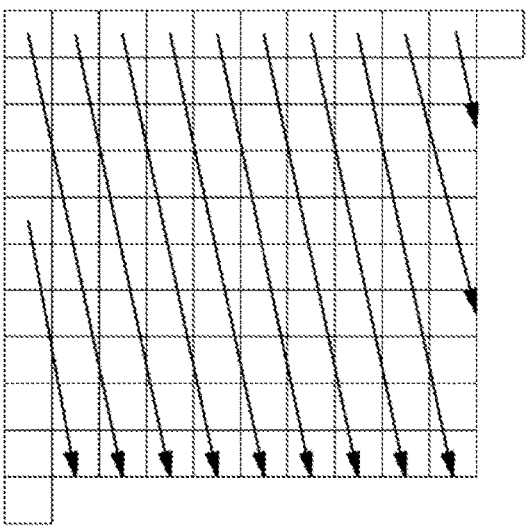
FIG. 9b is a view illustrating an intra prediction mode direction and intra prediction according to an embodiment of the present invention.

FIG. 9a is a view illustrating another example of an intra prediction process. Referring to FIG. 9a, intra prediction modes of HEVC/H.265 and VVC/H.266 are shown. In addition, FIG. 9b is a view illustrating an intra prediction mode direction and intra prediction according to an embodiment of the present invention.

In intra prediction of image compression technology, prediction of image signal for the pixel of a current block may be performed using neighbor block pixels adjacent to the current block. In order to minimize a residual signal in intra prediction, the encoder may calculate encoding efficiency from the neighbor block pixels using various prediction methods and select an encoding method having an optimal encoding efficiency. As in the example of FIG. 9a, in intra prediction of the image compression technology, DC prediction, PLANAR prediction or directional intra prediction may be used and the image signal of a current block pixel may be predicted from neighbor pixels. In addition, FIG. 9b shows an example of a prediction method according to the directional mode of intra prediction. An average value of pixels adjacent to the current block is used in the case of DC prediction, and predetermined operation may be performed with respect to adjacent pixel values of the current block in the case of PLANAR prediction, thereby performing image signal prediction of the current block pixel.

A digital signal having $\lceil \log N \rceil$ bits or more is required to represent N values in image compression. Here, $\lceil \log N \rceil$ may mean the smallest integer among integers greater than or equal to log N. For example, a digital signal having at least 6 bits is required to represent 64 numbers and a digital signal having at least 5 bits is required to represent 30 numbers. In intra prediction of image compression, as a method of reducing the amount of data for representing the intra prediction mode, there is a method of bringing an intra prediction mode from neighbor blocks of a current block, configuring most probable mode (MPM) candidates as a list composed in an intra prediction mode, and transmitting a corresponding index when the same intra prediction mode as the current block is present in the MPM candidates. The MPM candidates may be configured by bringing the intra prediction mode from the neighbor blocks of the current block, may be configured through a series of operations from the intra prediction mode of the neighbor block, and may be filled with a predetermined intra prediction mode when there is no intra prediction of an available neighbor block. Generally, since an MPM candidate list is configured such that the number of MPM candidate lists is less than the number of types of intra prediction modes, data for representing an MPM index requires less bits than data for representing the number of types of intra prediction modes. Therefore, compression efficiency is improved.

In intra prediction using the MPM candidates, both an MPM flag for transmitting presence of an intra prediction mode of a current block in an MPM candidate list and an MPM index corresponding to the index of the same intra prediction mode in the MPM candidate list when the intra prediction mode of the current block is present in the MPM candidate list should be transmitted. However, statistically, since an intra prediction mode is likely to equally occur between adjacent blocks in intra prediction, the intra prediction mode of the current block selected in the MPM candidate list is likely to be an intra prediction mode from the neighbor block. Accordingly, a method of omitting transmission of the MPM flag and the MPM index when the intra prediction mode is used may be used, by separately signaling an intra prediction mode having a high probability of being equal to the intra prediction mode of the current block. In addition, a method of reducing the total number of signaling bits by configuring the number of signaling bits of a flag corresponding to whether a specific intra prediction mode is available to be less than the number of signaling bits when both the MPM flag and the MPM index are transmitted. Herein, the specific intra prediction mode may be a Planar mode, a DC mode, an Angular mode, a mode indicating whether a neighbor block of a current block is used, etc. In addition, in the present disclosure, by not adding the specific intra prediction mode separately signaled in an MPM candidate list configuration to an MPM candidate list, it is possible to reduce the length of the MPM candidate list and to reduce the maximum size of the MPM index, thereby increasing signaling efficiency.

According to an embodiment, it is possible to provide an encoding/decoding method and apparatus in which a different prediction process and an intra prediction mode derivation process or signaling are omitted, by configuring a separate intra prediction mode. Herein, the separate intra prediction mode may mean a subset of the prediction modes which may be configured in the intra prediction mode. In addition, a single or plurality of separate intra prediction modes may be configured. In addition, whether to use the separate intra prediction mode may be derived using a method defined in the encoder/decoder according to a specific condition or may be implemented in the form of signaling a signal indicating whether to use the separate intra prediction mode. Hereinafter, the separate intra prediction mode will be described in detail.

Figure 10:
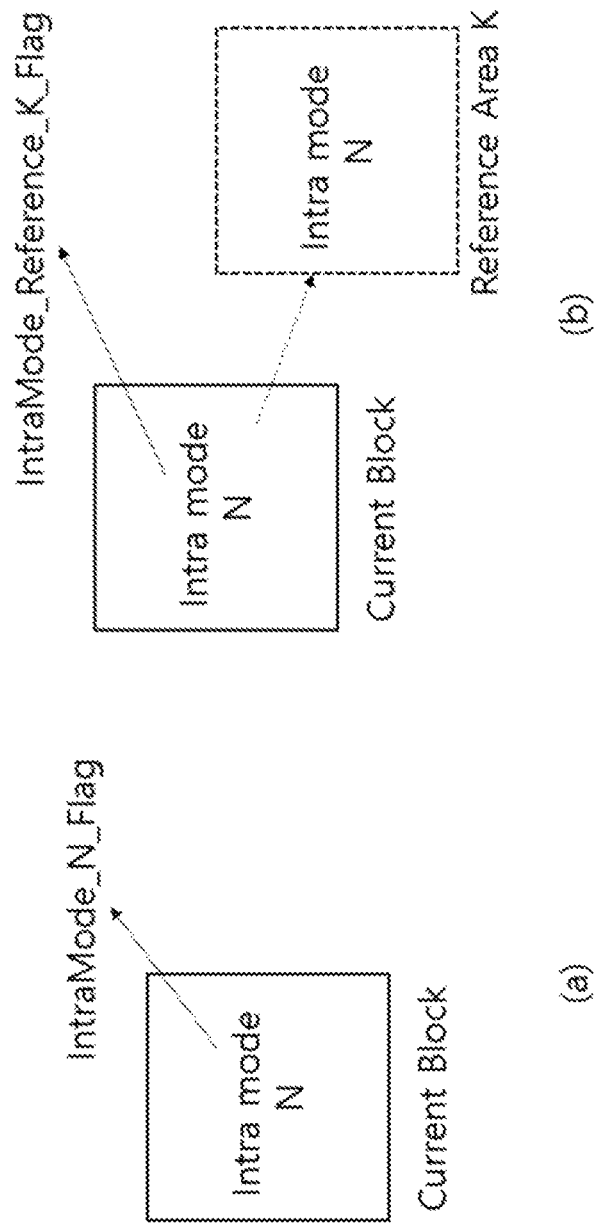
FIG. 10 is a view illustrating the basic concept of a method of encoding/decoding an intra prediction mode by configuring a separate intra prediction mode according to an embodiment of the present invention.

FIG. 10 is a view illustrating the basic concept of a method of encoding/decoding an intra prediction mode by configuring a separate intra prediction mode according to an embodiment of the present invention.

In (a) of FIG. 10, whether the intra prediction mode of the current block is N may be determined by configuring a separate signaling IntraMode_N_Flag for an arbitrary intra prediction mode N. Herein, the intra prediction mode N may be all intra prediction modes which may be identically predefined and used between the encoder and the decoder, such as a Planar_mode, a DC_mode and an Angular_mode. The IntraMode_N_Flag is an example of a flag indicating whether the intra prediction mode of the current block may be used as the intra prediction mode N, the name thereof is arbitrary for convenience of description and a signal having another name may be configured. Meanwhile, since the IntraMode_N_Flag corresponds to a condition indicating whether the intra prediction mode of the current block may be used as the intra prediction mode N, for example, the condition may mean a predetermined prediction method separately from whether the intra prediction mode of the current block is N. For example, the IntraMode_N_Flag may mean whether the prediction method of the current block is Matrix-based Intra Prediction (MIP).

For example, when the IntraMode_N_Flag is MIP (that is, when the IntraMode_N_Flag is true or when the intra prediction method of the current block is MIP), the intra prediction mode of the current block may be determined as N. Here, N may be a Planar mode.

In (a) of FIG. 10, the encoder may signal and transmit the IntraMode_N_Flag of true to the decoder when the intra prediction mode of the current block is N, and the decoder may decode the IntraMode_N_Flag and reconstruct the intra prediction mode of the current block into N when the IntraMode_N_Flag is true.

In (b) of FIG. 10, by configuring an IntraMode_Reference_K_Flag for determining whether to refer to the intra prediction mode of an arbitrary reference area K in order to predict the intra prediction mode of the current block, it is possible to indicate whether to reference to the K area of the current block. Here, the reference area K may be all areas which may be identically referred to between the encoder and the decoder, such as an arbitrary area in an adjacent block or a neighbor block of the current block, a current picture or a reference picture. Meanwhile, the IntraMode_Reference_K_Flag is an example of a flag indicating whether to use the reference area K, the name thereof is arbitrary for convenience of description and a signal having another name may be configured. In (b) of FIG. 10, the encoder may signal and transmit, to the decoder, the IntraMode_Reference_K_Flag of true as a flag indicating whether to refer to the reference area K when the intra prediction mode of the reference area K is N and matches the intra prediction mode N of the current block, and the decoder may decode the IntraMode_Reference_K_Flag and reconstruct the intra prediction mode N by referring to the intra prediction mode of the current block from the K area when the IntraMode_Reference_K_Flag is true. Here, the intra prediction mode N may be all intra prediction modes which may be identically predefined and used between the encoder and the decoder, such as a Planar_mode, a DC_mode, an Angular_mode, an MIP mode, etc.

Figure 11:
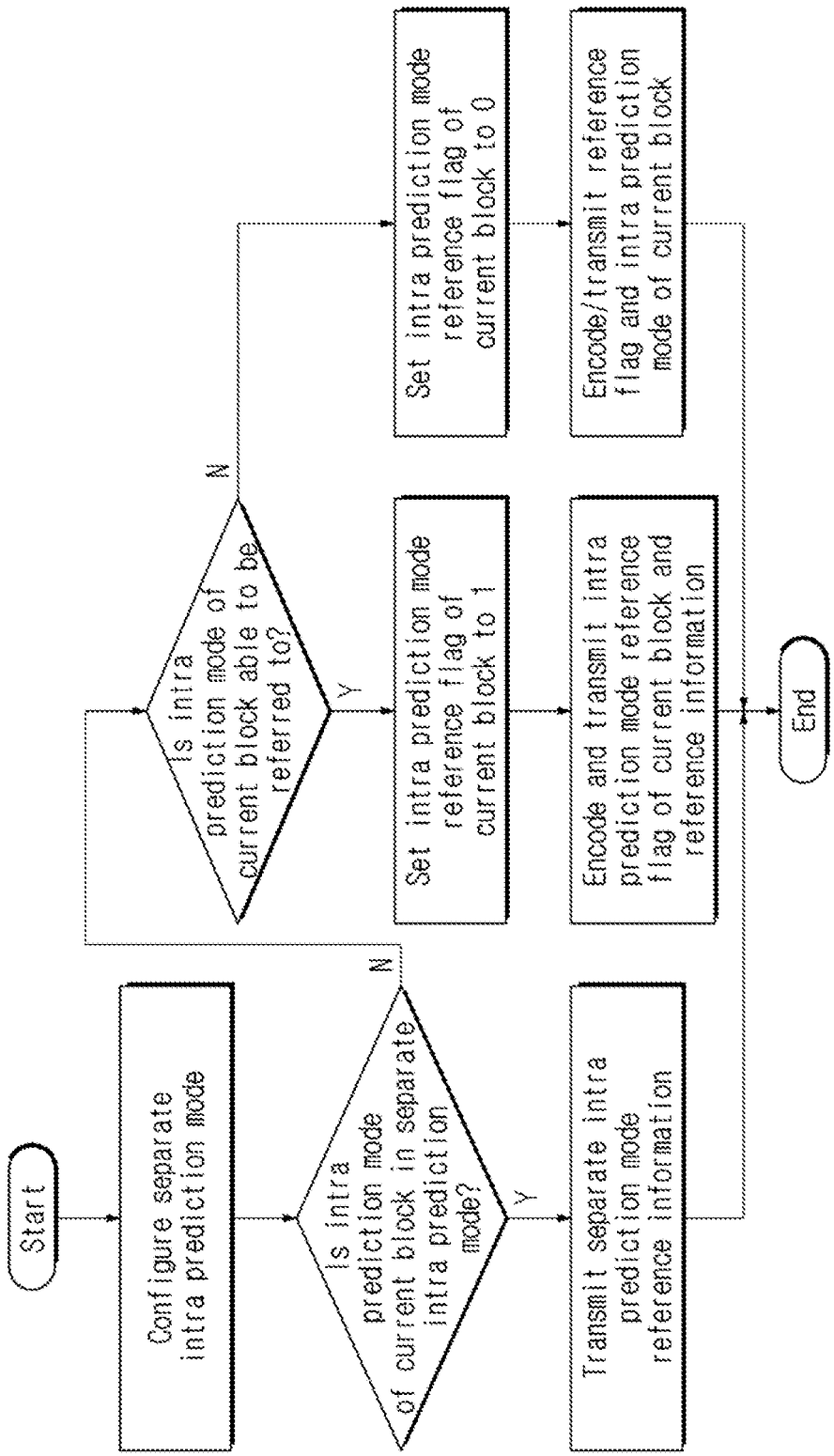
FIG. 11 is a view illustrating a method of encoding an intra prediction mode by configuring a separate intra prediction mode according to an embodiment of the present invention.

FIG. 11 is a view illustrating a method of encoding an intra prediction mode by configuring a separate intra prediction mode according to an embodiment of the present invention.

Referring to FIG. 11, the encoder may configure and compare a separate intra prediction mode with the intra prediction mode of the current block and transmit the reference information of the separate intra prediction mode when the intra prediction mode of the current block is present in the separate intra prediction mode. Here, a single or plurality of separate intra prediction modes may be configured. The encoder may configure and compare the separate intra prediction mode with the intra prediction mode of the current block and perform encoding of the intra prediction mode of the current block using an existing intra prediction mode when the intra prediction mode of the current block is not present in the separate intra prediction mode.

In the existing intra prediction mode, the intra prediction mode reference flag of the current block may mean a flag indicating whether to use each of all algorithms able to be referred to when the intra prediction of the current block is encoded. In addition, there is a single or plurality of flags, for example, an MPM flag. In addition, in the existing intra prediction mode, the intra prediction mode reference information of the current block may mean information required for encoding for all algorithms which may be referred to when the intra prediction of the current block is encoded. In addition, there is a single or plurality of pieces of reference information, for example, an MPM index.

Figure 12:
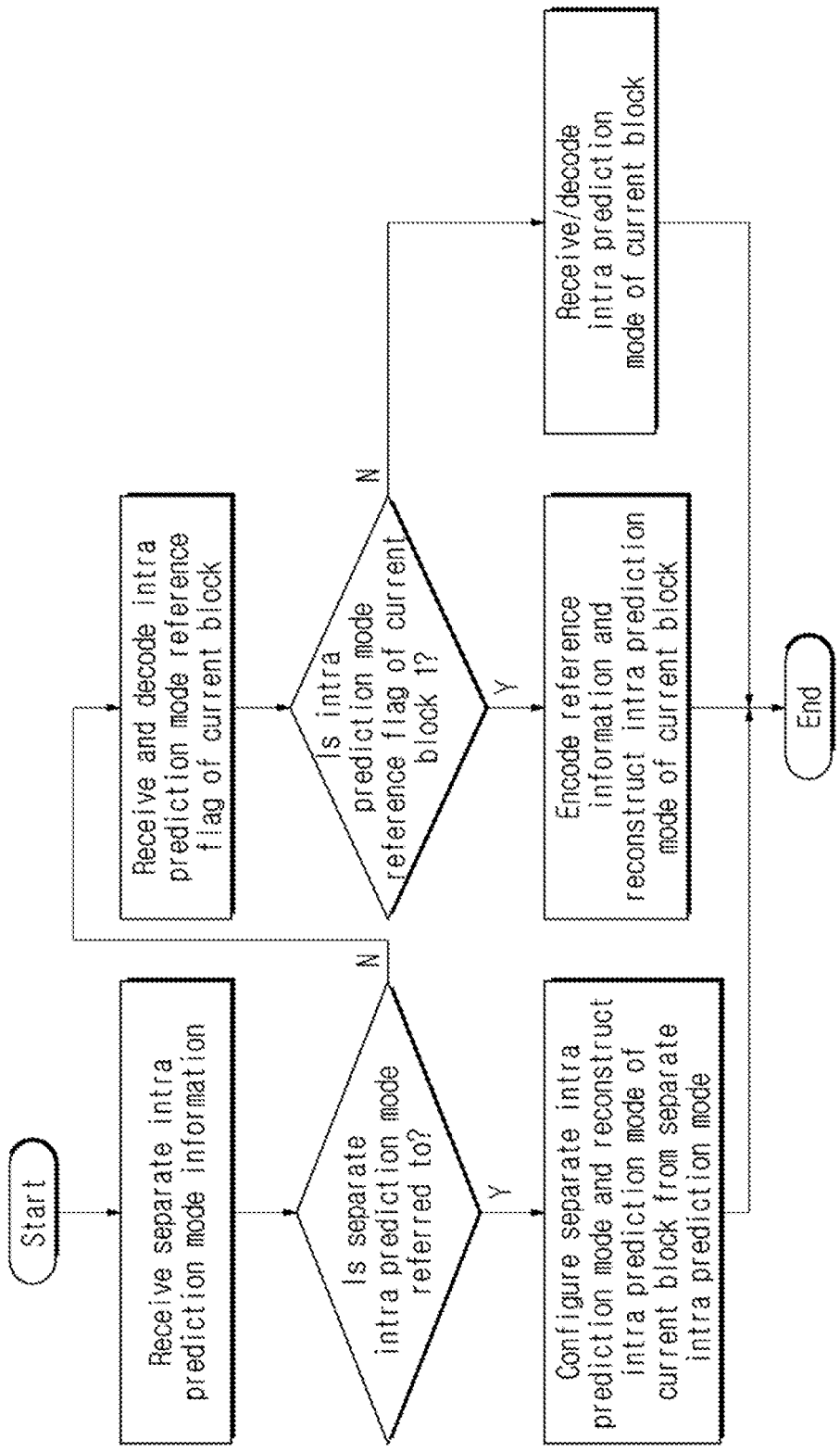
FIG. 12 is a view illustrating a method of decoding an intra prediction mode by configuring a separate intra prediction mode according to an embodiment of the present invention.

FIG. 12 is a view illustrating a method of decoding an intra prediction mode by configuring a separate intra prediction mode according to an embodiment of the present invention.

Referring to FIG. 12, the decoder may receive separate intra prediction mode information, configure a separate intra prediction mode when whether to refer to the separate intra prediction mode is true, and reconstruct the intra prediction mode of the current block from the separate intra prediction mode. Here, a single or plurality of separate intra prediction modes may be configured. The decoder may receive separate intra prediction mode information and then decode the intra prediction mode of the current block using an existing intra prediction mode when whether to refer to the separate intra prediction mode is not true.

In the existing intra prediction mode, the intra prediction mode reference flag of the current block may mean a flag indicating whether to use each of all algorithms able to be referred to when the intra prediction of the current block is encoded. In addition, there is a single or plurality of flags, for example, an MPM flag. In addition, in the existing intra prediction mode, the intra prediction mode reference information of the current block may mean reference information required for encoding for all algorithms which may be referred to when the intra prediction of the current block is encoded. In addition, there is a single or plurality of pieces of reference information, for example, an MPM index.

Figure 13:
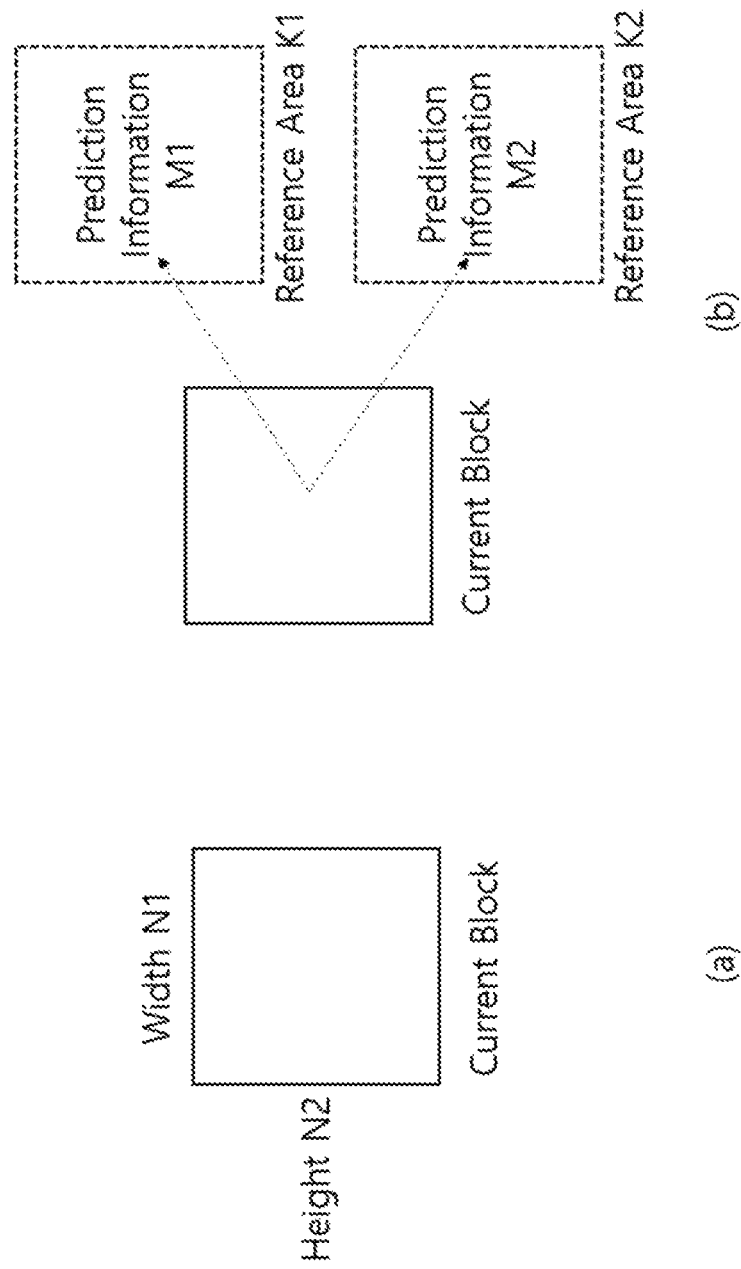
FIG. 13 is a view illustrating the basic concept of an encoding/decoding method according to the configuration condition of a separate intra prediction mode according to an embodiment of the present invention.

FIG. 13 is a view illustrating the basic concept of an encoding/decoding method according to the configuration condition of a separate intra prediction mode according to an embodiment of the present invention.

The configuration for configuring the separate intra prediction mode may be implemented through signaling of a flag type as in the example of FIG. 10, but the configuration condition may be determined without separate signaling using predetermined conditions as in the example of FIG. 13.

(a) of FIG. 13 shows a condition for determining whether to configure a separate intra prediction mode according to the length of the current block. Here, the width and height of the current block are respectively N1 and N2. (b) of FIG. 13 shows a condition for determining whether to configure the separate intra prediction mode when a reference area is in a specific mode. Here, prediction information referred to from the reference areas K1 and K2 of the current block may be M1 and M2.

Referring to (a) of FIG. 13, when the width and height of the current block are respectively N1 and N2, a method of determining whether to configure the separate intra prediction mode may be used. Here, N1 and N2 may mean all lengths available in the encoder and the decoder, respectively. Meanwhile, the length condition when the width and height are respectively N1 and N2 may be replaced with a condition using a partitioning depth when "the partitioning depth is D". Here, D may be an integer of 0 or more.

Referring to (b) of FIG. 13, a method of determining whether to configure the separate intra prediction mode may be used when prediction information of the reference areas K1 and K2 are respectively M1 and M2. Here, K1 and K2 may mean all areas which may be referred to by the current block, such as areas of the adjacent block and neighbor block of the current block, respectively. For example, K1 and K2 may be the left and upper blocks of the current block. In addition, M1 and M2 may mean all information related to prediction including an intra prediction mode, an inter prediction mode, whether to perform inter prediction, whether to perform intra prediction, an IBC mode, a palette mode.

For example, when the reference areas K1 and K2 are referred to in the current block, if the respective prediction information thereof is M1 and M2, the separate intra prediction mode may be configured. The intra prediction mode of the current block may be predicted using the separate intra prediction mode. For example, the intra prediction mode of the current block may be the separate intra prediction mode.

As another example, when the reference areas K1 and K2 are referred to in the current block and the respective prediction information thereof is M1 and M2, the separate intra prediction mode may not be configured.

As another example, when the prediction information of the reference area of the current block is an IBC mode or a palette mode, the separate intra prediction mode may be configured and, at this time, the separate intra prediction mode may be a DC mode. In addition, the intra prediction mode of the current block may be predicted using the separate intra prediction mode. That is, when the prediction information of the reference area of the current block is an IBC mode or a palette mode, the intra prediction mode of the current block may be derived into a DC mode.

As another example, when the prediction information of the reference area of the current block is an IBC mode or a palette mode, the separate intra prediction mode may be configured and, at this time, the separate intra prediction mode may be a DC mode. In addition, the intra prediction mode of the luma component block corresponding to the current block may be predicted using the separate intra prediction mode. That is, when the prediction information of the reference area of the current block is an IBC mode or a palette mode, the intra prediction mode of the luma component block corresponding to the current block may be derived into a DC mode.

Here, the current block may mean a luma component block or a chroma component block. In addition, the area of the current block, the adjacent block or the neighbor block may mean a coding unit or a transform unit.

Meanwhile, the intra prediction mode of the current block may be derived by combining the methods described above with reference to FIGS. 10 and 13.

For example, when the IntraMode_N_Flag is MIP (that is, when the IntraMode_N_Flag is true or when the intra prediction method of the current block is MIP), the intra prediction mode of the current block or the luma component block of the current block may be determined as N. Here, N may be a Planar mode.

Alternatively, when the IntraMode_N_Flag is not MIP (that is, when the IntraMode_N_Flag is false or when the intra prediction method of the current block is not MIP) and the prediction information of the reference area of the current block is an IBC mode or a palette mode, the separate intra prediction mode may be configured, and, at this time, the separate intra prediction mode may be a DC mode. In addition, the intra prediction mode of the current block or the luma component block of the current block may be predicted using the separate intra prediction mode. That is, the intra prediction mode of the luma component block corresponding to the current block may be derived into a DC mode.

Figure 14:
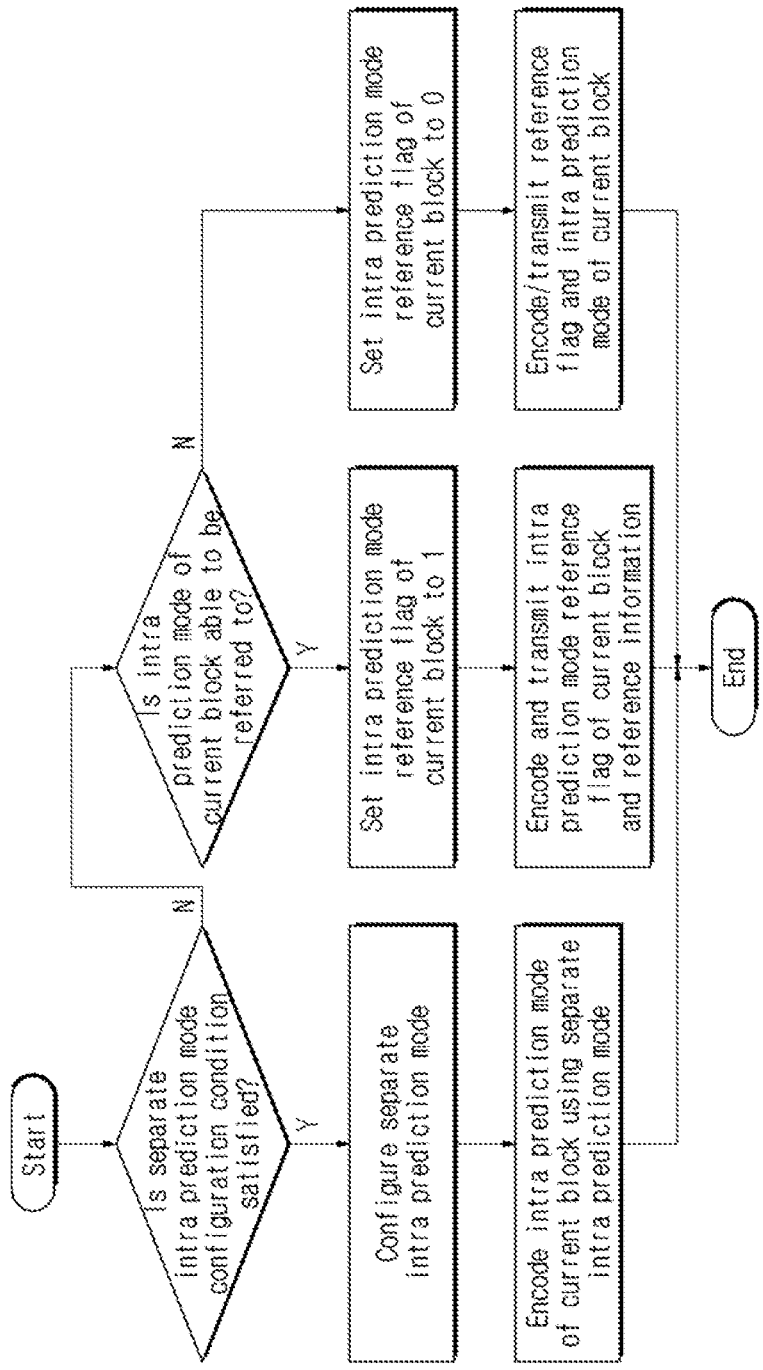
FIG. 14 is a view illustrating an encoding method according to the configuration condition of a separate intra prediction mode according to an embodiment of the present invention.

FIG. 14 is a view illustrating an encoding method according to the configuration condition of a separate intra prediction mode according to an embodiment of the present invention.

Referring to FIG. 14, the encoder may search for a separate intra prediction mode configuration condition and configure the separate intra prediction mode when the separate intra prediction mode configuration condition is satisfied, and perform prediction mode encoding of the current block using the separate intra prediction mode. Here, since the separate intra prediction mode configuration condition is identically predefined in the encoder and the decoder, whether to configure the separate intra prediction mode and whether to use the separate intra prediction mode may be determined without additional signaling. In addition, when the separate intra prediction mode is configured according to the separate intra prediction mode configuration condition and the intra prediction mode of the current block is present in the separate intra prediction mode by comparing the separate intra prediction mode with the intra prediction mode of the current block, the separate intra prediction mode may be configured in the form of signaling the reference information of the separate intra prediction mode in the current block. Here, a single or plurality of separate intra prediction modes may be configured.

When the intra prediction mode of the current block is not present in the separate intra prediction mode by comparing the separate intra prediction mode with the intra prediction mode of the current block after configuring the separate intra prediction mode, the encoder may perform encoding of the intra prediction mode of the current block using an existing intra prediction mode.

In the existing intra prediction mode, the intra prediction mode reference flag of the current block may mean a flag indicating whether to use each of all algorithms able to be referred to when the intra prediction of the current block is encoded. In addition, there is a single or plurality of flags, for example, an MPM flag. In addition, in the existing intra prediction mode, the intra prediction mode reference information of the current block may mean information required for encoding for all algorithms which may be referred to when the intra prediction of the current block is encoded. In addition, there is a single or plurality of pieces of reference information, for example, an MPM index.

Figure 15:
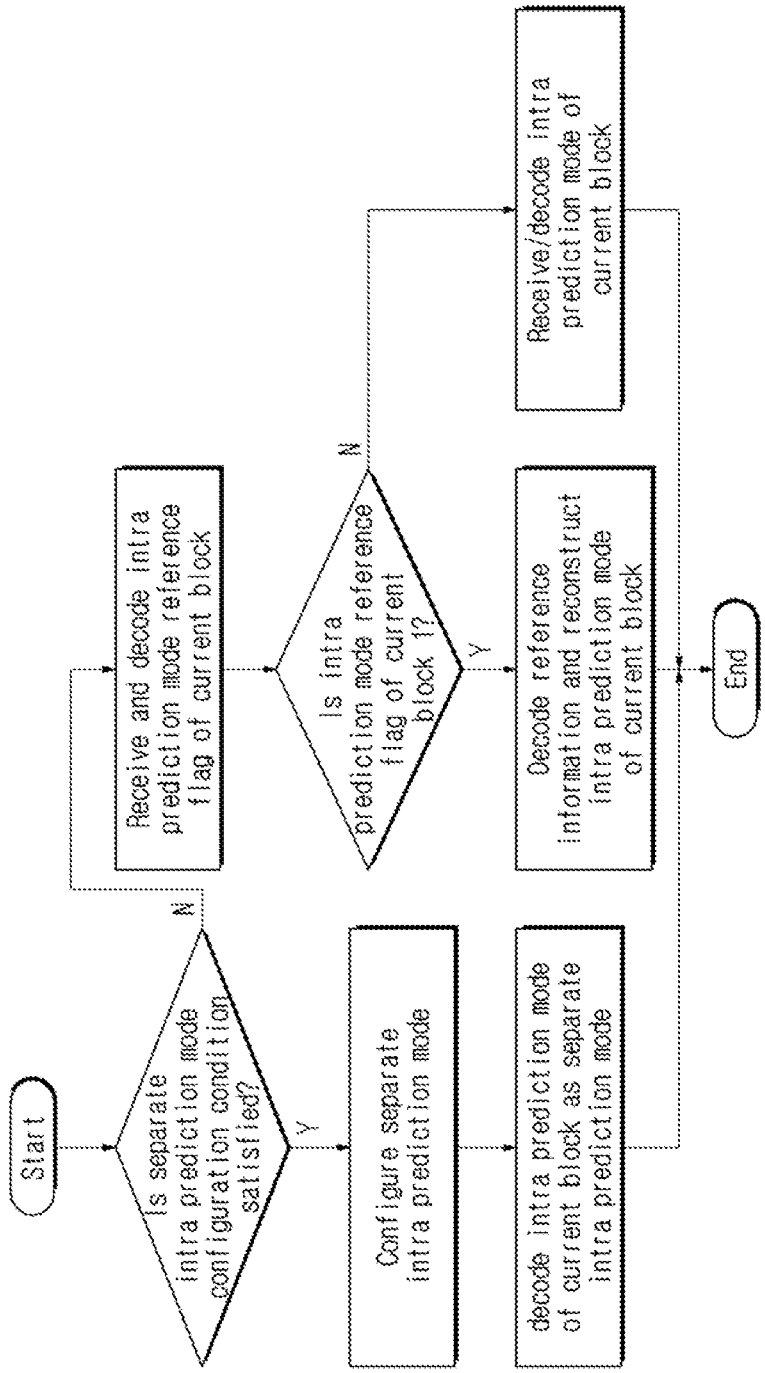
FIG. 15 is a view illustrating a decoding method according to the configuration condition of a separate intra prediction mode according to an embodiment of the present invention.

FIG. 15 is a view illustrating a decoding method according to the configuration condition of a separate intra prediction mode according to an embodiment of the present invention.

Referring to FIG. 15, the decoder may configure a separate intra prediction mode when the separate intra prediction mode configuration condition is satisfied, and perform decoding of the prediction mode of the current block using the separate intra prediction mode. Here, since the separate intra prediction mode configuration condition is identically predefined in the encoder and the decoder, whether to configure the separate intra prediction mode and whether to use the separate intra prediction mode may be determined without additional signaling. For example, the separate intra mode configuration condition may mean that the prediction information of the reference area of the current block is an IBC mode or a palette mode. In addition, the separate intra prediction mode is configured when the separate intra prediction mode configuration condition is satisfied, and may be configured in the form of receiving the reference information of the separate intra prediction mode in the current block from the encoder. Here, a single or plurality of separate intra prediction modes may be configured.

The decoder may perform encoding of the intra prediction mode of the current block using an existing intra prediction mode, when whether to configure the separate intra prediction mode is not true or when the reference information of the separate intra prediction mode received from the encoder is not true.

In the existing intra prediction mode, the reference information of the intra prediction mode of the current block may mean reference information required for decoding for all algorithms which may be referred to when the intra prediction of the current block is decoded. In addition, there is a single or plurality of pieces of reference information, for example, an MPM index.

Hereinafter, as a first method, a method of configuring a separate intra prediction mode as a predefined intra prediction mode will be described.

Figure 16:
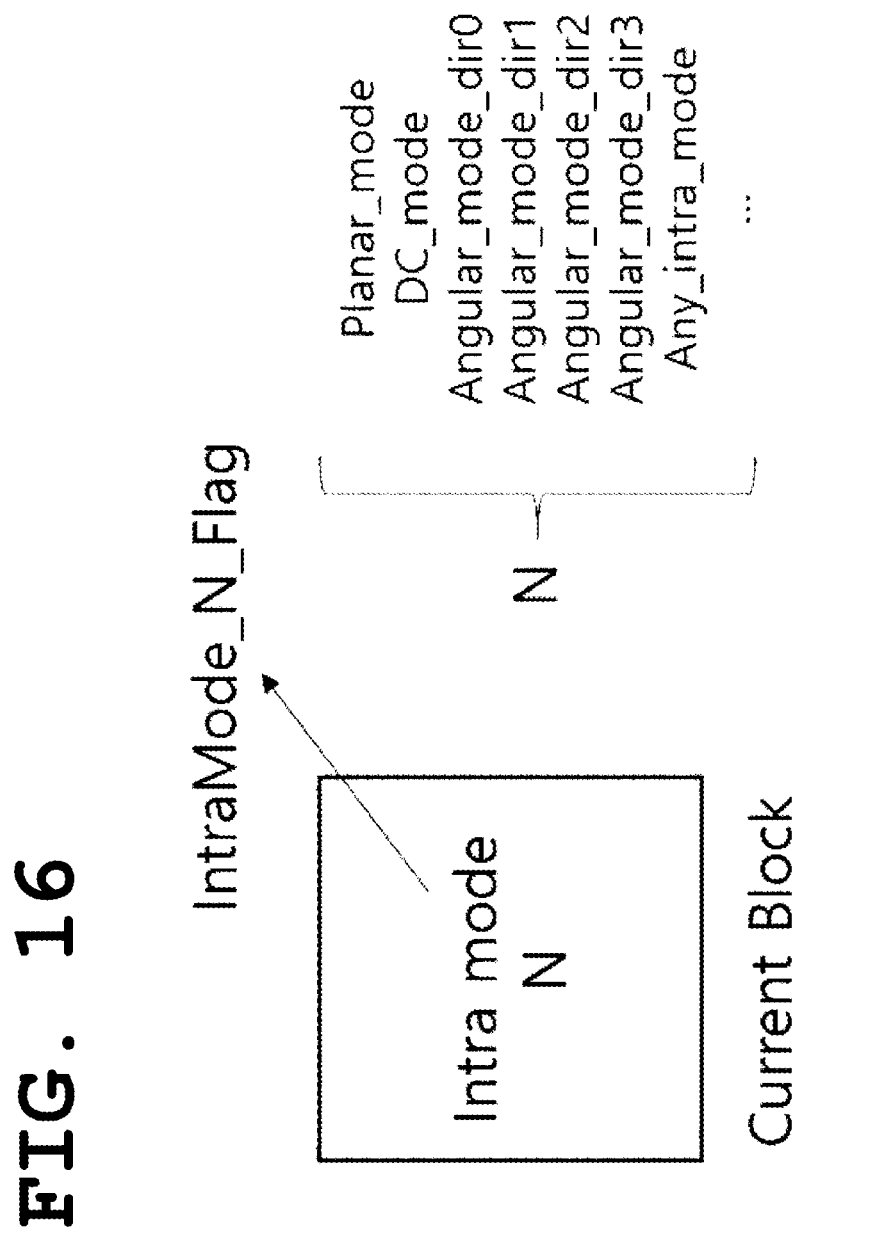
FIG. 16 is a view illustrating the basic concept of a method of configuring a separate intra prediction mode as a predefined intra prediction mode according to an embodiment of the present invention.

FIG. 16 is a view illustrating the basic concept of a method of configuring a separate intra prediction mode as a predefined intra prediction mode according to an embodiment of the present invention.

The example of FIG. 16 is an embodiment for implementing the concept of FIG. 10. Here, the predefined intra prediction mode may mean an intra prediction mode which is previously predefined to be configured as the separate intra prediction mode in the encoder and the decoder. For example, the predefined intra prediction mode may mean all prediction modes which may be used in the encoder and the decoder, such as a Planar mode, a DC mode, and an Angular mode. At this time, the intra prediction mode may be a single mode or a plurality of mode groups.

FIG. 17 is a view illustrating a method of configuring a separate intra prediction mode as a predefined intra prediction mode in an encoder/decoder according to an embodiment of the present invention.

(a) of FIG. 17 shows an embodiment of the encoder for implementing the concept of FIG. 16 and (b) of FIG. 17 shows an embodiment of the decoder for implementing the concept of FIG. 16. In (a) of FIG. 17, when the separate intra prediction mode matches the intra prediction mode of the current block, the encoder may transmit the separate intra prediction mode use flag of 1. In addition, when the separate intra prediction mode does not match the intra prediction mode of the current block, the encoder may transmit the separate intra prediction mode use flag of 0 and encode the intra prediction mode of the current block using an existing intra prediction mode encoding method.

In (b) of FIG. 17, the decoder may receive the separate intra prediction mode use flag. When the separate intra prediction mode use flag is 1, the decoder may reconstruct the intra prediction mode of the current block using the separate intra prediction mode. When the separate intra prediction mode use flag is 0, the decoder may reconstruct the intra prediction mode of the current block using an existing intra prediction mode encoding method. Here, although the value of the separate intra prediction mode use flag is described as 1 and 0 for convenience, the present invention is not limited thereto and all signals capable of determining true/false may be included.

FIG. 18 is a view illustrating a method of configuring a separate intra prediction mode as a predefined intra prediction mode in an encoder/decoder according to another embodiment of the present invention.

Figure 18A:
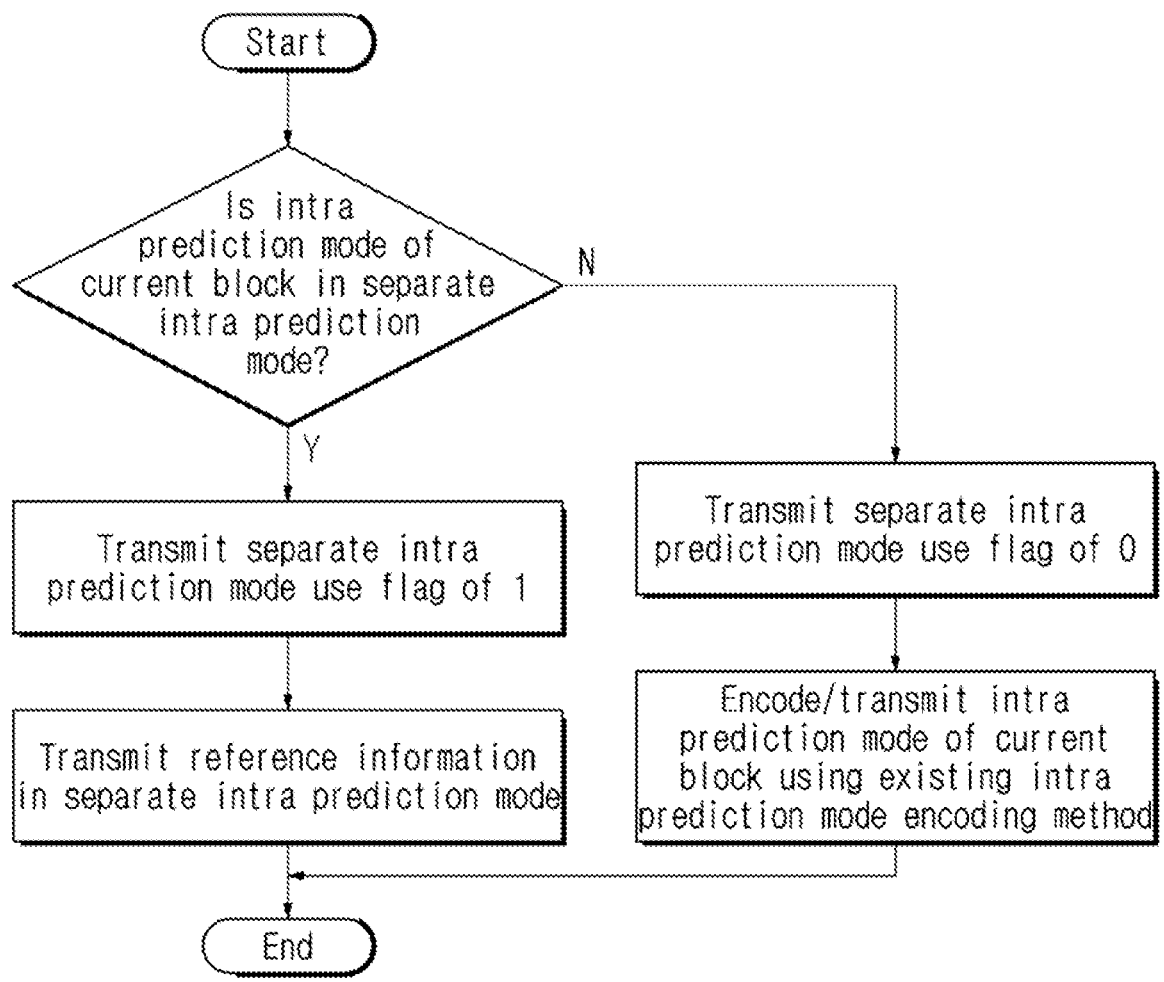
FIG. 18 is a view illustrating a method of configuring a separate intra prediction mode as a predefined intra prediction mode in an encoder/decoder according to another embodiment of the present invention.
Figure 18B:
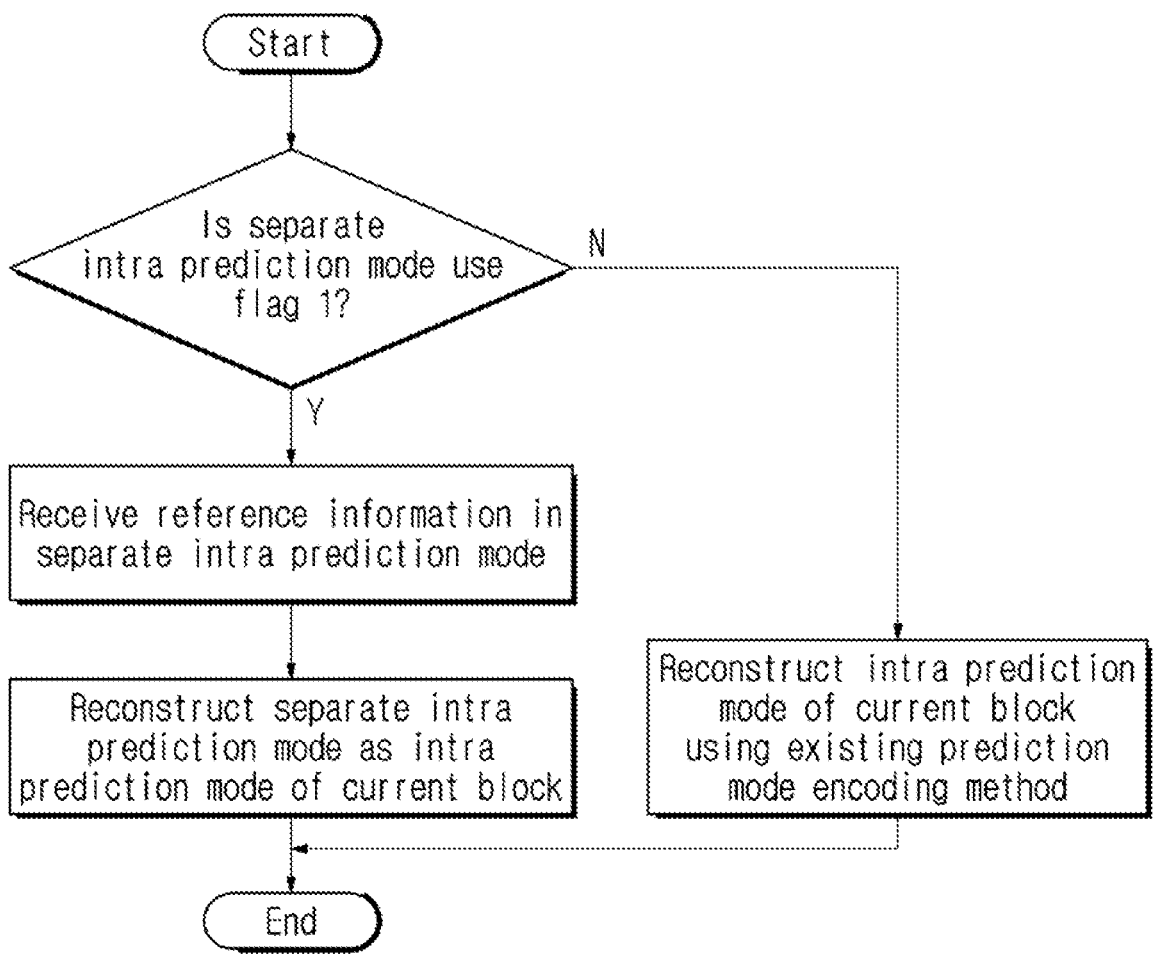

FIG. 18a shows another embodiment of an encoder for implementing the concept of FIG. 16 and FIG. 18b shows another embodiment of a decoder for implementing the concept of FIG. 16.

In FIG. 18a, when the intra prediction mode of the current block is present in the separate intra prediction mode, the encoder may transmit the separate intra prediction mode use flag of 1, and transmit reference information in the separate intra prediction mode. Here, the reference information in the separate intra prediction mode may mean information required for reference in the separate intra prediction mode like an index in the separate intra prediction mode. In FIG. 18a, when the intra prediction mode of the current block is not present in the separate intra prediction mode, the encoder may transmit the separate intra prediction mode use flag of 0 and encode the intra prediction mode of the current block using the existing intra prediction mode encoding method.

In FIG. 18b, the decoder may receive the separate intra prediction mode use flag. When the separate intra prediction mode use flag is 1, the decoder may further receive the separate intra prediction mode the reference information and reconstruct the intra prediction mode of the current block as the separate intra prediction mode using the received separate intra prediction mode reference information. When the separate intra prediction mode use flag is 0, the decoder may reconstruct the intra prediction mode of the current block using the existing intra prediction mode encoding method. Here, although the value of the separate intra prediction mode use flag is described as 1 and 0 for convenience, the present invention is not limited thereto and all signals capable of determining true/false may be included.

Figure 19:
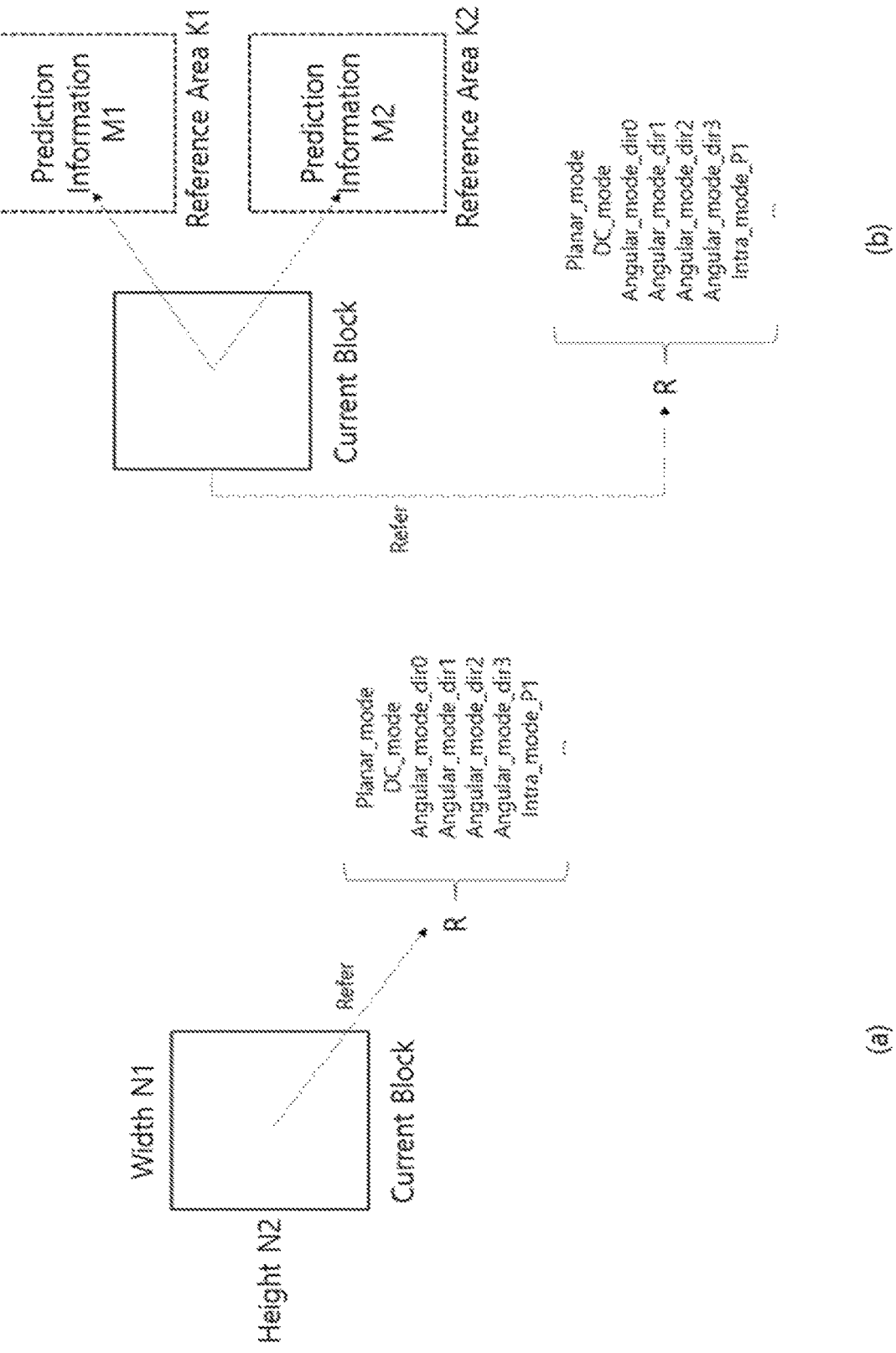
FIG. 19 is a view illustrating the basic concept of a method of configuring a separate intra prediction mode using a predefined intra prediction mode according to another embodiment of the present invention.

FIG. 19 is a view illustrating the basic concept of a method of configuring a separate intra prediction mode using a predefined intra prediction mode according to another embodiment of the present invention.

FIG. 19 shows an embodiment for implementing the concept of FIG. 13. Referring to FIG. 19, when the separate intra prediction mode is configured using the predefined prediction mode, according to the separate intra prediction mode configuration condition, the same separate intra prediction mode may be configured in the encoder and the decoder without additional signaling.

In (a) of FIG. 19, when the width (or the horizontal length) and height (or vertical length) of the current block are respectively N1 and N2, the separate intra prediction mode may be configured using the predefined intra prediction mode and the intra prediction mode of the current block may be configured by referring to the separate intra prediction mode. Here, the predefined intra prediction mode may mean the number of intra prediction modes predefined in the encoder/decoder. That is, the number of intra prediction modes applicable to the current block may be derived based on the width and height of the current block, and the separate intra prediction mode may be configured using the derived number of intra prediction modes. In addition, the intra prediction mode of the current block may be constructed using the separate intra prediction mode. In addition, here, N1 and N2 may mean all lengths available in the encoder and the decoder. Meanwhile, whether the separate intra prediction mode is configured may be determined according to a predetermined partition depth rather than the width and height of the current block. In addition, here, the separate intra prediction mode may mean a MIP based intra prediction mode.

For example, when the width of the current block (e.g., CU) is 4 and the height thereof is 4 (first case), the number of intra prediction modes applicable to the current block may be 15. In this case, the intra prediction mode of the current block may be derived based on 15 MIP based intra prediction modes. As another example, when the width or height of the current block is 4 or when both the width and height of the current block are 8 (second case), the number of intra prediction modes applicable to the current block may be 7. In this case, the intra prediction mode of the current block may be derived from seven MIP based intra prediction modes. As another example, if not the first case and the second case, the number of intra prediction modes applicable to the current block may be 5. In this case, the intra prediction mode of the current block may be derived from five MIP based intra prediction modes. In addition, when the separate intra prediction mode is configured using the predefined prediction mode, the same separate intra prediction mode may be configured in the encoder and the decoder, by additional signaling according to the separate intra prediction mode configuration condition.

For example, when the separate intra prediction mode is an MIP based intra prediction mode, a flag indicating MIP based intra prediction may be signaled.

In addition, for example, the decoder may derive the intra prediction mode of the current block based on the flag. That is, when the flag indicating the MIP based intra prediction is 1, the intra prediction mode of the current block may be derived from the above-described MIP based intra prediction mode.

In (b) of FIG. 19, when the prediction information in the reference areas K1 and K2 referred to by the current block is M1 and M2, the separate intra prediction mode may be configured using the predefined intra prediction mode. In addition, the intra prediction mode of the current block may be configured by referring to the separate intra prediction mode. Here, K1 and K2 may mean all areas which may be referred to by the current block, such as the areas of the adjacent block and neighbor block of the current block, and M1 and M2 may mean all information related to prediction, such as an intra prediction mode, an inter prediction mode, whether to perform inter prediction or whether to perform intra prediction.

In addition, the example of FIG. 19 may include a method of configuring the intra prediction mode of the current block using a separate intra prediction mode according to a predefined method between the encoder and the decoder without additional signaling. In addition, the example of FIG. 19 may include a method of encoding/decoding the intra prediction mode of the current block using the separate intra prediction mode according to a predefined method between the encoder and the decoder without additional signaling.

FIG. 20 is a view illustrating a method of configuring a separate intra prediction mode using a predefined intra prediction mode in an encoder/decoder according to another embodiment of the present invention.

FIG. 20 shows an embodiment for implementing the concept of FIG. 13. Referring to FIG. 20, when the separate intra prediction mode is configured using a predefined prediction mode, the same separate intra prediction mode may be configured in the encoder and the decoder according to the separate intra prediction mode configuration condition without additional signaling. In (a) of FIG. 20, when the separate intra prediction mode configuration condition is satisfied, the encoder may configure the separate intra prediction mode. In addition, the encoder may encode the intra prediction mode of the current block using the separate intra prediction mode, and transmit the separate intra prediction mode to the decoder. In addition, when the separate intra prediction mode configuration condition is not satisfied, the encoder may perform encoding of the intra prediction mode of the current block using an existing intra prediction encoding method without configuring the separate intra prediction mode.

In (b) of FIG. 20, when the separate intra prediction mode configuration condition is satisfied, the decoder may configure the separate intra prediction mode and decode the intra prediction mode of the current block using the separate intra prediction mode. In addition, when the separate intra prediction mode configuration condition is not satisfied, the decoder may reconstruct the intra prediction mode of the current block using the existing intra prediction encoding method without configuring the separate intra prediction mode.

In addition, the example of FIG. 20 may include a method of configuring the intra prediction mode of the current block using a separate intra prediction mode according to a predefined method between the encoder and the decoder without additional signaling. In addition, the example of FIG. 20 may include a method of encoding/decoding the intra prediction mode of the current block using the separate intra prediction mode according to a predefined method between the encoder and the decoder without additional signaling.

FIG. 21 is a block diagram of an apparatus for configuring a separate intra prediction mode using a predefined intra prediction mode according to another embodiment of the present invention.

(a) of FIG. 21 shows an embodiment of an apparatus which uses additional signaling and (b) of FIG. 21 shows an embodiment of an apparatus which does not use additional signaling.

Referring to (a) of FIG. 21, a separate intra prediction mode information transmitter (encoder)/receiver (decoder) may signal and transmit/receive a signal such as whether to use the separate intra prediction mode or the reference information in the separate intra prediction mode. In addition, the separate intra prediction mode information transmitter/receiver may determine whether to use the existing intra prediction mode encoder/decoder or the intra prediction mode encoder/decoder which uses the separate intra prediction mode in order to predict the intra prediction mode of the current block, according to whether to use the separate intra prediction mode.

A separate intra prediction mode configuration unit may configure the separate intra prediction mode and transmit the separate intra prediction mode to the intra prediction mode encoder/decoder which uses the separate intra prediction mode. The intra prediction mode encoder/decoder which uses the separate intra prediction mode may encode/decode the current mode using the separate intra prediction mode.

Referring to (b) of FIG. 21, the separate intra prediction mode information transmitter (encoder)/receiver (decoder) may not signal a signal such as whether to use the separate intra prediction mode or the reference information in the separate intra prediction mode. A separate intra prediction mode configuration condition determination unit may determine whether to configure the separate intra prediction mode or a configuration condition. The separate intra prediction mode configuration condition determination unit may determine whether to use the existing intra prediction mode encoder/decoder or the intra prediction mode encoder/decoder which uses the separate intra prediction mode in order to predict the intra prediction mode of the current block, according to a determination such as whether to configure the separate intra prediction mode or the configuration condition. The separate intra prediction mode configuration unit may configure the separate intra prediction mode and transmit the separate intra prediction mode to the intra prediction mode encoder/decoder which uses the separate intra prediction mode. The intra prediction mode encoder/decoder which uses the separate intra prediction mode may encode/decode the current mode using the separate intra prediction mode.

Hereinafter, as a second method, a method of configuring a separate intra prediction mode by referring to a reference area will be described.

FIG. 22 is a view illustrating the basic concept of a method of configuring a separate intra prediction mode by referring to a reference area according to an embodiment of the present invention.

Referring to FIG. 22, when the separate intra prediction mode is configured, the separate intra prediction mode may be composed of information on the reference area K. In addition, the separate intra prediction mode may be configured using a predefined intra prediction mode N referred to in the reference area. Information on whether to use the separate intra prediction mode may be signaled and transmitted from the encoder to the decoder, and may be derived under the same condition in the encoder and the decoder without additional signaling. Here, the reference area K may be all or some of the neighbor blocks including the left block or the upper block of the current block. In addition, a reference range may be an entire image outside the scope of the current picture. In addition, a single or plurality of reference signals of an intra prediction mode may be included. Here, the intra prediction mode N may mean an intra prediction mode predefined in the encoder and the decoder.

For example, when the separate intra prediction mode is configured using information on the reference area K, if information on whether to use the separate intra prediction mode is true, the intra prediction mode of the current block may be predicted by accessing the reference area K and configuring the intra prediction mode N from the reference area K. In this case, when whether to use the separate intra prediction mode is true but the reference area cannot be referred to, the above-described first method may be used or a specific intra prediction mode predefined in the encoder and the decoder may be used. Here, the specific intra prediction mode may include modes such as a Planar mode, a DC mode, and an Angular mode, and may be composed of a single or plurality of groups. The second method is obtained by adding a preceding procedure of accessing the reference area K predefined in the encoder and the decoder to the first method. In this case, the separate intra prediction mode may be configured using the predefined intra prediction mode as in the first method.

FIG. 23 is a view illustrating a method of configuring a separate intra prediction mode by referring to a reference area according to an embodiment of the present invention.

Figure 23A:
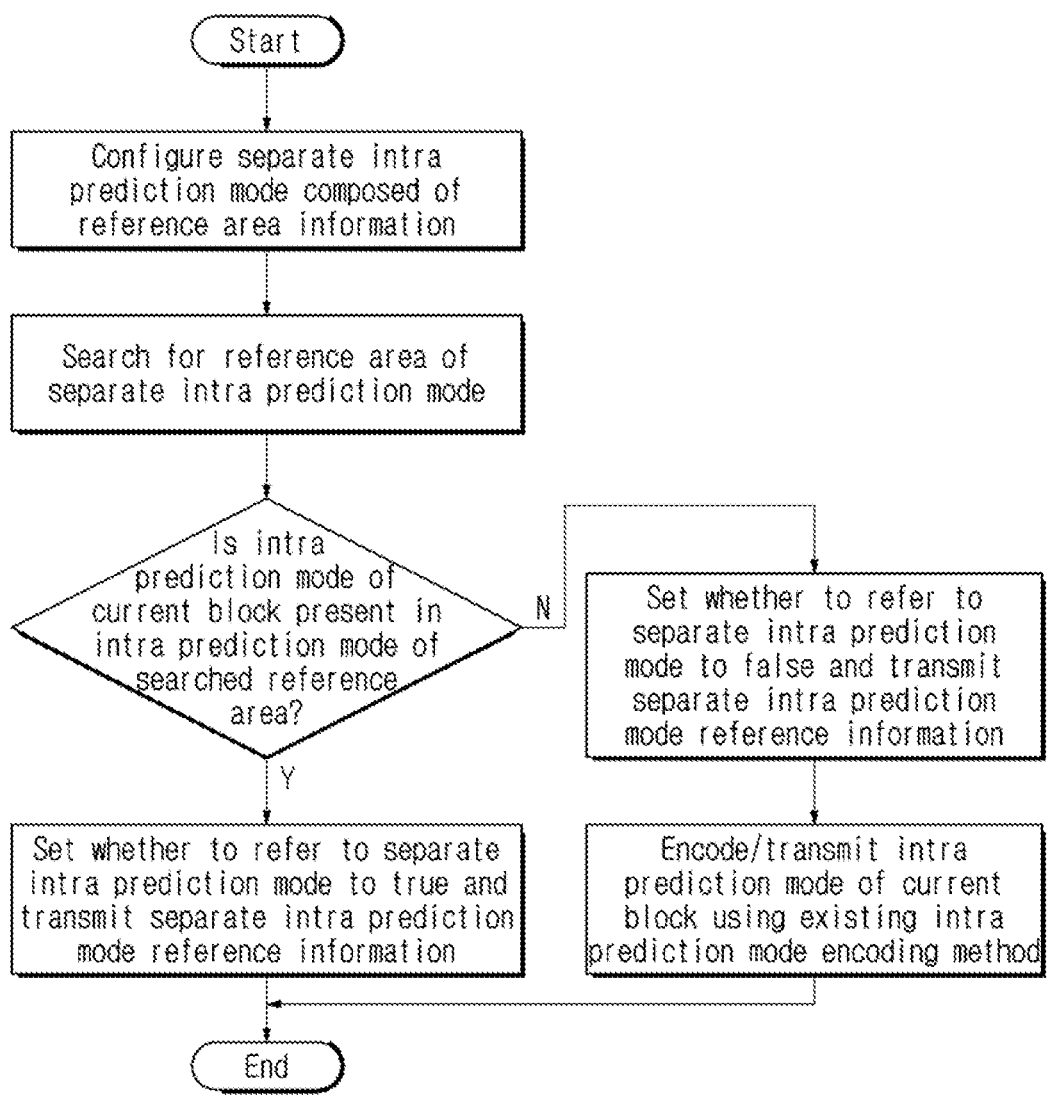
FIG. 23 is a view illustrating a method of configuring a separate intra prediction mode by referring to a reference area according to an embodiment of the present invention.
Figure 23B:
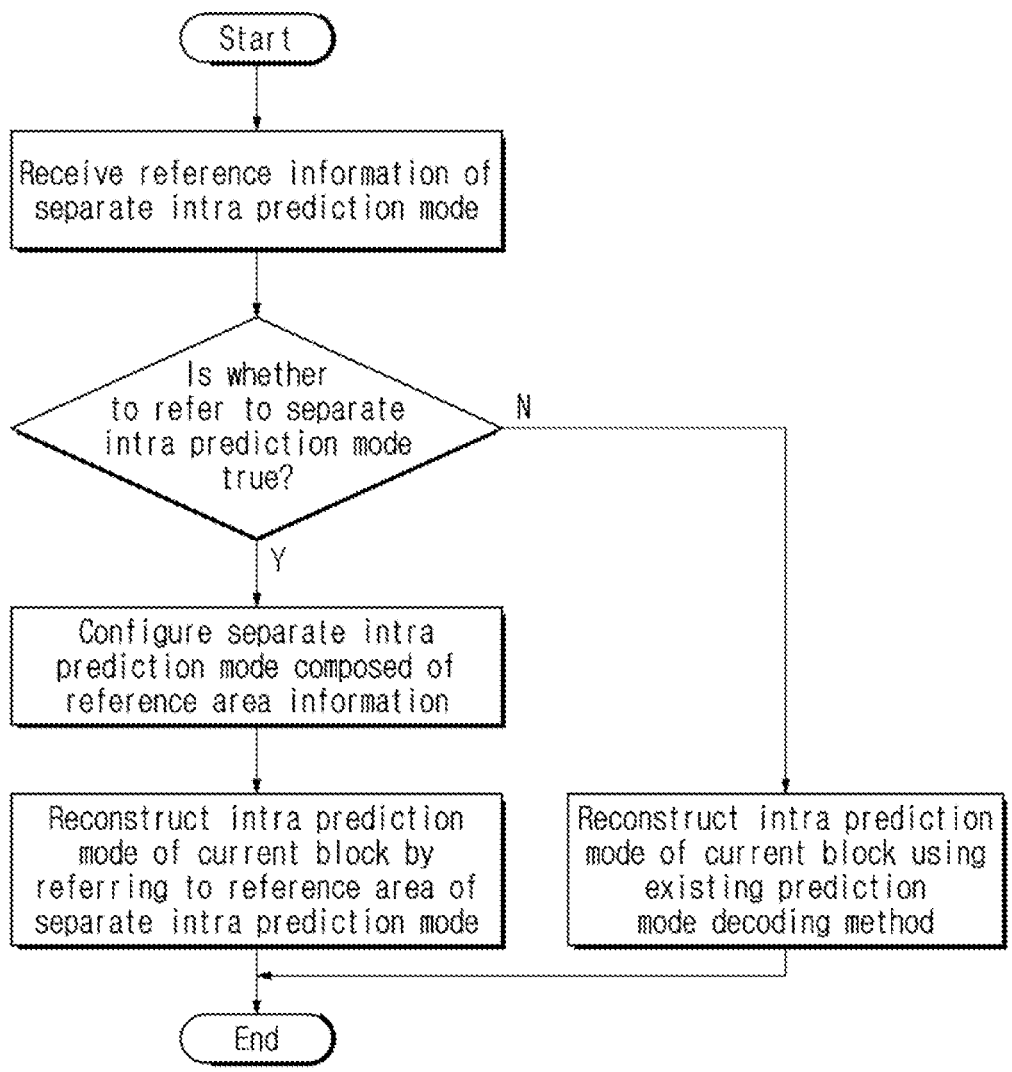

FIG. 23a shows an embodiment of the encoder for implementing the concept of FIG. 22 and FIG. 23b shows an embodiment of the decoder for implementing the concept of FIG. 22.

Referring to FIG. 23a, the encoder may configure a separate intra prediction mode composed of reference area information. In addition, the reference area may be searched according to the reference information in the separate intra prediction mode. At this time, when an intra prediction mode is present in the searched reference area, whether to refer to the separate intra prediction mode may be set to True and separate intra prediction reference information may be transmitted to the decoder. Here, separate intra prediction reference information may include whether to refer to the separate intra prediction mode and a reference location. In addition, when the intra prediction mode is not present in the searched reference area, whether to refer to the separate intra prediction mode may be set to False and the separate intra prediction mode the reference information may be transmitted to the decoder. In addition, the intra prediction mode of the current block may be encoded using the existing intra prediction mode encoding method.

Referring to FIG. 23b, the decoder may receive the separate intra prediction mode reference information. When whether to refer to the separate intra prediction mode is True, the separate intra prediction mode composed of the separate intra prediction mode reference area information may be configured and the intra prediction mode of the current block may be reconstructed by referring to the separate intra prediction mode reference area information. When whether to refer to the separate intra prediction mode is False, the intra prediction mode of the current block may be reconstructed using the existing prediction mode encoding method.

Meanwhile, the location of the reference area may be searched using a predefined method under the separate intra prediction mode configuration condition or the location of the reference area may be transmitted from the encoder to the decoder. In addition, the location of the reference area may be all or some of neighbor blocks including the left block or the upper block of the current block and a reference range may be an entire image outside the scope of the current picture and a single or plurality of reference ranges may be included.

Figure 24:
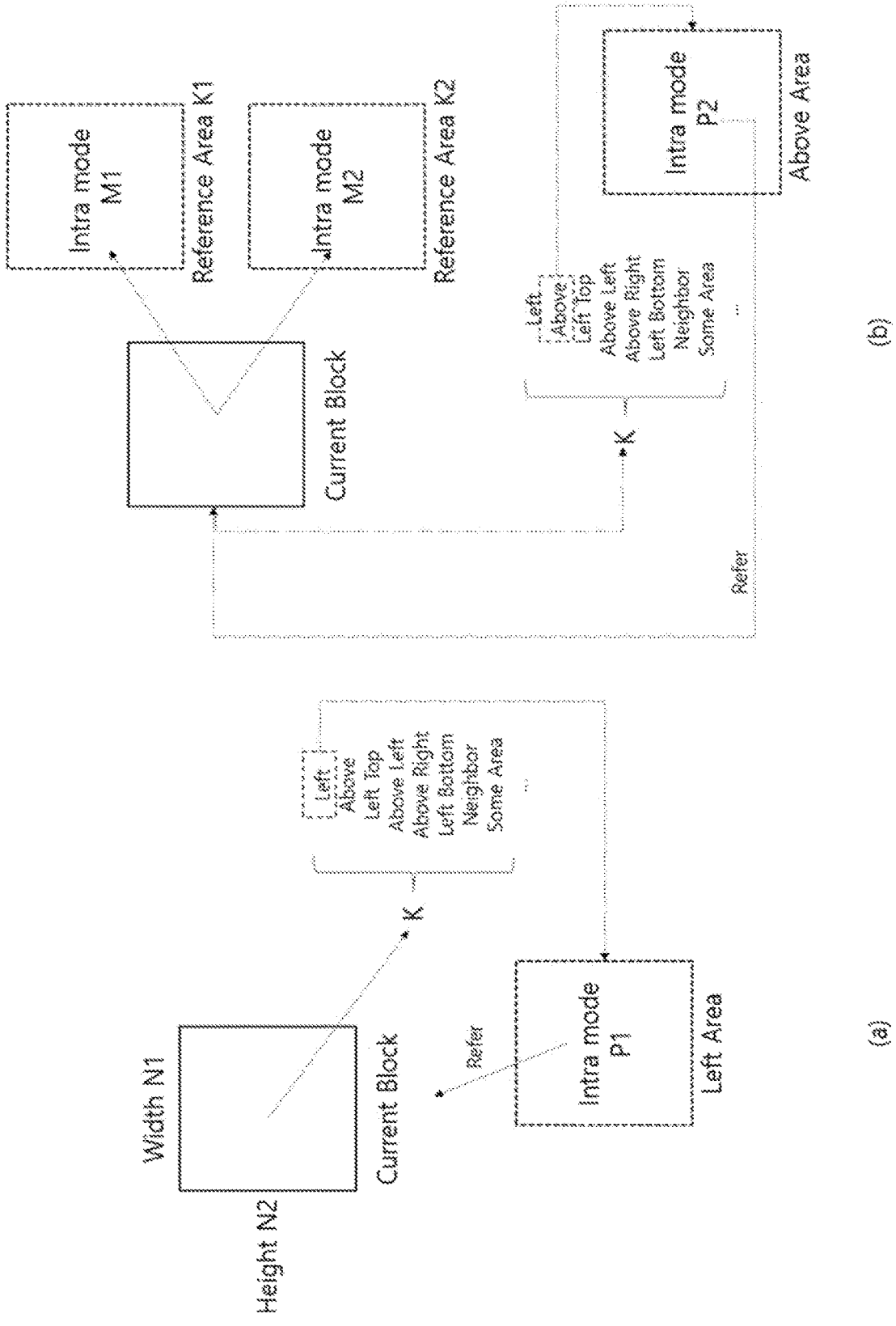
FIG. 24 is a view illustrating the basic concept of a method of configuring a separate intra prediction mode using reference information according to an embodiment of the present invention.

FIG. 24 is a view illustrating the basic concept of a method of configuring a separate intra prediction mode using reference information according to an embodiment of the present invention.

FIG. 24 shows an embodiment for implementing the concept of FIG. 13. Referring to FIG. 24, when the separate intra prediction mode is configured using reference information, the same separate intra prediction mode may be configured in the encoder and the decoder according to the separate intra prediction mode configuration condition without additional signaling.

The separate intra prediction mode configured using the predefined intra prediction mode in the example of FIG. 19, whereas the separate intra prediction mode may be configured using the reference information of the intra prediction mode in the example of FIG. 24. Here, the reference information may mean information capable of referring to an intra prediction mode, such as whether reference is made or information on a reference area. In addition, the location of the reference area may be searched using a predefined method under the separate intra prediction mode configuration condition or the location of the reference area may be transmitted from the encoder to the decoder. In addition, the location of the reference area may be all or some of neighbor blocks including the left block or the upper block of the current block and a reference range may be an entire image outside the scope of the current picture and a single or plurality of reference ranges may be included.

Meanwhile, in FIG. 24, when the intra prediction mode of the current block is referred to in the separate intra prediction mode, the intra prediction mode may be referred to in an area corresponding to the reference information of the separate intra prediction mode.

In (a) of FIG. 24, when the width and height of the current block are respectively N1 and N2, the separate intra prediction mode may be configured using the intra prediction mode reference information, and the intra prediction mode of the current block may be configured by referring to the reference information configured in the separate intra prediction mode. Here, N1 and N2 may mean all lengths available in the encoder and the decoder and whether the separate intra prediction mode is configured may be determined according to a predetermined partition depth rather than the width and height of the current block.

In (b) of FIG. 24, when the prediction information in the reference areas K1 and K2 referred to by the current block is M1 and M2, the separate intra prediction mode may be configured using the reference information of the intra prediction mode. In addition, the intra prediction mode of the current block may be configured by referring to the reference information of the separate intra prediction mode. Here, K1 and K2 may mean all areas which may be referred to by the current block, such as the areas of the adjacent block and neighbor block of the current block, and M1 and M2 may mean all information related to prediction, such as an intra prediction mode, an inter prediction mode, whether to perform inter prediction or whether to perform intra prediction.

In addition, the example of FIG. 24 may include a method of configuring the intra prediction mode of the current block using the separate intra prediction mode according to a predefined method between the encoder and the decoder without additional signaling. In addition, the example of FIG. 24 may include a method of encoding/decoding the intra prediction mode of the current block using the separate intra prediction mode according to a predefined method between the encoder and the decoder without additional signaling.

Figure 25:
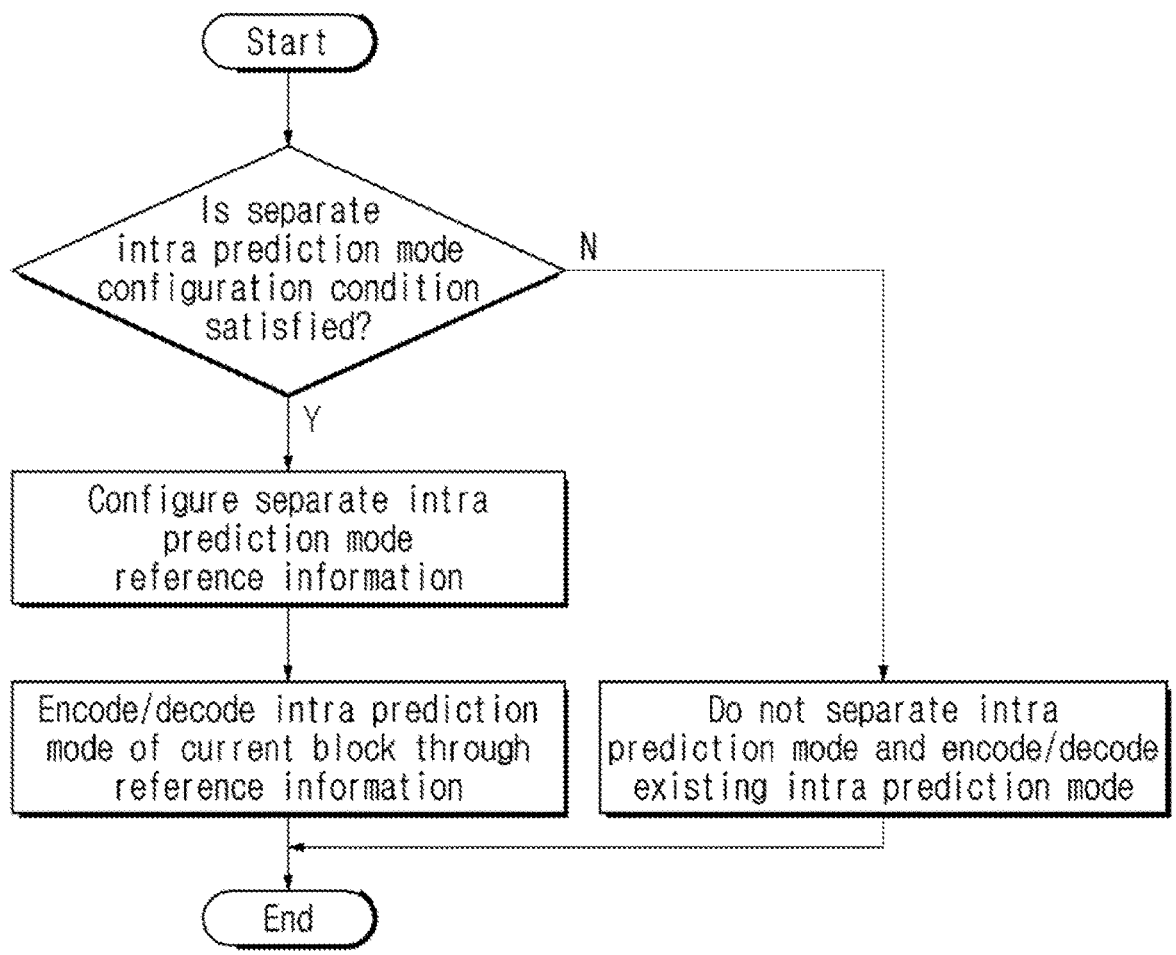
FIG. 25 is a view illustrating a method of configuring a separate intra prediction mode using reference information according to an embodiment of the present invention.

FIG. 25 is a view illustrating a method of configuring a separate intra prediction mode using reference information according to an embodiment of the present invention.

FIG. 25 shows an embodiment for implementing the concept of FIG. 24. Referring to FIG. 25, when the separate intra prediction mode is configured using the reference information, the same separate intra prediction mode may be configured in the encoder and the decoder according to the separate intra prediction mode configuration condition without additional signaling. Here, the reference information may mean information capable of referring to an intra prediction mode, such as whether reference is made or information on a reference area. In addition, the location of the reference area may be searched using a predefined method under the separate intra prediction mode configuration condition or the location of the reference area may be transmitted from the encoder to the decoder. In addition, the location of the reference area may be all or some of neighbor blocks including the left block or the upper block of the current block and a reference range may be an entire image outside the scope of the current picture and a single or plurality of reference ranges may be included.

In addition, the example of FIG. 25 may include a method of configuring the intra prediction mode of the current block using separate intra prediction mode according to a predefined method between the encoder and the decoder without additional signaling. In addition, the example of FIG. may include a method of encoding/decoding the intra prediction mode of the current block using the separate intra prediction mode according to a predefined method between the encoder and the decoder without additional signaling.

Figure 26:
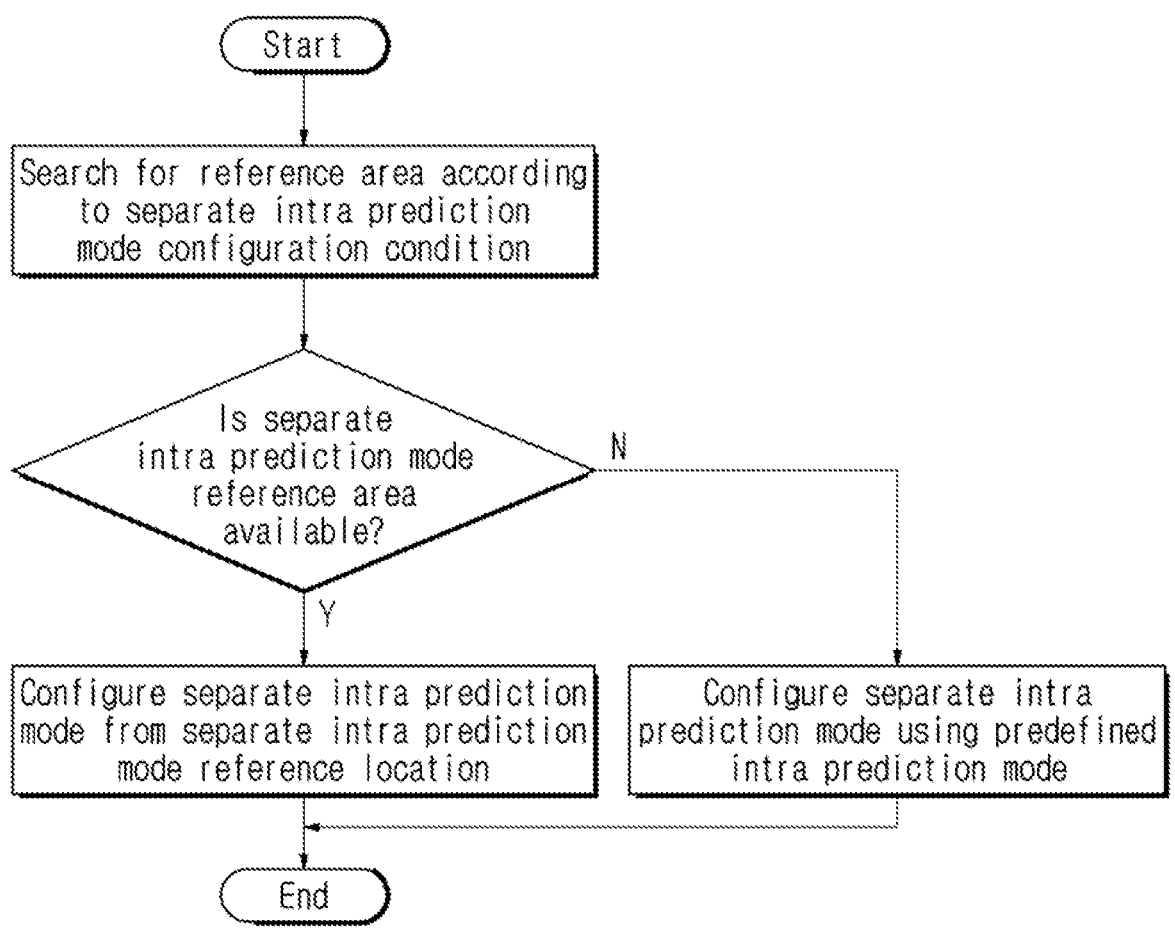
FIG. 26 is a view illustrating a method of configuring a separate intra prediction mode using a predefined intra prediction mode when a reference area is not available, according to an embodiment of the present invention.

FIG. 26 is a view illustrating a method of configuring a separate intra prediction mode using a predefined intra prediction mode when a reference area is not available, according to an embodiment of the present invention.

Referring to FIG. 26, when the separate intra prediction mode is configured, if the reference area is not available, the separate intra prediction mode may be configured using the predefined intra prediction mode.

Figure 27:
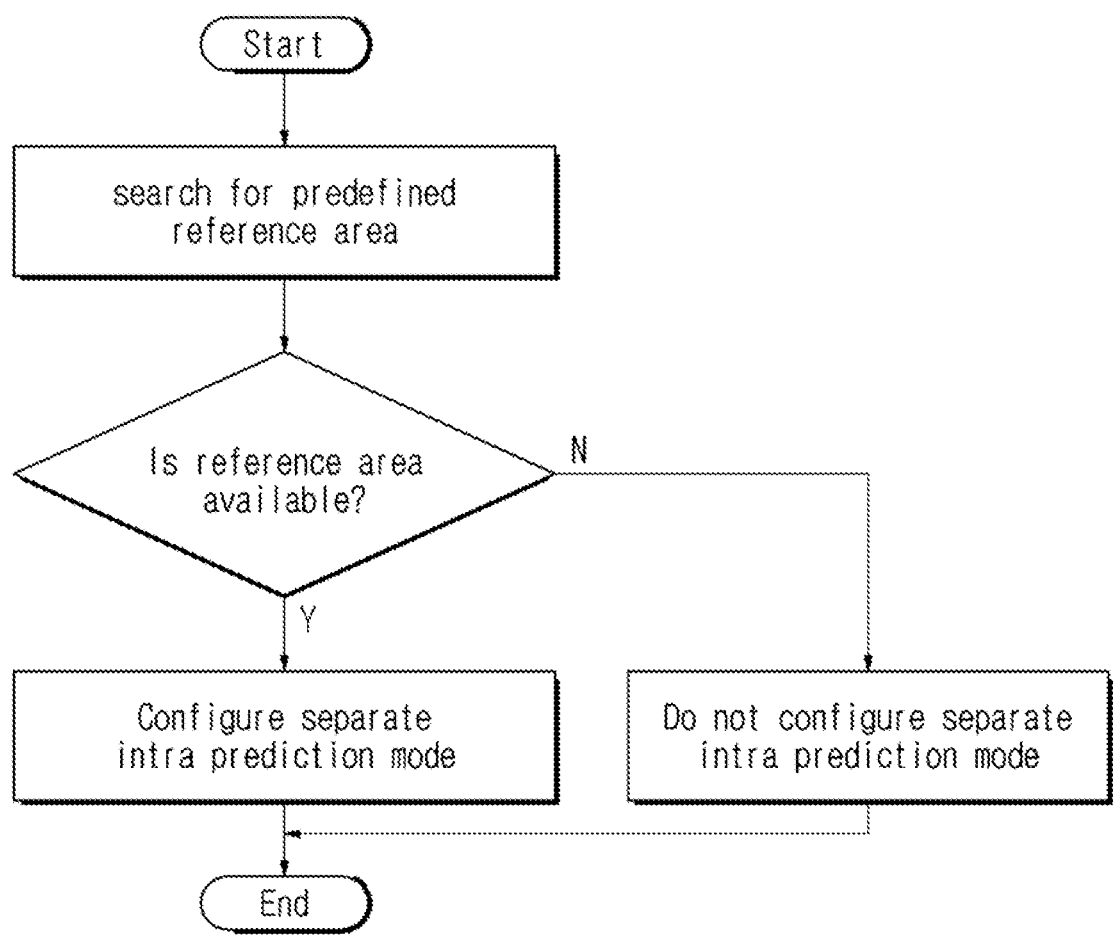
FIG. 27 is a view illustrating a method of configuring a separate intra prediction mode when a reference area is available, by referring to a predefined reference area according to an embodiment of the present invention.

FIG. 27 is a view illustrating a method of configuring a separate intra prediction mode when a reference area is available, by referring to a predefined reference area according to an embodiment of the present invention.

Here, the predefined reference area may mean a reference area pre-set between the encoder and the decoder. In this case, when the reference area is not available, the separate intra prediction mode may not be configured.

FIG. 28 is a block diagram of an apparatus for configuring a separate intra prediction mode using a reference area according to an embodiment of the present invention.

(a) of FIG. 28 shows an embodiment of an apparatus which uses additional signaling and (b) of FIG. 28 shows an embodiment of an apparatus which does not use additional signaling.

Referring to (a) of FIG. 28, a separate intra prediction mode information transmitter (encoder)/receiver (decoder) may signal and transmit/receive a signal such as whether to use the separate intra prediction mode or the reference information in the separate intra prediction mode. In addition, the separate intra prediction mode information transmitter/receiver may determine whether to use the existing intra prediction mode encoder/decoder or the intra prediction mode encoder/decoder which uses the separate intra prediction mode, according to whether to use the separate intra prediction mode.

A separate intra prediction mode configuration unit may configure the separate intra prediction mode using information referred from the reference area. Here, the information may be transmitted from a reference area searching unit. In addition, the separate intra prediction mode configuration unit may transmit the separate intra prediction mode to the intra prediction mode encoder/decoder which uses the separate intra prediction mode. The intra prediction mode encoder/decoder which uses the separate intra prediction mode may encode/decode the intra prediction mode of the current block using the separate intra prediction mode.

Referring to (b) of FIG. 28, the separate intra prediction mode information transmitter (encoder)/receiver (decoder) may not signal a signal such as whether to use the separate intra prediction mode or the reference information in the separate intra prediction mode. A separate intra prediction mode configuration condition determination unit may determine whether to configure the separate intra prediction mode or a configuration condition. The separate intra prediction mode configuration condition determination unit may determine whether to use the existing intra prediction mode encoder/decoder or the intra prediction mode encoder/decoder which uses the separate intra prediction mode in order to predict the intra prediction mode of the current block, according to a determination such as whether to configure the separate intra prediction mode or a configuration condition. The separate intra prediction mode configuration unit may configure the separate intra prediction mode using the information referred to from the reference area and transmit the separate intra prediction mode to the intra prediction mode encoder/decoder which uses the separate intra prediction mode. Here, the information may be transmitted from a reference area searching unit. The intra prediction mode encoder/decoder which uses the separate intra prediction mode may encode/decode the current mode using the separate intra prediction mode.

Hereinafter, as a third method, a method of not configuring a separate intra prediction mode in an MPM candidate list will be described.

Here, the separate intra prediction mode may include all intra prediction modes which may be determined using the above-described first or second method. According to the present disclosure, when the separate intra prediction mode is not included in the MPM candidate list, the length of the MPM may be reduced, thereby reducing the magnitude of a maximum MPM index. When the intra prediction mode of the current block is encoded/decoded, a method of configuring and referring to a Planar mode or a prediction mode to be selected with a high probability like prediction information of a left neighbor block may have higher compression efficiency than referring to the MPM candidate list. Here, the separate intra prediction mode may be a predefined intra prediction mode such as a Planar mode, a DC mode or an Angular mode like the example of the first method. Alternatively, the separate intra prediction mode may be an encoded/decoded mode in a reference area such as an left neighbor block or an upper neighbor block or may be configured using reference information including information on a reference area as in the example of the second method.

Figure 29:
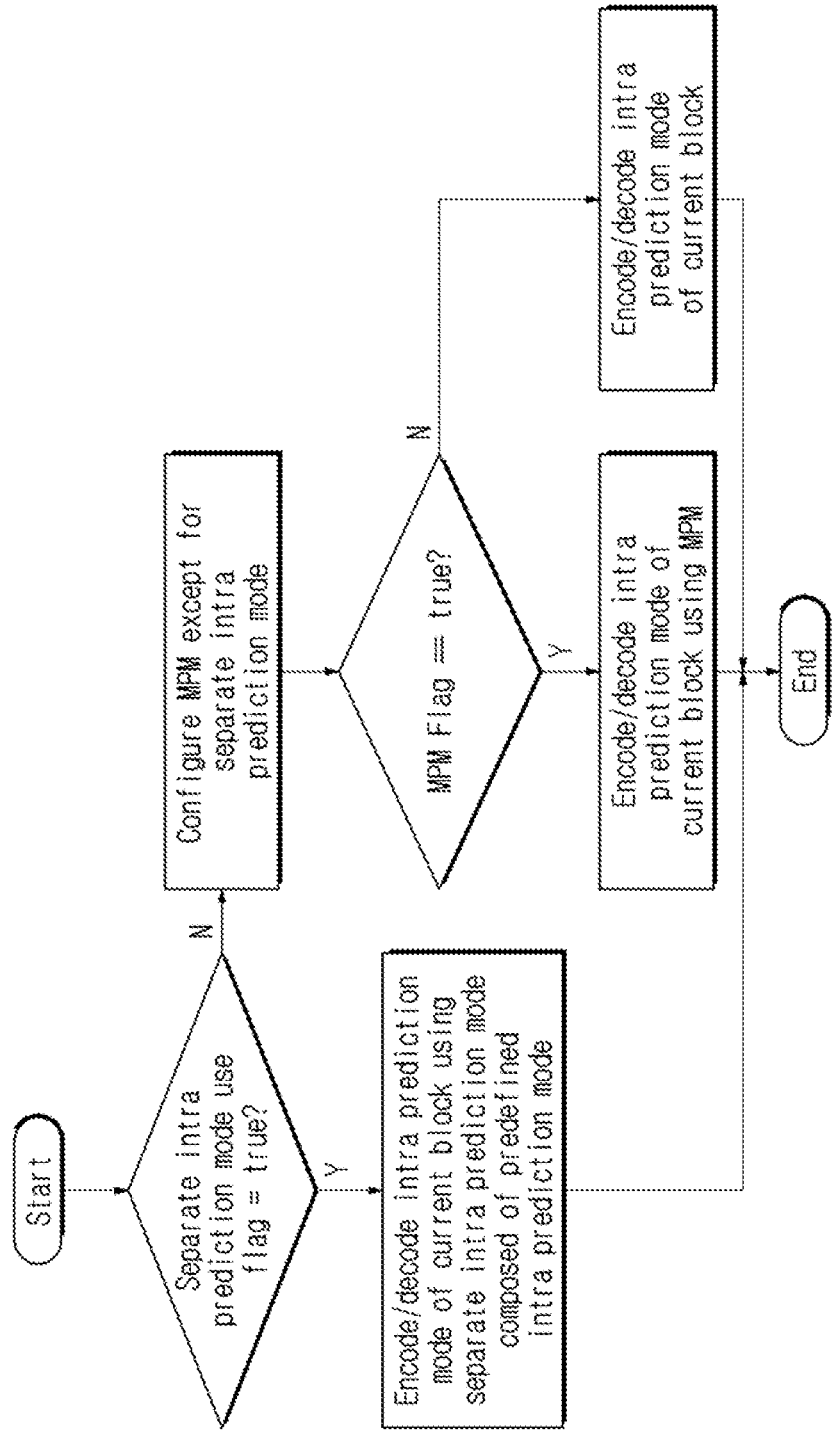
FIG. 29 is a view illustrating an encoding/decoding process based on a separate intra prediction mode configuration according to an embodiment of the present invention.

FIG. 29 is a view illustrating an encoding/decoding process based on a separate intra prediction mode configuration according to an embodiment of the present invention.

The encoder/decoder may determine whether to encode/decode the intra prediction mode which uses the separate intra prediction mode, by checking the separate intra prediction mode use flag. When the separate intra prediction mode use flag is true, the current block may be encoded/decoded using the predefined intra prediction mode between the encoder and the decoder. Alternatively, when the separate intra prediction mode use flag is false, an MPM candidate list may be configured. Here, when the MPM candidate list is configured, the separate intra prediction mode may not be added to the MPM candidate list. In addition, when the MPM flag is true as the result of checking the MPM flag, the intra prediction mode of the current block may be encoded/decoded by referring to the MPM candidate list. When the MPM flag is false, the intra prediction mode of the current block may be encoded/decoded using a method such as Fixed-Length coding or Truncated-binary coding.

Figure 30:
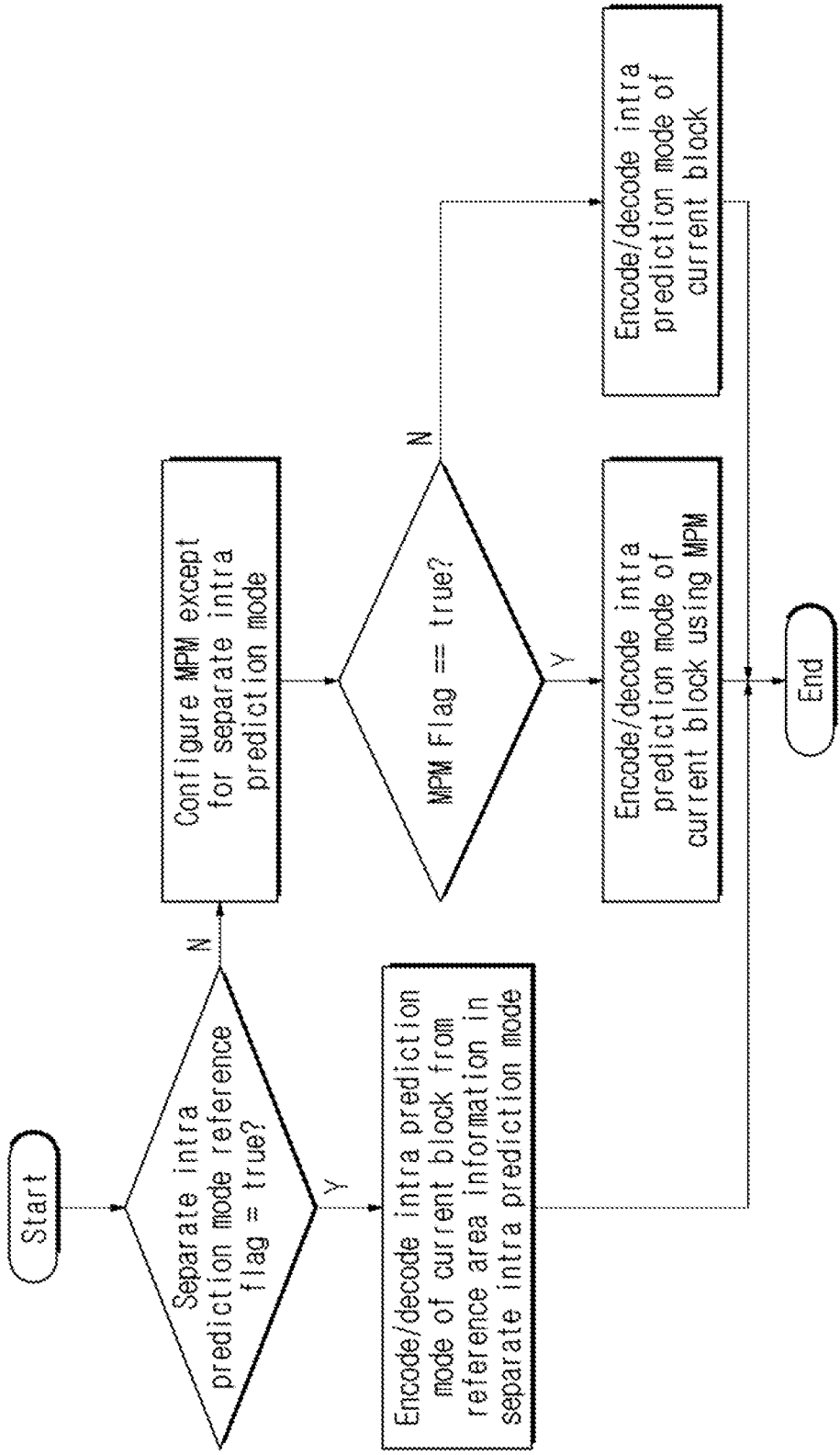
FIG. 30 is a view illustrating an encoding/decoding based on a separate intra prediction mode configuration according to another embodiment of the present invention.

FIG. 30 is a view illustrating an encoding/decoding based on a separate intra prediction mode configuration according to another embodiment of the present invention.

FIG. 29 shows an embodiment of an encoding/decoding process based on the separate intra prediction mode composed of the predefined intra prediction mode, whereas FIG. 30 shows an embodiment of an encoding/decoding process based on the separate intra prediction mode composed of reference information. Accordingly, in FIG. 30, a process of accessing the reference information in the separate intra prediction mode to refer to the intra prediction mode from the reference area may be added.

Referring to FIG. 30, the encoder/decoder may determine whether to encode/decode the intra prediction mode which uses the separate intra prediction mode, by checking the separate intra prediction mode use flag. When the separate intra prediction mode use flag is true, the intra prediction mode of the current block may be encoded/decoded using the reference area information in the separate intra prediction mode. Alternatively, when the separate intra prediction mode use flag is false, an MPM candidate list may be configured. Here, when the MPM candidate list is configured, the intra prediction mode referred to in the reference area of the separate intra prediction mode when the MPM candidate list is configured may not be added to the MPM candidate list. In addition, when the MPM flag is true as the result of checking the MPM flag, the intra prediction mode of the current block may be encoded/decoded by referring to the MPM candidate list. When the MPM flag is false, the intra prediction mode of the current block may be encoded/decoded using a method such as Fixed-Length coding or Truncated-binary coding.

Figure 31:
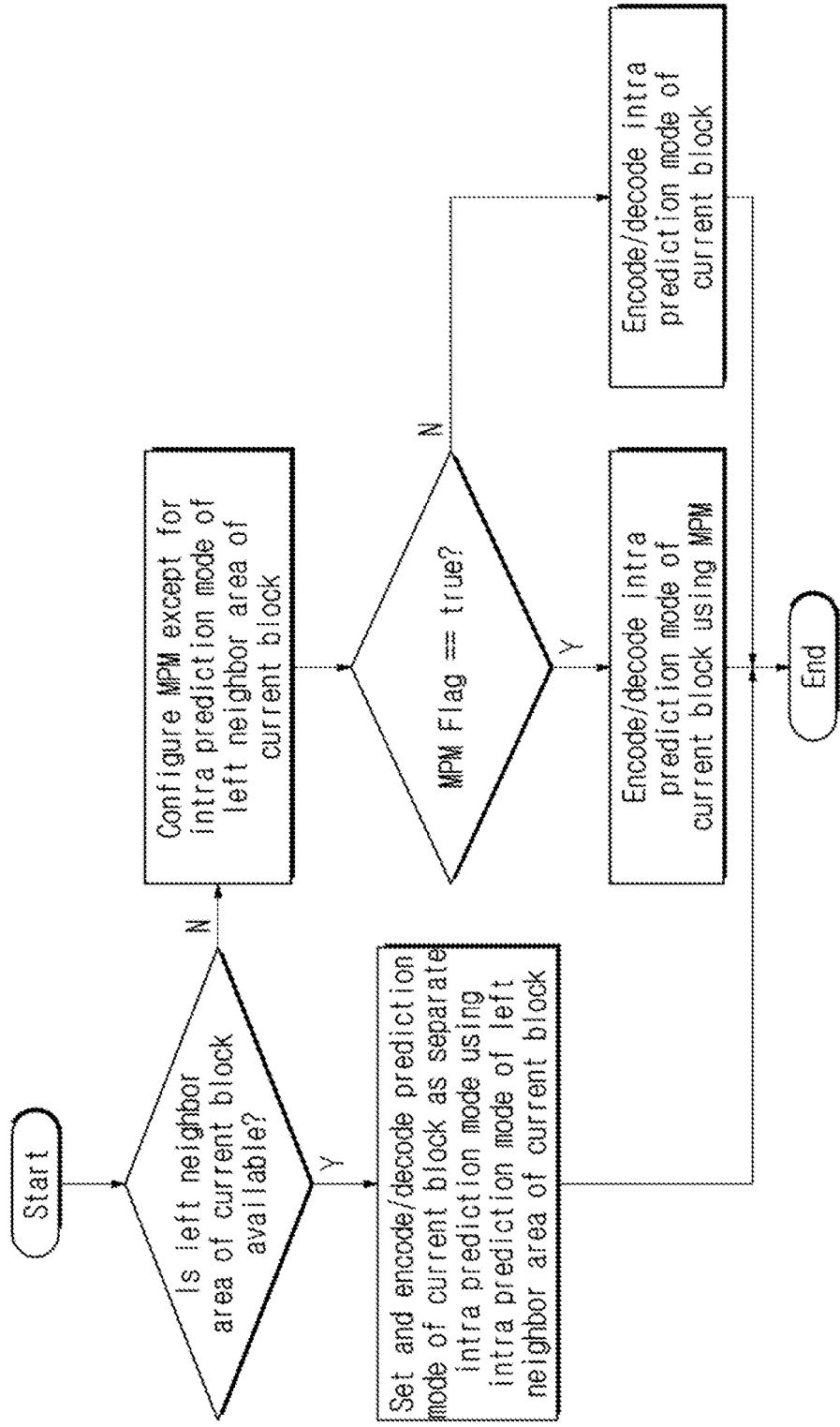
FIG. 31 is a view illustrating an encoding/decoding process based on a separate intra prediction mode configuration depending on whether a reference area is available according to an embodiment of the present invention.

FIG. 31 is a view illustrating an encoding/decoding process based on a separate intra prediction mode configuration depending on whether a reference area is available according to an embodiment of the present invention.

FIG. 31 is an example of using a reference area as a left neighbor area, the location of the reference area may be searched using a predefined method under the separate intra prediction mode configuration condition or the location of the reference area may be transmitted from the encoder to the decoder. In addition, the location of the reference area may be all or some of neighbor blocks including the left block or the upper block of the current block and a reference range may be an entire image outside the scope of the current picture and a single or plurality of reference ranges may be included.

Referring to FIG. 31, unlike the example of FIG. 30, the encoder/decoder may determine whether the prediction mode of the reference area is available for the intra prediction mode of the current block according to presence/absence of the reference area without checking the separate intra prediction mode reference flag. The encoder/decoder may check presence of the reference area and encode/decode the intra prediction mode of the current block using the intra prediction mode of the reference area when the reference area is present. Alternatively, when the reference area is not available, the encoder/decoder may configure an MPM candidate list. Here, an MPM candidate list may be configured. Here, when the MPM candidate list is configured, the separate intra prediction mode referred to in the reference area of the separate intra prediction mode may not be added to the MPM candidate list. Referring to FIG. 31, when the left neighbor area of the current block is not available, the intra prediction mode of the left neighbor area of the current block may be replaced with the predefined intra prediction mode. In addition, a MPM candidate list may be configured except for the predefined intra prediction mode. In addition, when the MPM flag is true as the result of checking the MPM flag, the intra prediction mode of the current block may be encoded/decoded by referring to the MPM candidate list. When the MPM flag is false, the intra prediction mode of the current block may be encoded/decoded using a method such as Fixed-Length coding or Truncated-binary coding.

FIG. 32 is a block diagram of an encoding/decoding apparatus based on a separate intra prediction mode configuration according to an embodiment of the present invention.

The MPM configuration may be changed according to operation of the separate intra prediction mode configuration unit. (a) of FIG. 32 shows an embodiment of an apparatus which uses additional signaling and (b) of FIG. 32 shows an embodiment of an apparatus which does not use additional signaling.

Referring to (a) of FIG. 32, a separate intra prediction mode information transmitter (encoder)/receiver (decoder) may determine whether to use the separate intra prediction mode, and the intra prediction mode encoder/decoder which uses the separate intra prediction mode may reconstruct the intra prediction mode of the current block when separate intra prediction mode use is true. Alternatively, when separate intra prediction mode use is false, the MPM candidate list may be configured in the MPM configuration unit except for the separate intra prediction mode and the intra prediction mode of the current block may be reconstructed.

Referring to (b) of FIG. 32, the separate intra prediction mode configuration condition determination unit may determine whether to use the separate intra prediction mode. When the separate intra prediction mode use configuration condition is true, the intra prediction mode encoder/decoder which uses the separate intra prediction mode may reconstruct the intra prediction mode of the current block. Alternatively, when the separate intra prediction mode use configuration condition is false, the MPM candidate list may be configured in the MPM configuration unit except for the separate intra prediction mode and the intra prediction mode of the current block may be reconstructed.

Hereinafter, as a fourth method, a method of omitting a different prediction process through signaling of a separate intra prediction mode related signal will be described.

Here, the different prediction process mean all or some of prediction methods which may be performed in inter prediction or intra prediction, such as MPM, non-MPM, IBC mode, Merge mode, AMVP mode and Combined Intra Inter Prediction (CIIP). In addition, signaling of separate intra prediction mode related signal may be performed in all units used in the encoder and the decoder, such as SPSs, PPSs, blocks, coding units. In addition, omitting the different prediction process may mean that all or some of processes related to a corresponding prediction method such as signaling or an operation or derivation process for performing the different prediction process. At this time, in omission of the different prediction process, a plurality of prediction processes or a specific prediction process may be omitted according to the configuration of the separate intra prediction mode.

By omitting the different prediction process, it is possible to reduce the amount of computation and the usage of a memory of the encoder and the decoder or omit signaling used in the different prediction mode. As signaling used in the other prediction modes is omitted, it is possible to improve encoding efficiency. Signaling omitted by omitting the different prediction process may mean MPM list related signaling such as an MPM flag or an MPM index, non-MPM signaling for intra prediction, signaling related to an IBC mode, a Merge mode, an AMPV mode, motion vector signaling, etc.

The separate intra prediction mode related signal may mean a single or plurality of signals which may be used in the separate intra prediction mode, such as whether to use the separate intra prediction mode, a reference signal, etc. At this time, one signal may mean a plurality of signals. When all or some of the separate intra prediction mode related signals are signaled, all or some of the different prediction processes may be omitted or all or part of signaling used in the different prediction process may be omitted.

FIG. 33 is a view illustrating a method of omitting a different prediction process based on signaling of a separate intra prediction mode related signal according to an embodiment of the present invention.

Referring to FIG. 33, when the intra prediction mode of the current block may be configured through signaling of the separate intra prediction mode related signal, the different prediction process or signaling necessary for the different prediction process may be omitted and the separate intra prediction mode of the current block may be configured. A different prediction A may mean a different prediction which may be performed in preference to a separate prediction mode among the different predictions other than the separate prediction mode. At this time, the different prediction A may be one prediction method or a plurality of prediction methods. In addition, a different prediction B may mean prediction which may be omitted according to the configuration of the separate prediction mode among the different predictions other than the separate prediction mode. At this time, the different prediction B may be one prediction method or a plurality of prediction methods. Whether the different prediction process A and/or the different prediction process B is performed may be determined through signaling of a signal for determining whether to perform the different prediction process in the encoder and the decoder or according to the rule predefined in the encoder and the decoder.

Figure 33A:
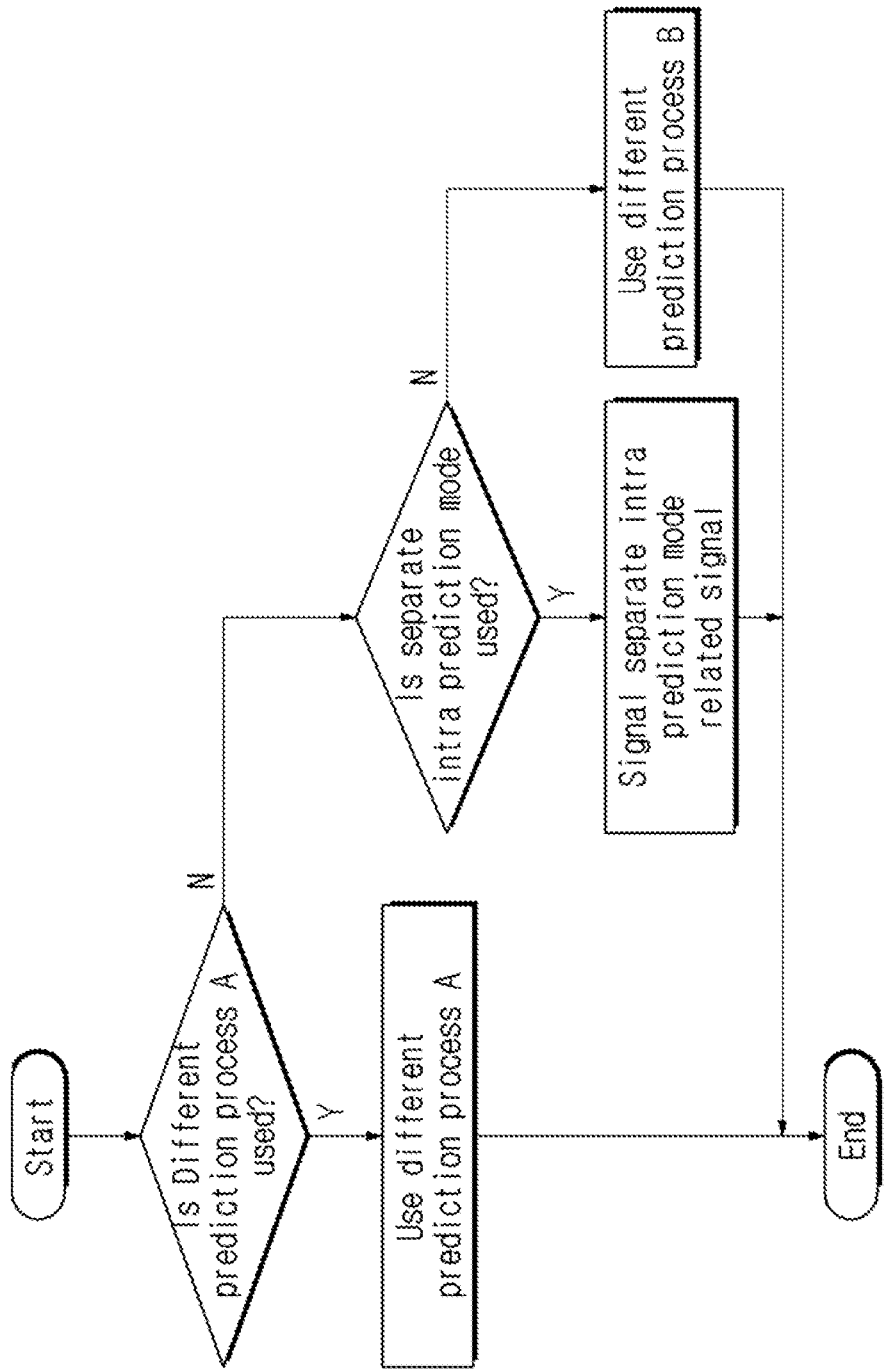
FIG. 33 is a view illustrating a method of omitting a different prediction process based on signaling of a separate intra prediction mode related signal according to an embodiment of the present invention.

Referring to FIG. 33a, in step "Is the different prediction process A used when the separate intra prediction mode is used?", the encoder may determine whether to use the different prediction process A. When the different prediction process A is used, signaling of the separate intra prediction mode related signal may be omitted in step "use the different prediction process A". Alternatively, when the different prediction process A is not used, whether to use the separate intra prediction mode may be determined in step "Is the separate intra prediction mode used?".

When the separate intra prediction mode is used, the separate intra prediction mode related signal may be signaled and the different prediction process B may be omitted in "signal the separate intra prediction mode related signal". Alternately, when the separate intra prediction mode is not used, a different prediction process B may be used.

Figure 33B:
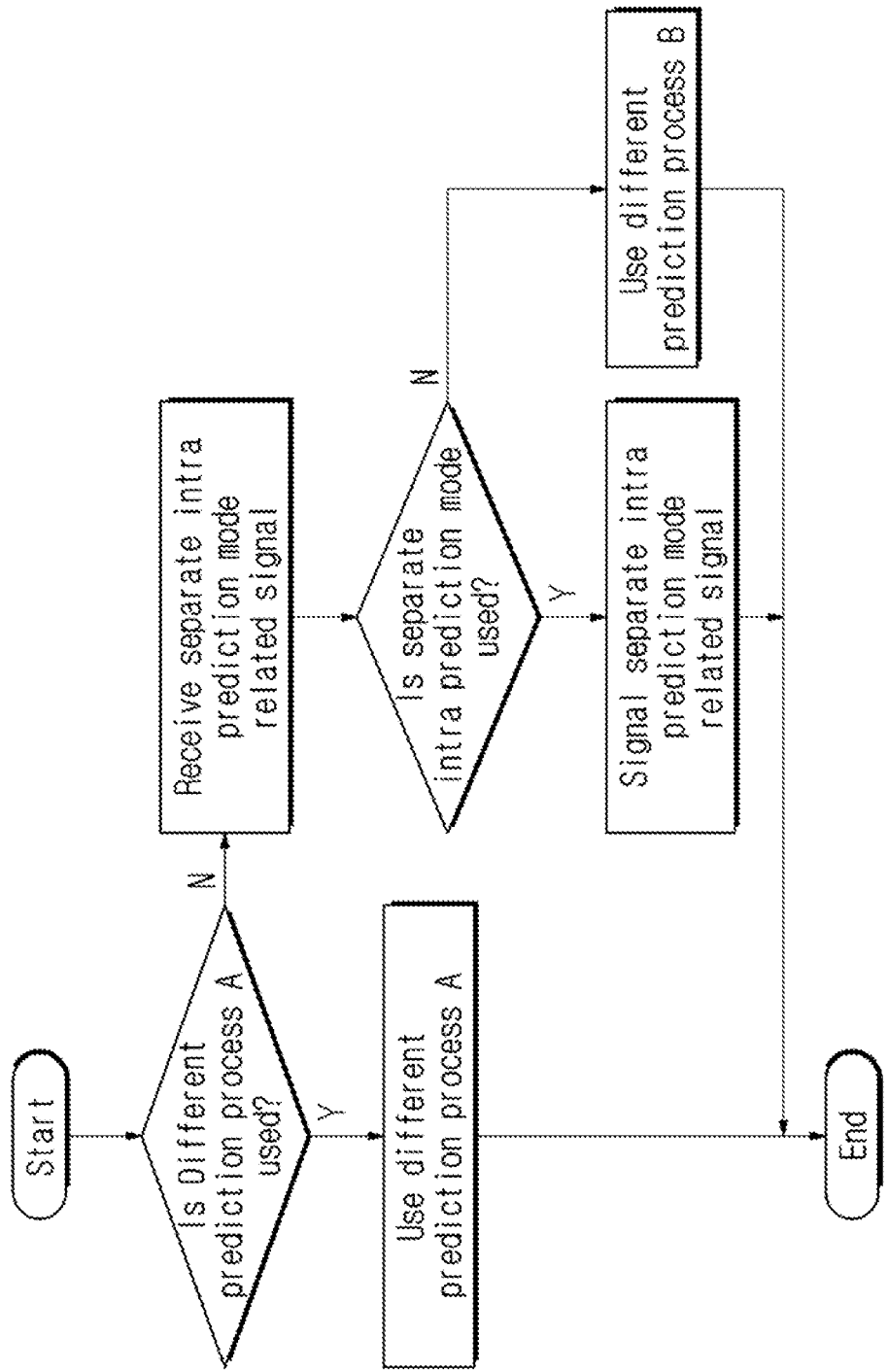

Referring to FIG. 33b, in step "is the different prediction process A used?", the decoder may determine whether to use the different prediction process A. When the different prediction process A is used, in step "use the different prediction process A", reception of the separate intra prediction mode related signal and the process related to the signal may be omitted. In addition, as the separate intra prediction process is omitted, the different prediction process B may also be omitted. When the different prediction process A is not used, in step "receive the separate intra prediction mode related signal", the separate intra prediction mode related signal may be received. In addition, in step "is the separate intra prediction mode used?", whether to use the separate intra prediction mode may be determined. When the separate intra prediction mode is used, the separate intra prediction mode related signal may be signaled to decode the current block. Alternatively, when the separate intra prediction mode is not used, in step "use the different prediction process B", the current block may be decoded using the different prediction process B.

Table 1 shows an example of signaling of a signal according to whether to perform an intra prediction mode and a separate intra prediction mode index.

TABLE 1

| Whether to perform intra prediction mode | Signal according to whether to perform intra prediction mode | Separate intra prediction mode index |
| --- | --- | --- |
| Intra prediction mode is performed | Signaling | Signaling |
| Intra prediction mode is not performed | Signaling | Signaling is omitted |

Referring to Table 1, even when the separate intra prediction mode is not used, the separate intra prediction mode related signal may be signaled. At this time, signaling of a signal other than whether to perform the separate intra prediction mode may be omitted. For example, when the separate intra prediction mode is used, a signal indicating whether to perform the separate intra prediction mode may be signaled. In addition, when a plurality of separate intra prediction modes is configured, a separate intra prediction mode index indicating one mode of the plurality of separate intra prediction modes may be signaled. When the separate intra prediction mode is not used, a signal indicating that the separate intra prediction mode is not performed may be signaled. At this time, a separate intra prediction mode index indicating one mode among the plurality of separate intra prediction modes may be omitted. Meanwhile, the type and number of signals related to the separate intra prediction mode may be changed according to the method of performing the separate intra prediction mode.

FIG. 34 is a block diagram of an apparatus for omitting a different prediction process based on signaling of a separate intra prediction mode related signal according to an embodiment of the present invention.

Referring to FIG. 34, the separate intra prediction mode configuration unit may determine the intra prediction mode to be used in the separate prediction mode and the above-described first and/or second methods may be used. The condition determination unit may determine a prediction method selected from among prediction methods different from the separate intra prediction.

Referring to (a) of FIG. 34, the condition determination unit may determine whether to use the separate intra prediction mode. When the separate intra prediction mode is used, a separate intra prediction mode signal transmission unit may omit transmission of a different prediction signal and transmit a separate intra prediction mode signal to the decoder. When the separate intra prediction mode is not used, a different prediction signal transmission unit may encode information used to predict the intra prediction mode of the current block.

Referring to (b) of FIG. 34, a signal reception unit may receive the separate intra prediction mode signal. The signal determination unit may determine whether to use the separate intra prediction mode using a signal indicating whether to use the separate intra prediction mode. When the separate intra prediction mode is used, an intra prediction decoding unit which uses the separate intra prediction mode may omit the different prediction process and decode the current block using the separate intra prediction mode. When the separate intra prediction mode is not used, a different prediction decoding unit may decode the current block using information necessary to perform different prediction.

Meanwhile, according to the present disclosure, for example, when prediction efficiency having a predetermined value or more is obtained by performing intra prediction of the current block using the separate intra prediction mode, such as when the intra prediction mode having high encoding efficiency is included in the separate intra prediction mode or when an encoding process using the separate intra prediction mode has higher efficiency than an encoding process using a different prediction process, the separate intra prediction mode may be set to be used.

Figure 35:
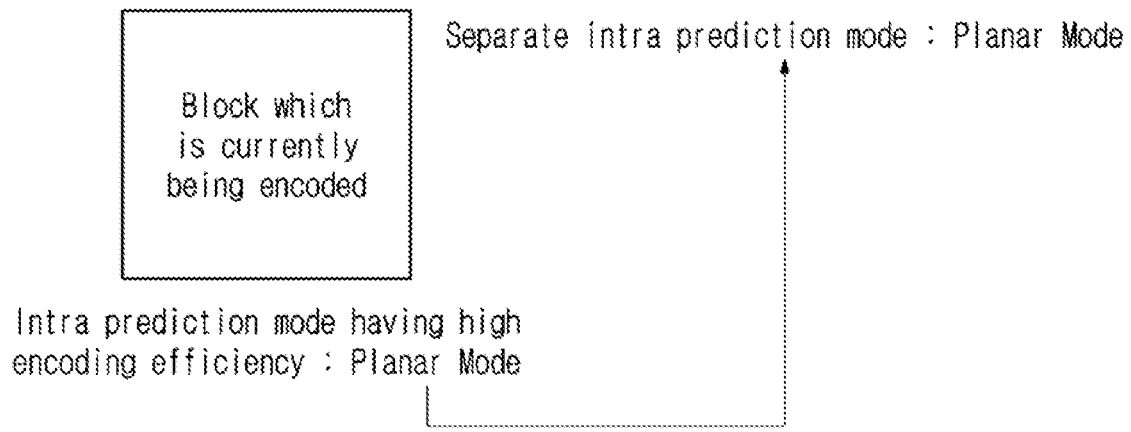
FIG. 35 is a view illustrating the case where an intra prediction mode having high encoding efficiency is included in an intra prediction mode, according to an embodiment of the present invention.

FIG. 35 is a view illustrating the case where an intra prediction mode having high encoding efficiency is included in an intra prediction mode, according to an embodiment of the present invention.

Referring to FIG. 35, if high encoding efficiency is obtained when the current block is encoded in a Planar mode, the separate intra prediction mode may be determined as the Planar mode, separate intra prediction mode information may be signaled, and a different prediction process may be omitted. Meanwhile, although the Planar mode is described for example, the present invention is not limited thereto and all or some of all prediction modes which may be available in the encoder and the decoder, such as a DC mode or an Angular mode, may be used.

Figure 36:
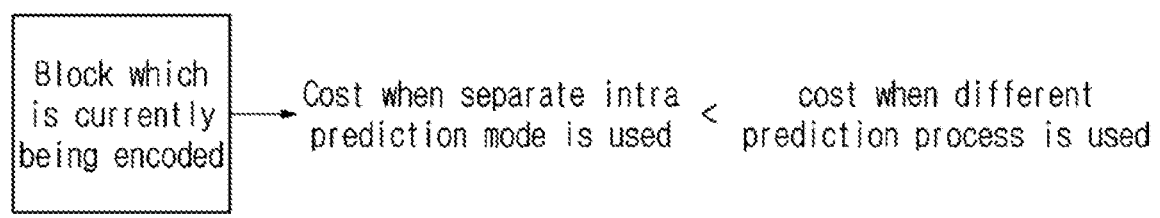
FIG. 36 is a view illustrating the case where an encoding process using a separate intra prediction mode according to an embodiment of the present invention has higher efficiency than an encoding process using a different prediction process.

FIG. 36 is a view illustrating the case where an encoding process using a separate intra prediction mode according to an embodiment of the present invention has higher efficiency than an encoding process using a different prediction process.

When cost when the current block is encoded using the separate intra prediction mode is lower than cost when the current block is encoded using a different prediction process, the separate intra prediction mode information may be signaled and the different prediction process may be omitted. Meanwhile, although cost is described as being calculated to calculate encoding efficiency, the present invention is not limited thereto and another encoding efficiency calculation method is applicable.

Figure 37:
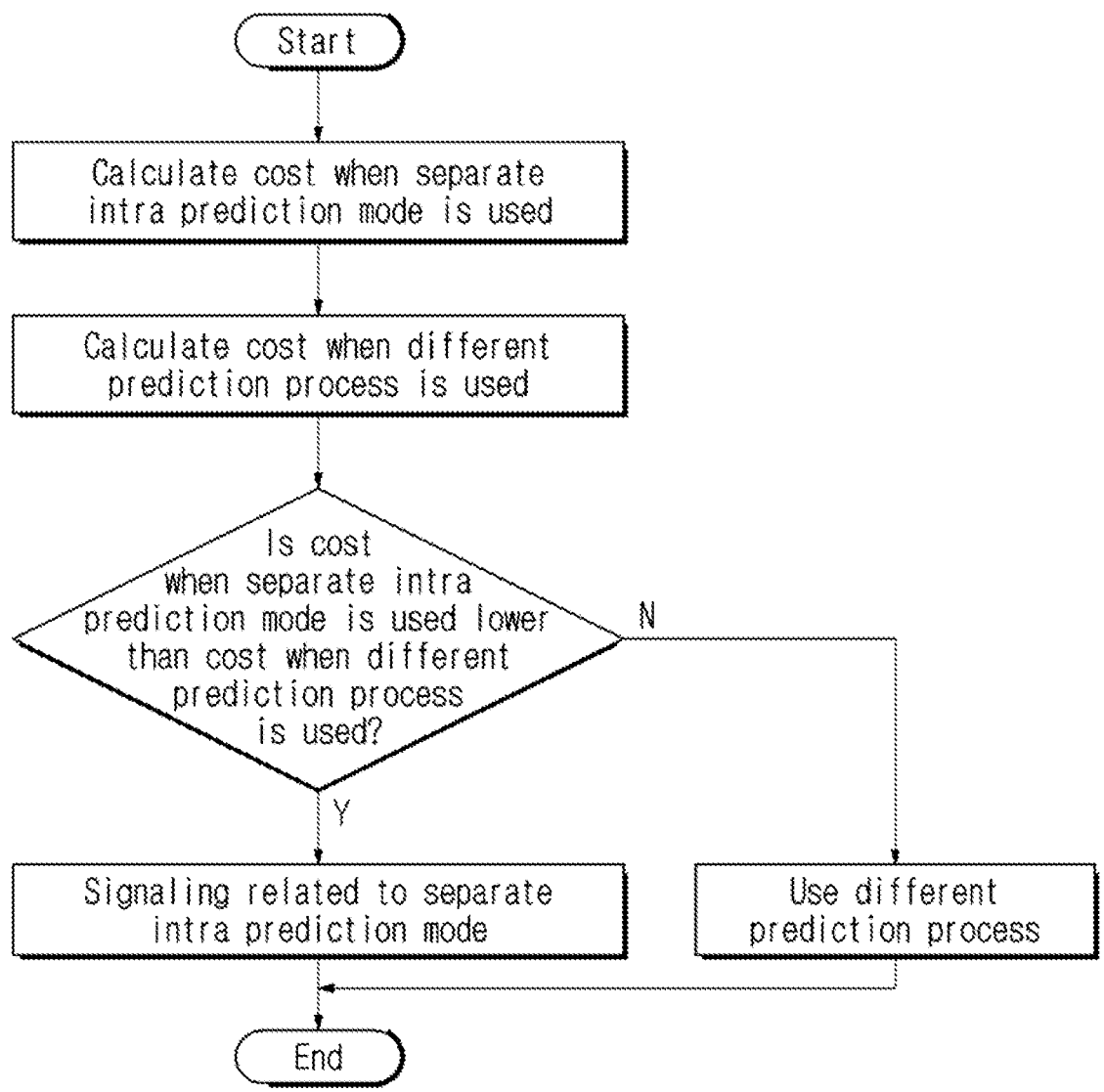
FIG. 37 is a view illustrating an encoding/decoding process when an encoding process using a separate intra prediction mode according to an embodiment of the present invention has higher efficiency than an encoding process using a different prediction process.

FIG. 37 is a view illustrating an encoding/decoding process when an encoding process using a separate intra prediction mode according to an embodiment of the present invention has higher efficiency than an encoding process using a different prediction process.

Referring to FIG. 37, in step "calculate cost when the separate intra prediction mode is used", cost when the current block is encoded using the separate intra prediction mode may be calculated. In step "calculate cost when the different prediction process is used", cost when the current block is encoded using the different prediction process may be calculated. In step "is cost when the separate intra prediction mode is used lower than that when the different prediction process is used?", the calculated cost when the separate intra prediction mode is used may be compared with the cost when the different prediction is used. When the cost when the separate intra prediction mode is used is lower than cost when the different prediction process is used, in step "signaling related to the separate intra prediction mode", information related to the separate intra prediction mode may be transmitted to the decoder and the different prediction process may be omitted. Alternatively, when the cost when the separate intra prediction mode is used is higher than cost when a different prediction process is used, the current block may be encoded using the different prediction process.

Figure 38:
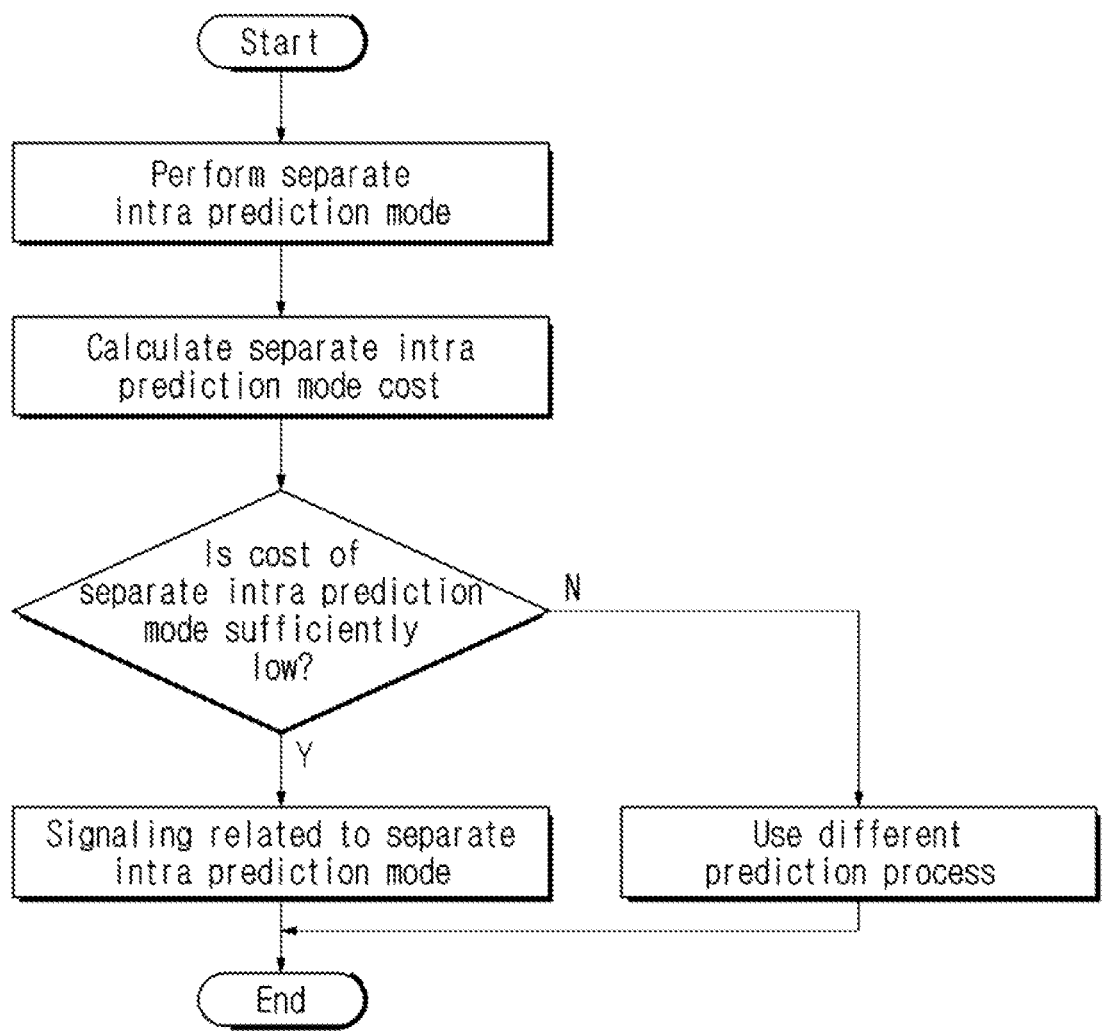
FIG. 38 is a view illustrating an encoding/decoding process when an encoding process using a separate intra prediction mode according to an embodiment of the present invention has prediction efficiency of a predetermined value or more.

FIG. 38 is a view illustrating an encoding/decoding process when an encoding process using a separate intra prediction mode according to an embodiment of the present invention has prediction efficiency of a predetermined value or more.

In step "perform the separate intra prediction mode", separate intra prediction may be performed. In step "calculate the separate intra prediction mode cost", cost when the current block is encoded using the separate intra prediction mode may be calculated. In step "is cost of the separate intra prediction mode sufficiently low?", the calculated cost of the separate intra prediction mode may be compared with a predetermined threshold. When the cost of the separate intra prediction mode is less than the threshold, information related to the separate intra prediction mode may be transmitted to the decoder and the different prediction process may be omitted. Alternatively, when the cost of the separate intra prediction mode is greater than or equal to the threshold, the current block may be encoded using the different prediction process. Meanwhile, the threshold may be a value predefined between the encoder and the decoder or a value transmitted from the encoder to the decoder.

Figure 39:
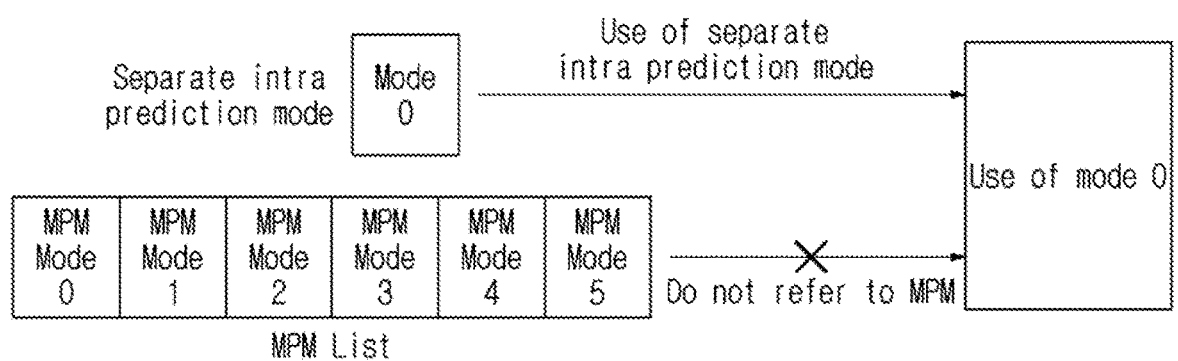
FIG. 39 is a view illustrating the basic concept of a method of omitting an MPM process based on whether a separate intra prediction mode is used, according to an embodiment of the present invention.

FIG. 39 is a view illustrating the basic concept of a method of omitting an MPM process based on whether a separate intra prediction mode is used, according to an embodiment of the present invention.

Referring to FIG. 39, when the intra prediction mode of the current block may be configured using the separate intra prediction mode, since an MPM candidate list may not be referred to, it is possible to reduce unnecessary signaling by omitting signaling related to the MPM candidate list.

Figure 40:
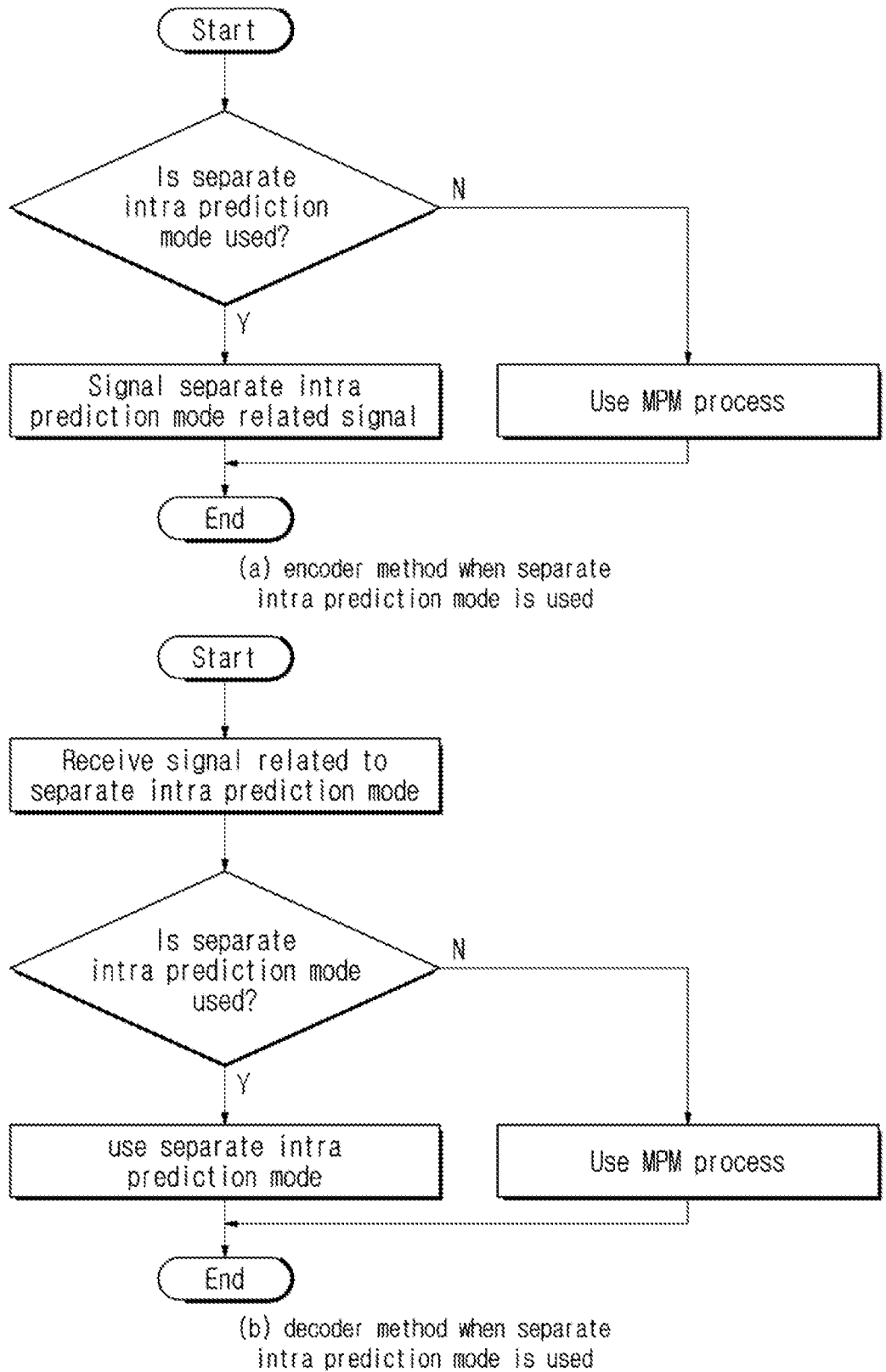
FIG. 40 is a view illustrating the basic concept of a method of omitting an MPM process based on whether a separate intra prediction mode is used, according to an embodiment of the present invention.

FIG. 40 is a view illustrating the basic concept of a method of omitting an MPM process based on whether a separate intra prediction mode is used, according to an embodiment of the present invention.

Referring to FIG. 40, the MPM process may be omitted by configuring the signaled separate intra prediction mode before the MPM process. At this time, the omitted MPM process may mean the different prediction process described above in FIGS. 33 to 38. Here, the MPM process may mean MPM configuration necessary for encoding and decoding, transmission and reception of MPM related signals such as MPM flags and MPM indices.

Referring to (a) of FIG. 40, in step "is the separate intra prediction mode used?", whether the current block uses the separate intra prediction mode may be determined. When the separate intra prediction mode is used, in step "signal a separate intra prediction mode related signal", the separate intra prediction mode related signal may be signaled. When the separate intra prediction mode is not used, in step "use the MPM process", encoding of the current block may be performed using the MPM process.

Referring to (b) of FIG. 40, in step "receive the separate intra prediction mode related signal, the separate intra prediction mode related signal may be received. In step "is the separate intra prediction mode used?", whether the current block uses the separate intra prediction mode may be determined. When the separate intra prediction mode is used, in step "use the separate intra prediction mode", decoding of the current block may be performed using the separate intra prediction mode and the MPM process may be omitted. When the separate intra prediction mode is not used, decoding of the current block may be performed using the MPM process in step "use the MPM process".

FIG. 41 is a block diagram of an apparatus for omitting an MPM process based on whether a separate intra prediction mode is used, according to an embodiment of the present invention.

The separate intra prediction mode configuration unit may determine an intra prediction mode to be used in the separate intra prediction mode, and the above-described first and second methods may be used. The condition determination unit may determine a prediction method selected from between a prediction method using a separate intra prediction mode and a prediction method using an MPM candidate list.

Referring to (a) of FIG. 41, when the separate intra prediction mode is used, a separate intra prediction mode signal transmission unit may transmit information related to the separate intra prediction mode to the decoder and omit transmission of MPM related information. When the separate intra prediction mode is not used, an MPM signal transmission unit may encode an MPM related signal.

Referring to (b) of FIG. 41, when the separate intra prediction mode is used, an intra prediction encoding unit which uses the separate intra prediction mode may perform decoding of the current block using the separate intra prediction mode and omit an MPM prediction mode. An MPM intra prediction decoding unit may perform intra prediction using MPM to decode the current block.

When the separate intra prediction mode related information is signaled, whether to use the separate intra prediction mode may be signaled in each unit or some units. In addition, when the separate intra prediction mode related information is predefined or is derived and used from other information, the signaling may be omitted.

Tables 2 to 4 show examples of signaling information related to the separate intra prediction mode.

Here, Intramode_n_enable_flag is a syntax for determining whether to use separate intra prediction mode related technology in transmission units or sub units of transmission units. For example, when Intramode_n_enable_flag is true, the separate intra prediction mode related technology may be used in in transmission units or sub units of transmission units and, when Intramode_n_enable_flag is false, the separate intra prediction mode related technology may not be used in in transmission units or sub units of transmission units.

Meanwhile, when whether to use the separate intra prediction mode related technology is predetermined, the signaling may be omitted.

Table 2 shows an example in which enable signaling indicate whether to use the separate intra prediction mode related technology is included in a sequence parameter set (SPS) syntax. Referring to Table 2, whether to use the separate intra prediction mode related method may be determined in SPS units.

TABLE 2

|  | Descriptor |
|---|---|
| seq_parameter_set_rbsp( ) { | |
|   sps_seq_parameter_set_id | ue(v) |
|   ... | |
|   Intramode_n_enable_flag | u(1) |
|   ... | |
| } | |

Table 3 shows an example in which enable signaling indicate whether to use the separate intra prediction mode related technology is included in a picture parameter set (PPS) syntax. Referring to Table 3, whether to use the separate intra prediction mode related method may be determined in PPS units.

TABLE 3

|  | Descriptor |
|---|---|
| pic_parameter_set_rbsp( ) { | |
|   pps_pic_parameter_set_id | ue(v) |
|   pps_seq_parameter_set_id | ue(v) |
|   ... | |
|   Intramode_n_enable_flag | u(1) |
|   ... | |
| } | |

Table 4 shows an example in which enable signaling indicate whether to use the separate intra prediction mode related technology is included in a tile group header syntax. Referring to Table 4, whether to use the separate intra prediction mode related method may be determined in tile group header units.

TABLE 4

| | Descriptor |
|---|---|
| tile_group_header( ) { | |
|     tile_group_pic_parameter_set_id | ue(v) |
|     ... | |
|     Intramode_n_enable_flag | u(1) |
|     ... | |
| } | |

In addition, when separate intra prediction mode signaling is used, a signal indicating whether the separate intra prediction mode is used in an encoding process for each block may be signaled or derived from other information.

Table 5 shows an example of the case where separate intra prediction mode use signaling is included in a coding unit syntax when separate intra prediction mode signaling is applied to a CU.

Referring to Table 5, Intramode_n_enable_flag may mean information for determining whether to use the separate intra prediction mode related technology in which a value is determined in an upper stage. The value of Intramode_n_enable_flag may be determined in an SPS, a PPS, a Tile group header, etc. For example, when Intramode_n_enable_flag is true, the separate intra prediction mode related technology may be used, and, when Intramode_n_enable_flag is false, the separate intra prediction mode related technology may not be used. Meanwhile, the name of Intramode_n_enable_flag may be arbitrarily described for convenience of description and may be composed of a signal having another name.

In addition, Intramode_N_flag_use may mean information indicating whether a corresponding block is encoded in a separate intra prediction mode N. Here, the intra prediction mode N may mean an intra prediction mode which may be identically predefined between the encoder and the decoder and used, such as a Planar_mode, a DC_mode, an Angular_mode, etc. The name of Intramode_N_flag_use is arbitrarily described for convenience of description and maybe composed of a signal having another name.

Table 5 shows an example when separate intra prediction mode use signaling is included in the coding unit syntax.

TABLE 5

| | Descriptor |
|---|---|
| coding_unit( x0, y0, cbWidth, cbHeight, isInShareRegion ) { | |
|   if( CuPredMode[ x0 ][ y0 ] = = MODE_INTRA ) { | |
|     ... | |
|     if(Intramode_n_enable_flag) { | |
|       Intramode_N_flage_use | u(1) |
|     } | |
|     ... | |
|   } | |
| } | |

Hereinafter, as a fifth method, a method of preferentially configuring a separate intra prediction mode in a process of configuring the intra prediction mode of a current block and conditionally omitting a different prediction process when the separate intra prediction mode is configured will be described.

Here, the different prediction process may mean all or some of prediction methods capable of being performed in inter prediction or intra prediction, such as MPM, non MPM, IBC (Intra Block Copy), Merge mode, AMPV mode, CIIP (Combined Intra Inter Prediction). In addition, omitting the different prediction process may mean that all or some of a calculation or derivation process for performing the different prediction process or a process related to a corresponding prediction method. At this time, in omission of the different prediction process, a plurality of prediction processes may be omitted or a specific prediction process may be omitted according to the configuration of the separate intra prediction mode.

The process of configuring the separate intra prediction mode in preference to the different prediction mode and omitting the different prediction process according to the configuration of the separate intra prediction mode, thereby reducing the amount of operation of the encoder and the decoder and the usage of a memory. In addition, when signaling is omitted, it is possible to improve encoding efficiency.

In the process of configuring the separate intra prediction mode, an embodiment of omitting a different prediction process is as follows. For example, there are a case where a specific location is referred to when the separate intra prediction mode is configured, a case where the separate intra prediction mode is configured as a specific intra prediction mode when the separate intra prediction mode is configured, a case where prediction efficiency is equal to or greater than a certain level when intra prediction is performed through the separate intra prediction mode and a case where the separate intra prediction mode is used.

In addition, an embodiment of a method of omitting a different prediction process in a case where a specific location is referred to when the separate intra prediction mode is configured is as follows. For example, there is a method of omitting a different prediction process when a separate intra prediction mode is set by referring to the left block of the current block when separate intra prediction mode is configured.

In addition, an embodiment of a method of omitting a different prediction process in a case where the separate intra prediction mode is configured as a specific intra prediction mode when the separate intra prediction mode is configured is as follows. For example, there is a method of omitting a different prediction process when the separate intra prediction mode is determined as a Planar mode when the separate intra prediction mode is configured.

In addition, an embodiment of a method of omitting a different prediction process in a case where prediction efficiency is equal to or greater than a certain level a process of performing intra prediction using the separate intra prediction mode is as follows. For example, when prediction precision of intra prediction performed using the separate intra prediction mode is higher than a predefined degree, there is a method of omitting a different prediction process when encoding efficiency including additional information and prediction considering transmission and reception of additional information for using the separate intra prediction mode is greater than or equal to a certain level in addition to prediction precision.

In addition, there is a method of omitting a different prediction process without considering the other conditions when the separate intra prediction mode is used.

In addition, there is a plurality of conditions for omitting a different prediction process in the process of configuring the separate intra prediction mode, and the conditions having predetermined priorities may be combined.

In addition, the process of configuring the separate intra prediction mode may be omitted by the result of performing a specific different prediction process or a plurality of different prediction processes. In addition, a combination of a method of omitting the process of configuring the separate intra prediction mode and a method of omitting a different prediction process may be applied by the result of performing a specific different prediction process or a plurality of different prediction processes.

In addition, when the above-described fourth method is used or a signal indicating whether to use the separate intra prediction mode is signaled, the fifth method may be omitted in the decoder.

In addition, separate intra prediction mode related signaling such as whether to use the separate intra prediction mode may be omitted by a predefined method. Here, in the predefined method, a condition for omitting a different prediction process in the process of configuring the separate intra prediction mode may be used. For example, there are a case where a specific location is referred to when the separate intra prediction mode is configured and a case where the separate intra prediction mode is configured as a specific intra prediction mode when the separate intra prediction mode is configured. When the above-described condition is satisfied, separate intra prediction mode related signaling may be wholly or partially omitted and the same separate intra prediction mode is configured in the encoder and the decoder using the above-described condition or whether to use the separate intra prediction mode may be determined.

In addition, when the separate intra prediction mode related signaling is omitted and the decoder determines whether to use the separate intra prediction mode and configures the separate intra prediction mode, the method of omitting the different prediction process in the process of configuring the separate intra prediction mode may be used.

FIG. 42 is a view illustrating a method of omitting a different prediction process based on a separate intra prediction mode configuration according to an embodiment of the present invention.

FIG. 42 shows an embodiment of a method of preferentially performing a separate intra prediction mode and conditionally omitting a different prediction configuration and signaling in the process of configuring the separate intra prediction mode.

Figure 42A:
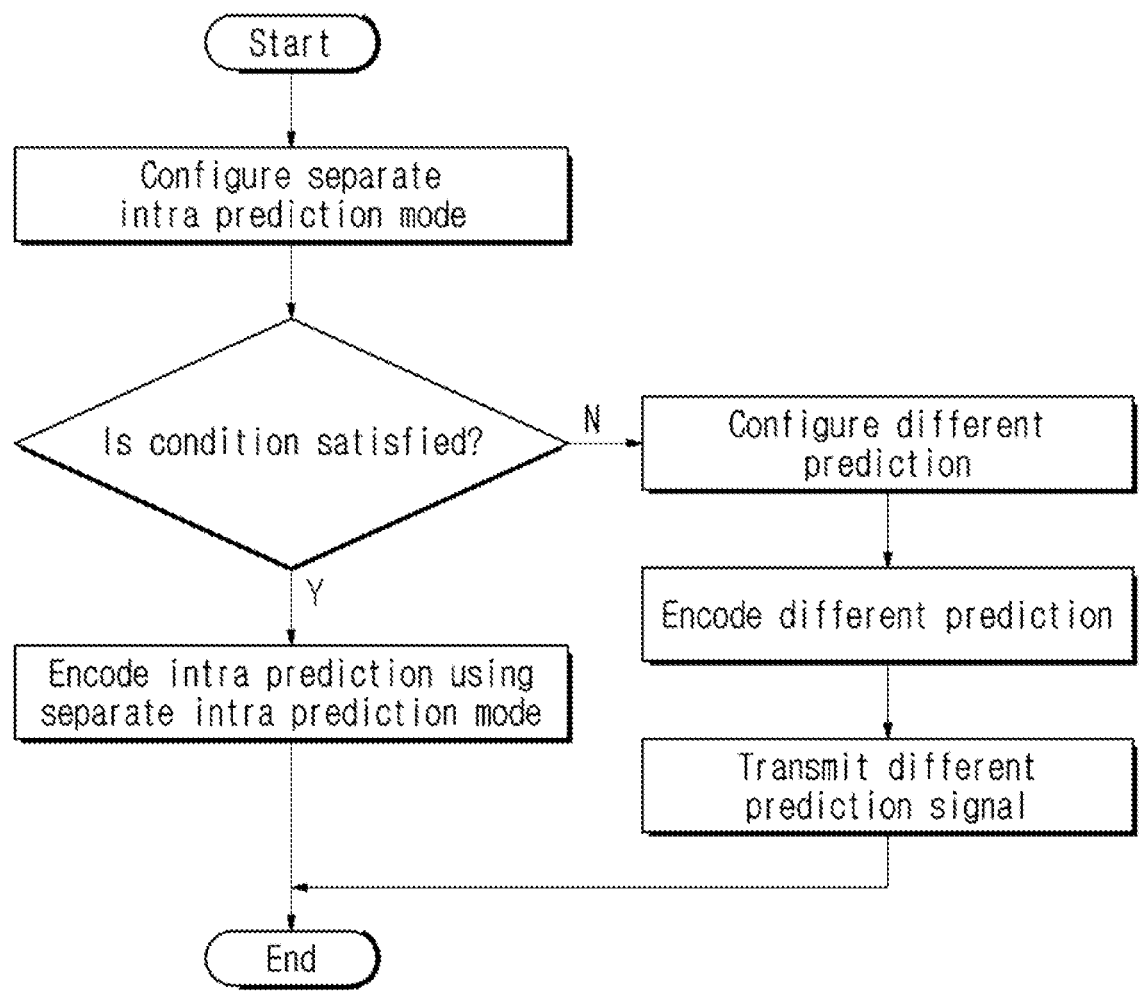
FIG. 42 is a view illustrating a method of omitting a different prediction process based on a separate intra prediction mode configuration according to an embodiment of the present invention.

Referring to FIG. 42a, in step "configure the separate intra prediction mode", an intra prediction mode to be used in the separate intra prediction mode may be determined, and, for example, the above-described first and second methods may be used. In step "is the condition satisfied?", whether to omit a different prediction configuration and signaling may be determined according to the configuration process and configuration result of the separate intra prediction mode. For example, when the separate intra prediction mode is used, a signal related to the separate intra prediction mode may not be transmitted and, in step "encode intra prediction using the separate intra prediction mode", intra prediction of the current block may be performed using the separate intra prediction mode, thereby encoding the current block. In step "configure the different prediction", predetermined information which may be used in prediction other than the separate intra prediction mode may be configured. In step "encode the different prediction, the different prediction may be performed to encode the current block. In step "transmit different prediction signal", a signal necessary for the different prediction may be encoded and signaled.

Figure 42B:
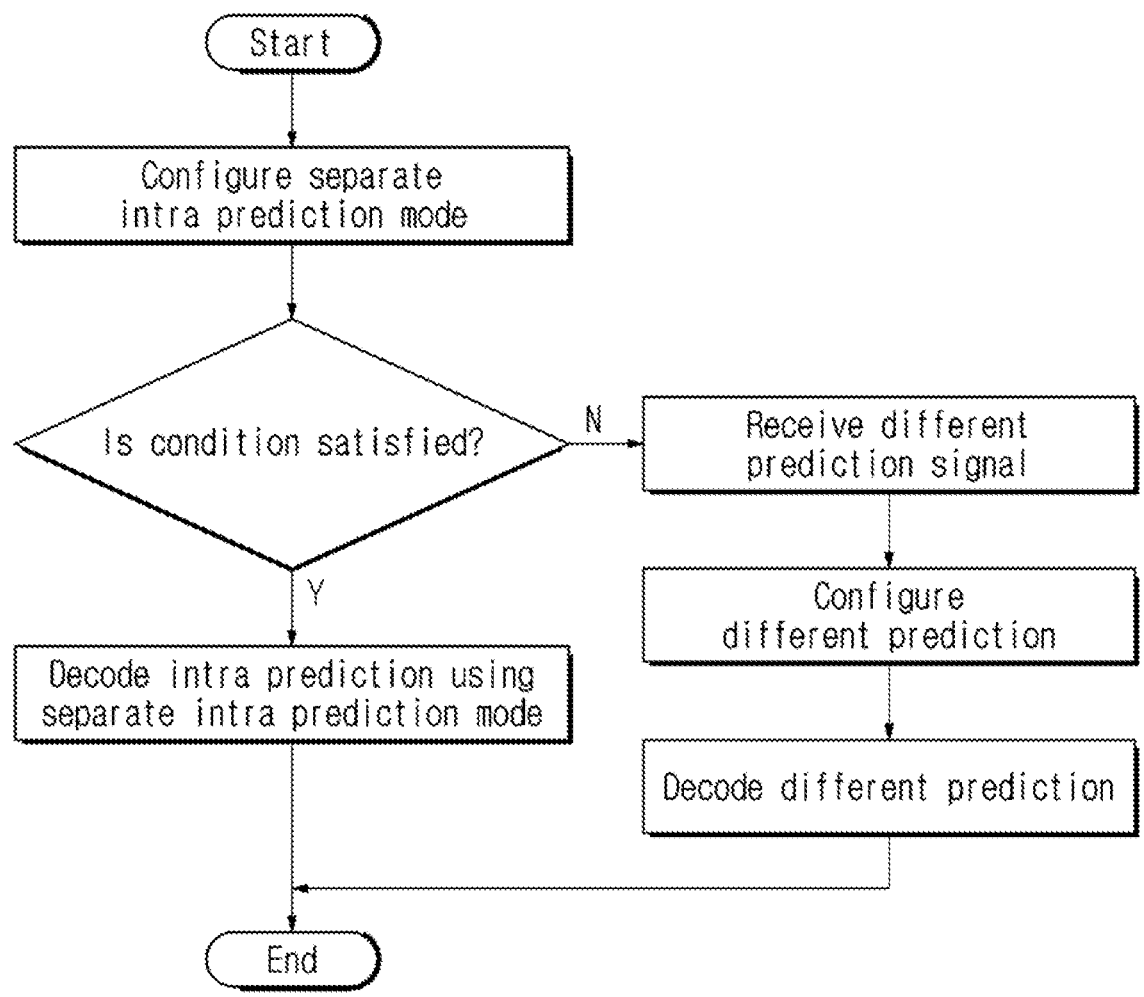

Referring to FIG. 42b, in step "is the condition satisfied?", whether to use the separate intra prediction mode may be determined. When the separate intra prediction mode is used, a signal related to the separate intra prediction mode may not be received and, in step "encode intra prediction using the separate intra prediction mode", intra prediction of the current block may be performed using the separate intra prediction mode. In step "receive the different prediction signal", a signal necessary to decode the current block, such as the type of prediction used for encoding may be received. In step "decode the different prediction", the different prediction may be performed to decode the current block.

Meanwhile, in FIG. 42a, when the separate intra prediction mode is performed by step "is the condition satisfied", step "configure the different prediction", step "encode the different prediction" and step "transmit the different prediction signal" may be omitted. In addition, in FIG. 42b, when the separate intra prediction mode is performed by step "is the condition satisfied", step "receive the different prediction signal", step "configure the different prediction" and step "decode the different prediction" may be omitted.

FIG. 43 is a block diagram of an apparatus for omitting a different prediction process based on a separate intra prediction mode configuration according to an embodiment of the present invention.

FIG. 43 shows an embodiment of an apparatus for preferentially performing a separate intra prediction mode and conditionally omitting another prediction configuration and signaling in the process of configuring the separate intra prediction mode.

Referring to (a) of FIG. 43, the separate intra prediction mode configuration unit may determine an intra prediction mode to be used in the separate intra prediction mode, and, for example, the above-described first and second methods may be used. The condition determination unit may determine whether to omit a different prediction configuration and signaling according to the configuration process and configuration result of the separate intra prediction mode. For example, when the separate intra prediction mode is used, a signal related to the separate intra prediction mode may not be transmitted, and the intra prediction encoding unit which uses the separate intra prediction mode may perform intra prediction of the current block using the separate intra prediction mode to encode the current block. A different prediction signal transmission unit may encode and signal a signal necessary for the different prediction.

Referring to (b) of FIG. 43, the condition determination unit may determine whether to use the separate intra prediction mode. When the separate intra prediction mode is used, a signal related to the separate intra prediction mode may not be received and the intra prediction encoding unit which uses the separate intra prediction mode may perform intra prediction of the current block using the separate intra prediction mode. A different prediction signal reception unit may receive a signal necessary to decode the current block, such as the type of prediction used for encoding. A different prediction configuration unit may configure predetermined information which may be used in the different prediction other than the separate intra prediction mode. A different prediction encoding unit may perform the different prediction to encode the current block. A different prediction decoding unit may perform the different prediction to decode the current block.

Meanwhile, in (a) of FIG. 43, when the separate intra prediction mode is performed, operation of the different prediction configuration unit, the different prediction encoding unit and the different prediction signal transmission unit may be omitted. In addition, in (b) of FIG. 43, when the separate intra prediction mode is performed, operation of another prediction signal reception unit, the different prediction configuration unit and the different prediction decoding unit may be omitted.

FIG. 44 is a view illustrating a method of omitting an MPM intra prediction process based on a separate intra prediction mode configuration according to an embodiment of the present invention.

FIG. 44 shows an embodiment of a method of preferentially performing a separate intra prediction mode and conditionally omitting an MPM configuration and signaling in the process of configuring the separate intra prediction mode.

Figure 44A:
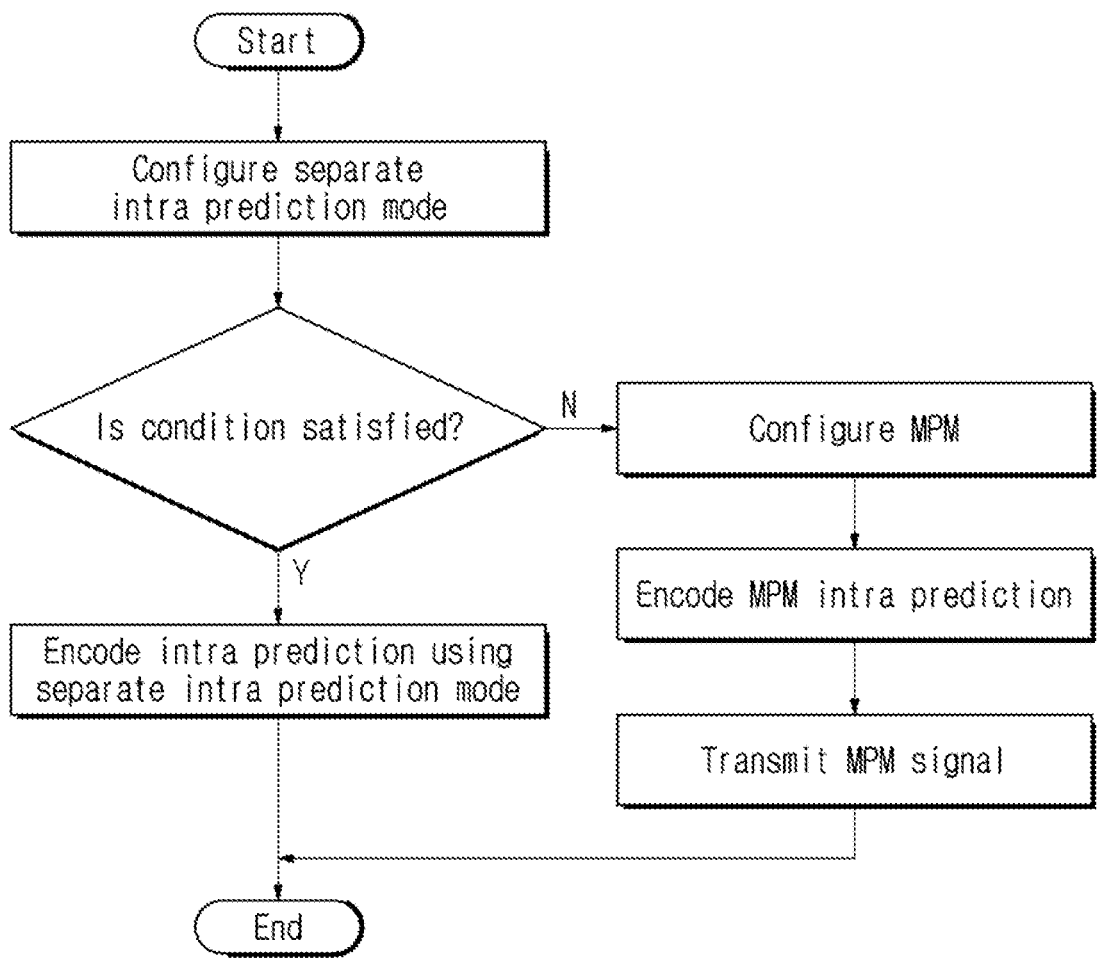
FIG. 44 is a view illustrating a method of omitting an MPM intra prediction process based on a separate intra prediction mode configuration according to an embodiment of the present invention.

Referring to FIG. 44a, in step "configure the separate intra prediction mode", an intra prediction mode to be used in the separate intra prediction mode may be determined, and, for example, the above-described first and second methods may be used. In step "is the condition satisfied?", whether to omit the MPM configuration and signaling may be determined according to the configuration process and configuration result of the separate intra prediction mode. For example, when the separate intra prediction mode is used, a signal related to the separate intra prediction mode may not be transmitted and, in step "encode intra prediction using the separate intra prediction mode", intra prediction of the current block may be performed using the separate intra prediction mode, thereby encoding the current block. In step "configure MPM configuration", an MPM list which may be used in intra prediction may be configured. In step "encode MPM intra prediction", intra prediction using MPM may be performed to encode the current block. In step "transmit MPM signal", the intra prediction mode according to whether to use MPM and non-MPM and/or whether to use MPM may be encoded and signaled according to the MPM intra prediction encoding result.

Figure 44B:
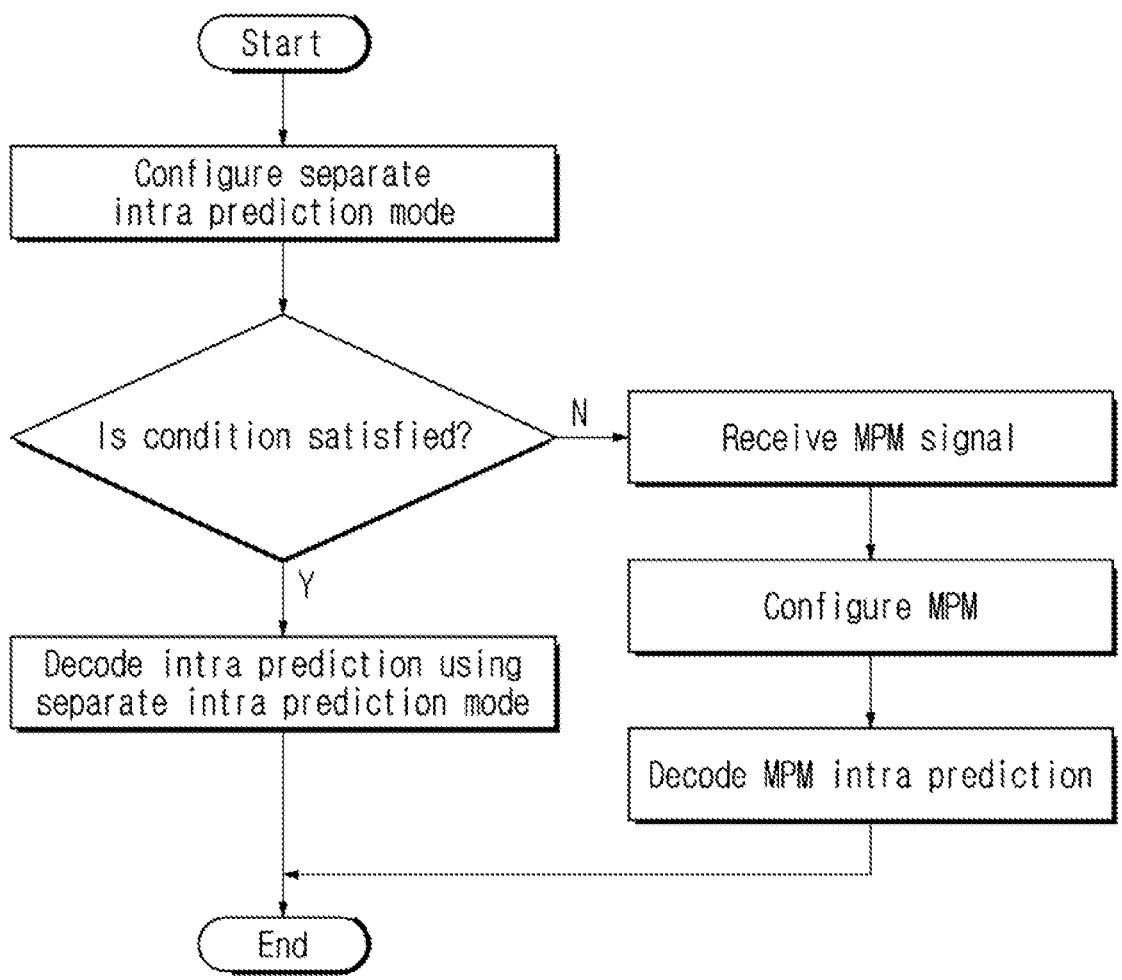

Referring to FIG. 44b, in step "is the condition satisfied?", whether to use the separate intra prediction mode may be determined. When the separate intra prediction mode is used, a signal related to the separate intra prediction mode may not be received and, in step "encode intra prediction using the separate intra prediction mode", intra prediction of the current block may be performed using the separate intra prediction mode. In step "receive MPM signal", an intra prediction mode according to whether to use MPM and/or whether to use encoded MPM and non-MPM may be decoded. In step "decode MPM intra prediction, intra prediction using MPM may be performed to decode the current block.

Meanwhile, in FIG. 44a, when the separate intra prediction mode is performed, step "configure MPM", step "encode MPM intra prediction" and "transmit MPM signal" may be omitted. In FIG. 44b, when the separate intra prediction mode is performed, step "receive MPM signal", step "configure MPM" and step "decode MPM intra prediction" may be omitted.

FIG. 45 is a block diagram of an apparatus for omitting an MPM intra prediction process based on a separate intra prediction mode configuration according to an embodiment of the present invention.

FIG. 45 shows an embodiment of an apparatus for preferentially performing a separate intra prediction mode and conditionally omitting an MPM configuration and signaling in the process of configuring the separate intra prediction mode.

Referring to (a) of FIG. 45, the separate intra prediction mode configuration unit may determine an intra prediction mode to be used in the separate intra prediction mode, and, for example, the above-described first and second methods may be used. The condition determination unit may determine whether to omit the MPM configuration and signaling according to the configuration process and configuration result of the separate intra prediction mode. For example, when the separate intra prediction mode is used, a signal related to the separate intra prediction mode may not be transmitted, and the intra prediction encoding unit which uses the separate intra prediction mode may perform intra prediction of the current block using the separate intra prediction mode to encode the current block. The MPM configuration unit may configure an MPM list which may be used for intra prediction. The MPM intra prediction encoding unit may perform intra prediction using MPM to encode the current block. The MPM prediction signal transmission unit may encode and signal the intra prediction mode according to whether to use MPM and non-MPM and/or whether to use MPM according to the MPM intra prediction encoding result.

Referring to (b) of FIG. 45, when the separate intra prediction mode is used, a signal related to the separate intra prediction mode may not be received and the intra prediction decoding unit which uses the separate intra prediction mode may perform intra prediction of the current block using the separate intra prediction mode. The MPM signal reception unit may decode the intra prediction mode according to whether to use encoded MPM and non-MPM and/or whether to use MPM. The MPM intra prediction decoding unit may perform intra prediction using MPM to decode the current block.

Meanwhile, in (a) of FIG. 45, when the separate intra prediction mode is performed, operation of the MPM configuration unit, the MPM intra prediction encoding unit and the MPM signal transmission unit may be omitted. In addition, in (b) of FIG. 45, when the separate intra prediction mode is performed, operation of the MPM signal reception unit, the MPM configuration unit and the MPM intra prediction decoding unit may be omitted.

FIG. 46 is a view illustrating a method of omitting a separate intra prediction mode based on the configuration or use of different prediction according to an embodiment of the present invention.

FIG. 46 shows an embodiment of a method of preferentially configuring or performing a single or plurality of different predictions and omitting a separate intra prediction mode according to whether to perform all or some of the different predictions.

Here, a different prediction A may mean prediction which may be performed in preference to a separate prediction mode among different predictions other than the separate intra prediction mode. In addition, the different prediction A may be a single or plurality of prediction methods. In addition, a different prediction B may mean prediction which may be omitted according to the configuration of the separate intra prediction mode among different predictions other than the separate intra prediction mode. In addition, the different prediction B may be a single or plurality of prediction methods.

Figure 46A:
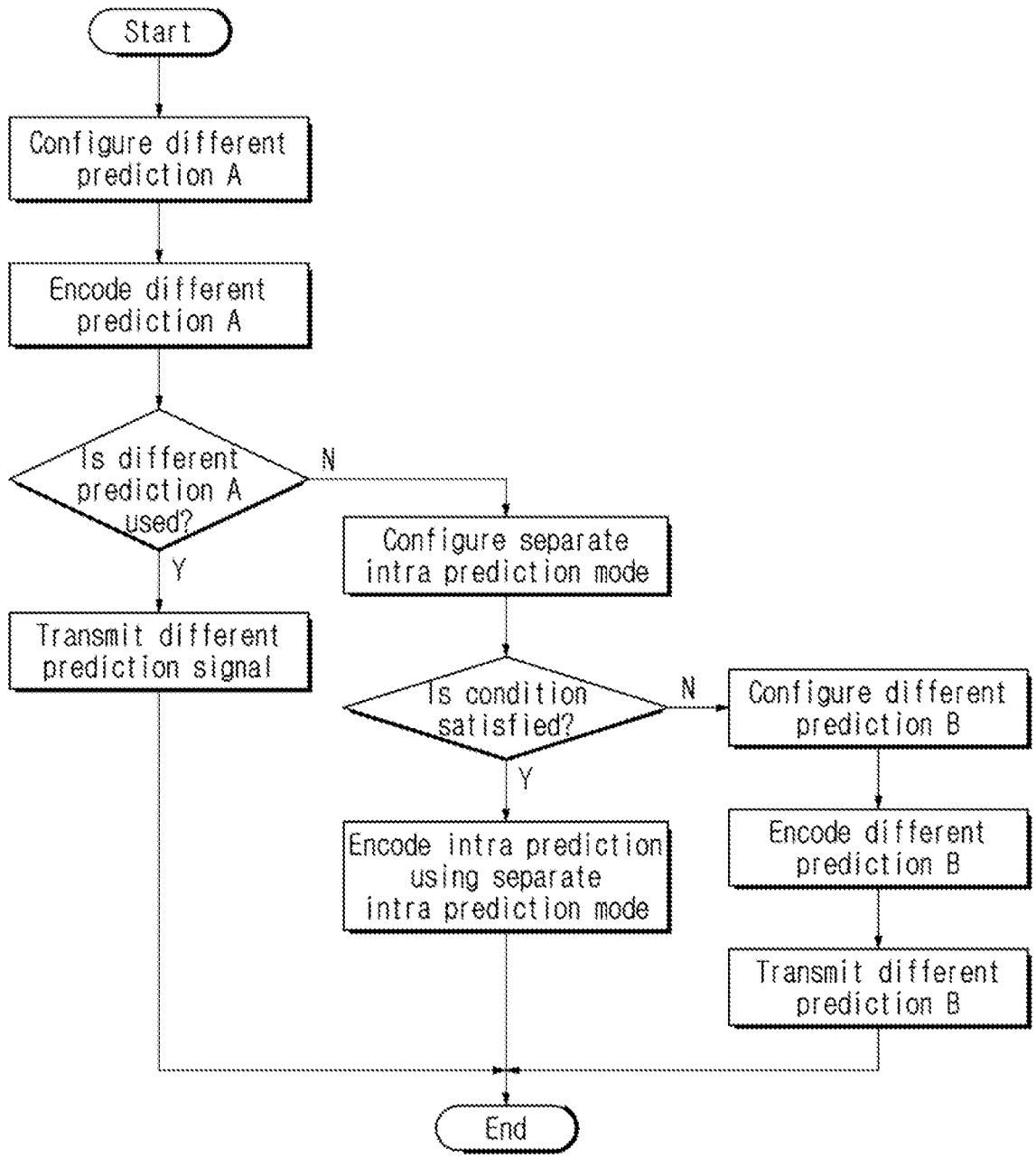
FIG. 46 is a view illustrating a method of omitting a separate intra prediction mode based on the configuration or use of different prediction according to an embodiment of the present invention.

Referring to FIG. 46a, in step "configure different prediction A", predetermined information which may be used in the different prediction A may be configured. In step "encode the different prediction A", the different prediction A may be performed to encode the current block.

In step "is the different prediction A used?", whether to encode/decode the current block using the prediction method which uses the different prediction A may be determined. At this time, the determination method may vary according to the prediction method. For example, there are a method of using signaling used in each prediction method and a method of comparing encoding efficiencies of prediction methods. When the different prediction A is used, performance of the separate intra prediction mode and the different prediction B may be omitted. In step "transmit the different prediction signal", a signal necessary for used prediction may be encoded and signaled according to the different prediction A encoding result.

In step "configure the separate intra prediction mode", an intra prediction mode to be used in the separate intra prediction mode may be determined, and, for example, the above-described first and second methods may be used. In step "is the condition satisfied?", whether to omit the different prediction configuration and signaling may be determined according to the configuration process and configuration result of the separate intra prediction mode. For example, when the separate intra prediction mode is used, a signal related to the separate intra prediction mode may not be transmitted and, in step "encode intra prediction using the separate intra prediction mode", the intra prediction of the current block may be performed using the separate intra prediction mode to encode the current block.

In step "encode the different prediction B", the different prediction B may be performed to encode the current block. In step "transmit the different prediction B signal", a signal necessary for used prediction may be encoded and signaled according to the different prediction B encoding result.

Figure 46B:
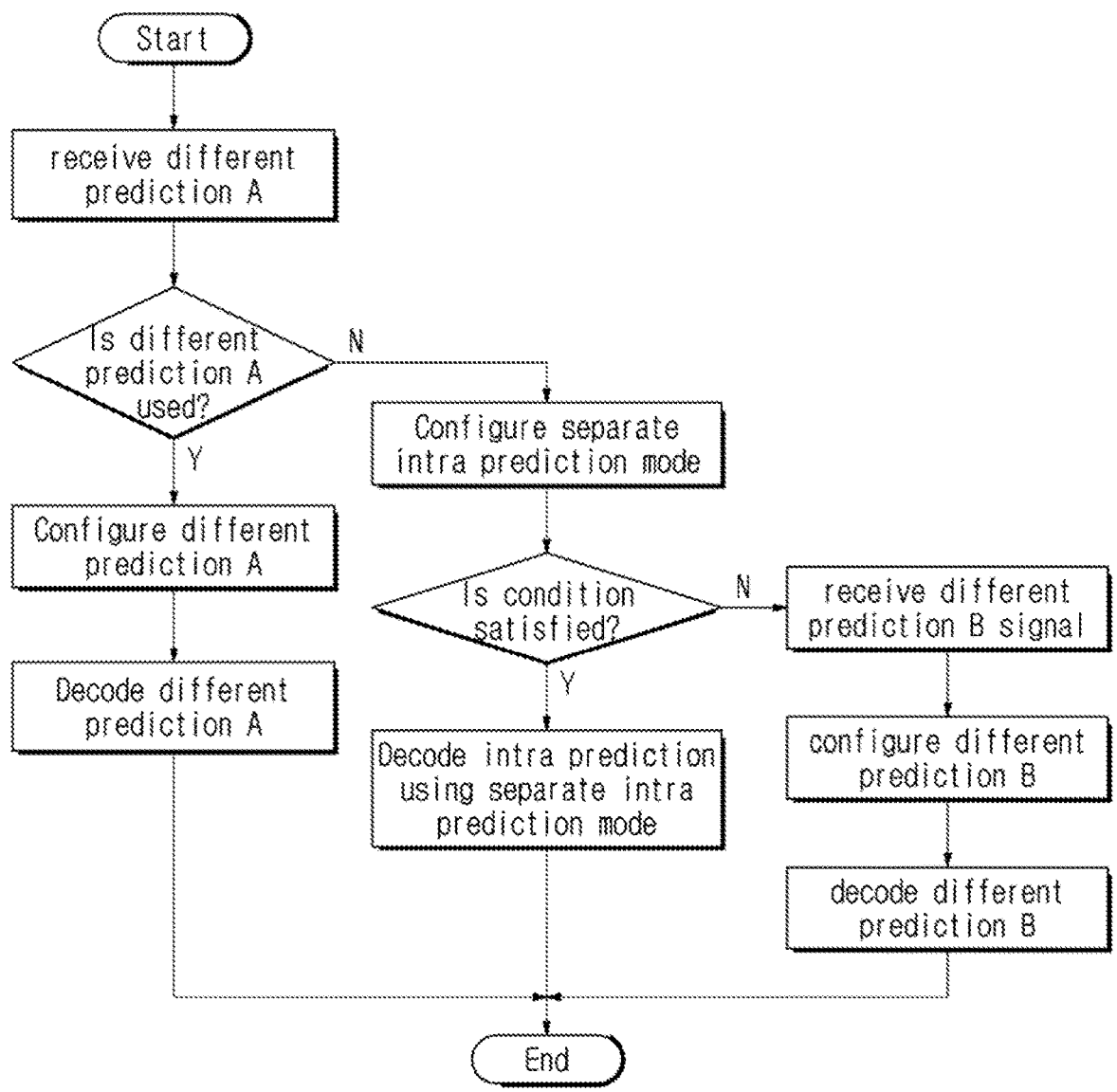

Referring to FIG. 46*b*, in step "is the condition satisfied", whether to use the separate intra prediction mode may be determined. When the separate intra prediction mode is used, a signal related to the separate intra prediction mode may not be transmitted and in step "decode intra prediction using the separate intra prediction mode, intra prediction of the current block may be performed using the separate intra prediction mode.

In step "receive the different prediction A signal", a signal necessary to decode the current block, such as the type of prediction used for encoding, may be received. In step "decode the different prediction A", the different prediction A may be performed to decode the current block.

In step "receive the different prediction B signal, a signal necessary to decode the current block, such as the type of prediction used for decoding, may be received. In step "decode the different prediction B", the different prediction B may be performed to decode the current block.

Meanwhile, in 46*a*, when the separate intra prediction mode is performed, step "configure the different prediction B, step "encode the different prediction B" and step "transmit the different prediction B signal" may be omitted. In addition, in FIG. 46*b*, when the separate intra prediction mode is performed, step "receive the different prediction B signal", step "configure the different prediction B" and step "decode the different prediction B" may be omitted.

Figure 47:
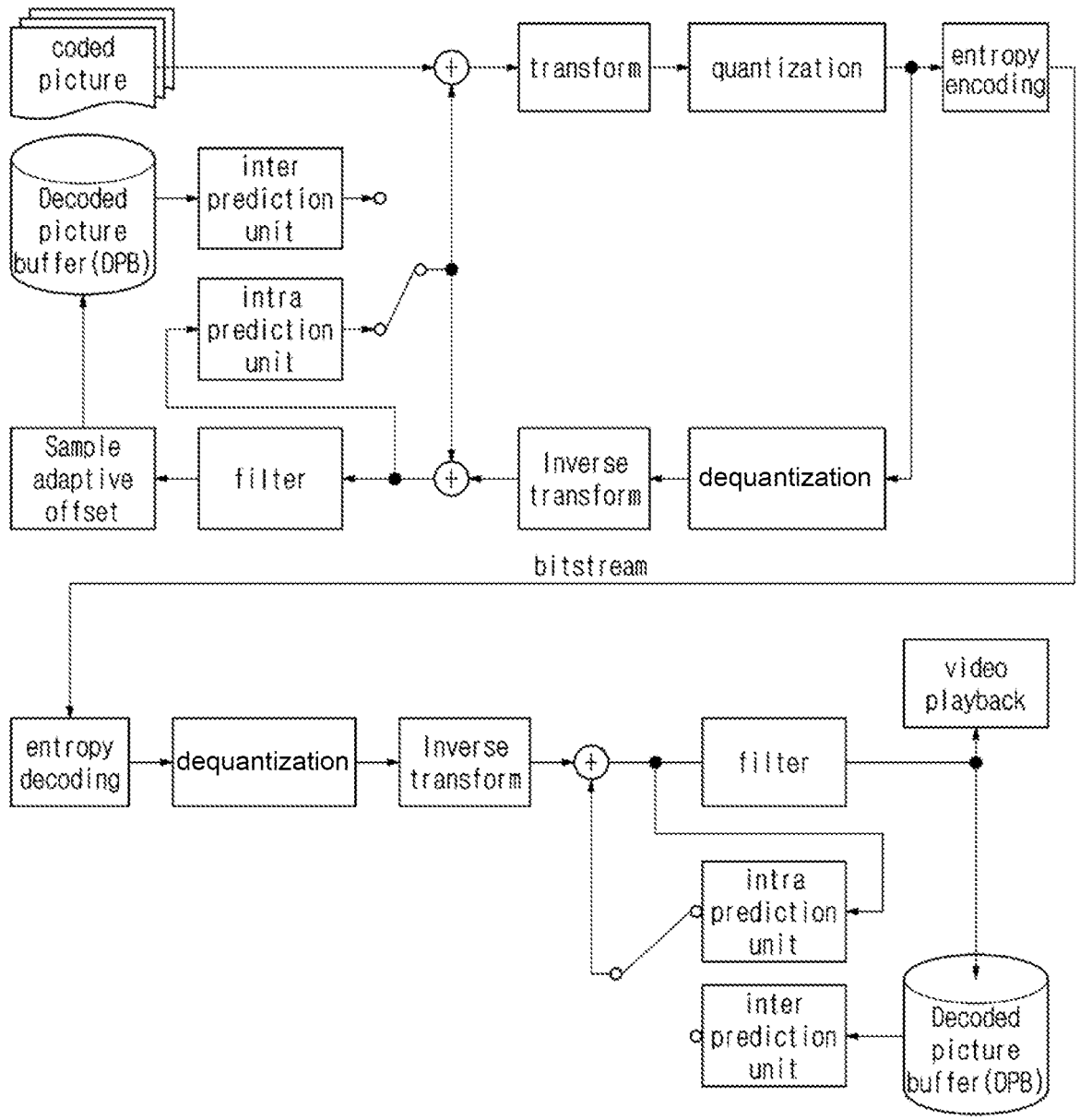
FIG. 47 is a block diagram of an encoding apparatus and a decoding apparatus according to an embodiment of the present invention.

FIG. 47 is a block diagram of an encoding apparatus and a decoding apparatus according to an embodiment of the present invention.

Referring to FIG. 47, the above-described first to fifth methods may be performed in an intra prediction unit.

Meanwhile, in FIGS. 11 to 47, start and end may mean start and end of an individual process and do not mean start and end of the intra prediction process or the intra prediction mode encoding process.

According to the present disclosure, by reducing signaling of the intra prediction mode, it is possible to reduce the amount of signaling bits and to increase the compression rate of the image coding method and apparatus. In addition, since some prediction process may be omitted, it is possible to improve complexity performance.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and structured for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
configuring a prediction mode of a current block based on a bitstream; and
generating a prediction block of the current block by performing prediction based on the prediction mode of the current block,
wherein a determination for whether a process of an Intra Block Copy (IBC) mode is used for the current block is performed, and
a determination for whether a separate intra prediction mode is used for the current block is performed based on the determination for whether the process of the IBC mode is used for the current block,
a DC mode is used as the separate intra prediction mode,
the separate intra prediction mode is used in a case that different prediction is not used for the current block, and
a Planar mode is used as an intra prediction mode for the current block in a case that the different prediction is used for the current block.

2. The method of claim 1, wherein the prediction block is generated based on an intra prediction mode for the current block,
separate intra prediction mode information indicates that whether the separate intra prediction mode is used, and
the separate intra prediction mode is used as the intra prediction mode for the current block in a case that the separate intra prediction mode information indicates that the separate intra prediction mode is used.

3. The method of claim 1, wherein a Most Probable Mode (MPM) is used for a determination of the intra prediction mode for the current block in a case that the separate intra prediction mode information indicates that the separate intra prediction mode is not used.

4. The method of claim 3, wherein a MPM candidate list of the MPM is configured not to include the separate intra prediction mode.

5. The method of claim 3, wherein a MPM index of the MPM is not signaled via the bitstream in a case that the separate intra prediction mode information indicates that the separate intra prediction mode is used, and
the MPM index is an index for a MPM candidate list.

6. The method of claim 2, wherein a signaling of the separate intra prediction mode information via the bitstream is selectively performed.

7. The method of claim 1, wherein a second prediction process is used in a case that it is determined that the separate intra prediction mode is not used.

8. The method of claim 7, wherein the second prediction process is a method to determine an intra prediction mode for the current block using information referred from a reference area.

9. The method of claim 8, wherein the reference area is determined by a width and a height of the current block.

10. The method of claim 1, wherein the separate intra prediction mode is determined using information referred from a reference area.

11. The method of claim 1, wherein the separate intra prediction mode is determined using information referred from a reference area.

12. The method of claim 11, wherein the reference area is determined by a width and a height of the current block.

13. A method of encoding an image, the method comprising:
configuring a prediction mode of a current block; and
generating a prediction block of the current block by performing prediction based on the prediction mode of the current block,
wherein a determination for whether a process of an Intra Block Copy (IBC) mode is used for the current block is performed to generate first information,
second information indicating whether a separate intra prediction mode is used for the current block is determined based on the first information indicating whether the process of the IBC mode is used for the current block,
a DC mode is used as the separate intra prediction mode,
the separate intra prediction mode is used in a case that different prediction is not used for the current block, and a Planar mode is used as an intra prediction mode for the current block in a case that the different prediction is used for the current block.

14. A non-transitory computer readable recording medium storing a bitstream, the bitstream comprising:
first information;
wherein a prediction mode of a current block is configured based on the bitstream,
a prediction block of the current block is generated by performing a prediction based on the prediction mode of the current block,
a determination for whether a process of an Intra Block Copy (IBC) mode is used for the current block is performed using the first information,
a determination for whether a separate intra prediction mode is used for the current block is performed based on the determination for whether the process of the IBC mode is used for the current block,
a DC mode is used as the separate intra prediction mode,
the separate intra prediction mode is used in a case that different prediction is not used for the current block, and
a Planar mode is used as an intra prediction mode for the current block in a case that the different prediction is used for the current block.

* * * * *